US008732470B2

(12) United States Patent
Nagai et al.

(10) Patent No.: US 8,732,470 B2
(45) Date of Patent: May 20, 2014

(54) STORAGE SYSTEM IN WHICH FICTITIOUS INFORMATION IS PREVENTED

(71) Applicants: Yuji Nagai, Sagamihara (JP); Yasufumi Tsumagari, Kawasaki (JP); Shinichi Matsukawa, Tokyo (JP); Hiroyuki Sakamoto, Ome (JP); Hideki Mimura, Yokohama (JP)

(72) Inventors: Yuji Nagai, Sagamihara (JP); Yasufumi Tsumagari, Kawasaki (JP); Shinichi Matsukawa, Tokyo (JP); Hiroyuki Sakamoto, Ome (JP); Hideki Mimura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/623,318

(22) Filed: Sep. 20, 2012

(65) Prior Publication Data
US 2014/0032910 A1 Jan. 30, 2014

(30) Foreign Application Priority Data

Jul. 26, 2012 (JP) ................................. 2012-166403

(51) Int. Cl.
*H04L 9/32* (2006.01)

(52) U.S. Cl.
USPC .............................. 713/171; 713/181; 380/44

(58) Field of Classification Search
USPC ................. 713/168, 189–192, 171, 181, 193; 380/44
See application file for complete search history.

(56) References Cited

U.S. PATENT DOCUMENTS

| | | | |
|---|---|---|---|
| 7,500,101 B2 * | 3/2009 | Kitani | 713/169 |
| 7,565,691 B2 * | 7/2009 | Kitani | 726/22 |
| 7,823,211 B2 * | 10/2010 | Matsukawa et al. | 726/28 |
| 8,204,226 B2 * | 6/2012 | Matsukawa et al. | 380/277 |
| 2005/0081047 A1 * | 4/2005 | Kitani | 713/193 |
| 2005/0089165 A1 * | 4/2005 | Kitani et al. | 380/201 |
| 2005/0198529 A1 * | 9/2005 | Kitani | 713/200 |
| 2005/0213767 A1 | 9/2005 | Matsukawa et al. | |
| 2005/0268344 A1 | 12/2005 | Matsukawa et al. | |
| 2008/0069354 A1 * | 3/2008 | Kitani et al. | 380/202 |

FOREIGN PATENT DOCUMENTS

| | | |
|---|---|---|
| JP | 2004-185152 | 7/2004 |
| JP | 2004-194271 | 7/2004 |

OTHER PUBLICATIONS

"Content Protection for Recordable Media Specification" SD Memory Card Book Common Part, Revision 0.97, Dec. 15, 2010, 39 pgs.
"Content Protection for Recordable Media Specification" SD Memory Card Book SD-SD ( Separate Delivery) Part, Revision 0.94, Jul. 19, 2012, 114 pgs.

* cited by examiner

*Primary Examiner* — Samson Lemma
(74) *Attorney, Agent, or Firm* — Oblon, Spivak, McClelland, Maier & Neustadt, L.L.P.

(57) ABSTRACT

According to one embodiment, a storage system includes a host device, a secure storing medium, and a non-secure storing medium. The secure storing medium includes a memory provided with a protected first storing region which stores secret information sent from the host device, and a second storing region which stores encoded contents, and a controller which carries out authentication processing for accessing the first storing region. The host device and the secure storing medium produce a bus key which is shared only by the host device and the secure storing medium by authentication processing, and which is used for encoding processing when information of the first storing region is sent and received between the host device and the secure storing medium. The host device has the capability to request the secure storing medium to send a status.

7 Claims, 46 Drawing Sheets

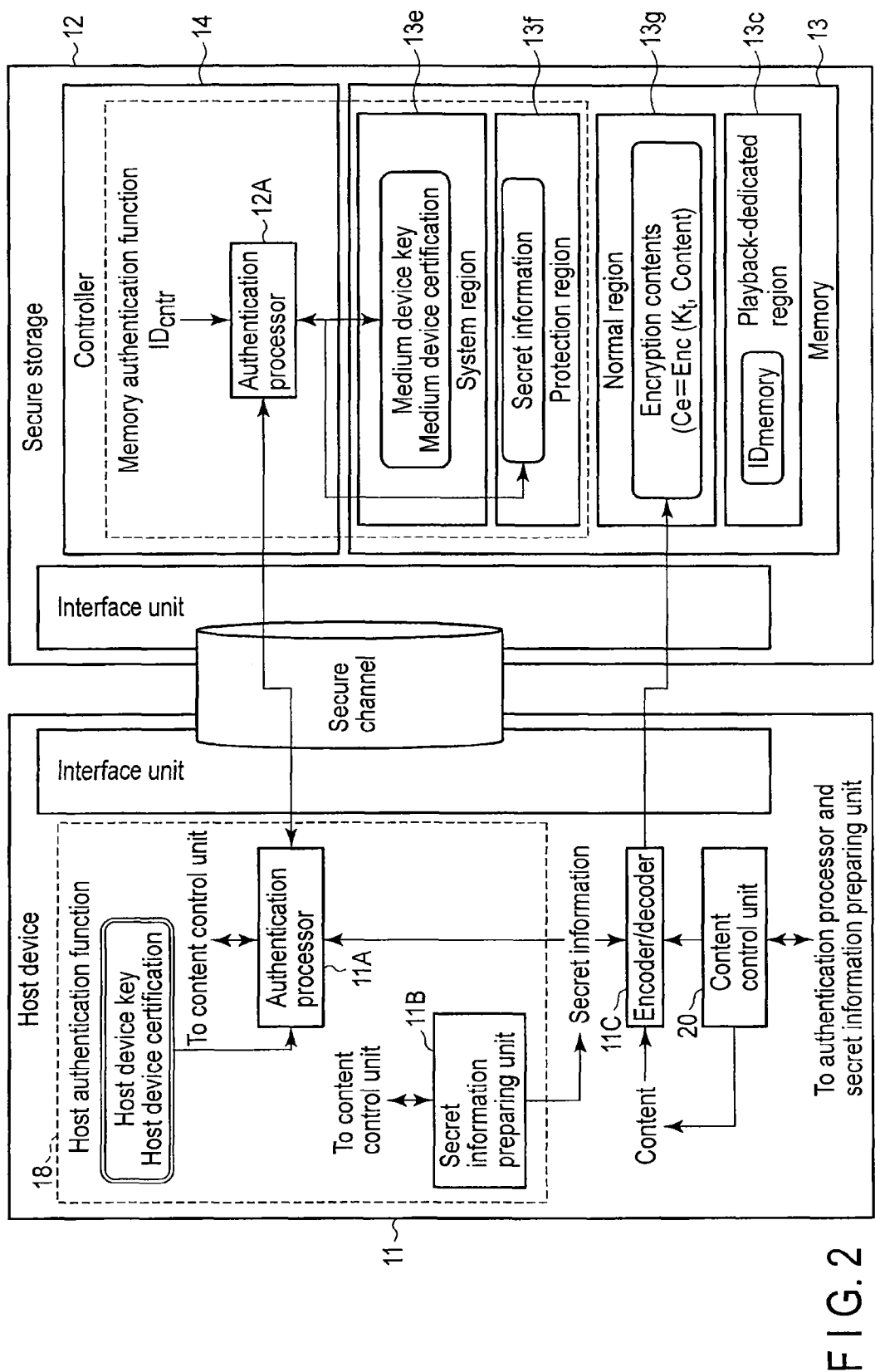
F I G. 2

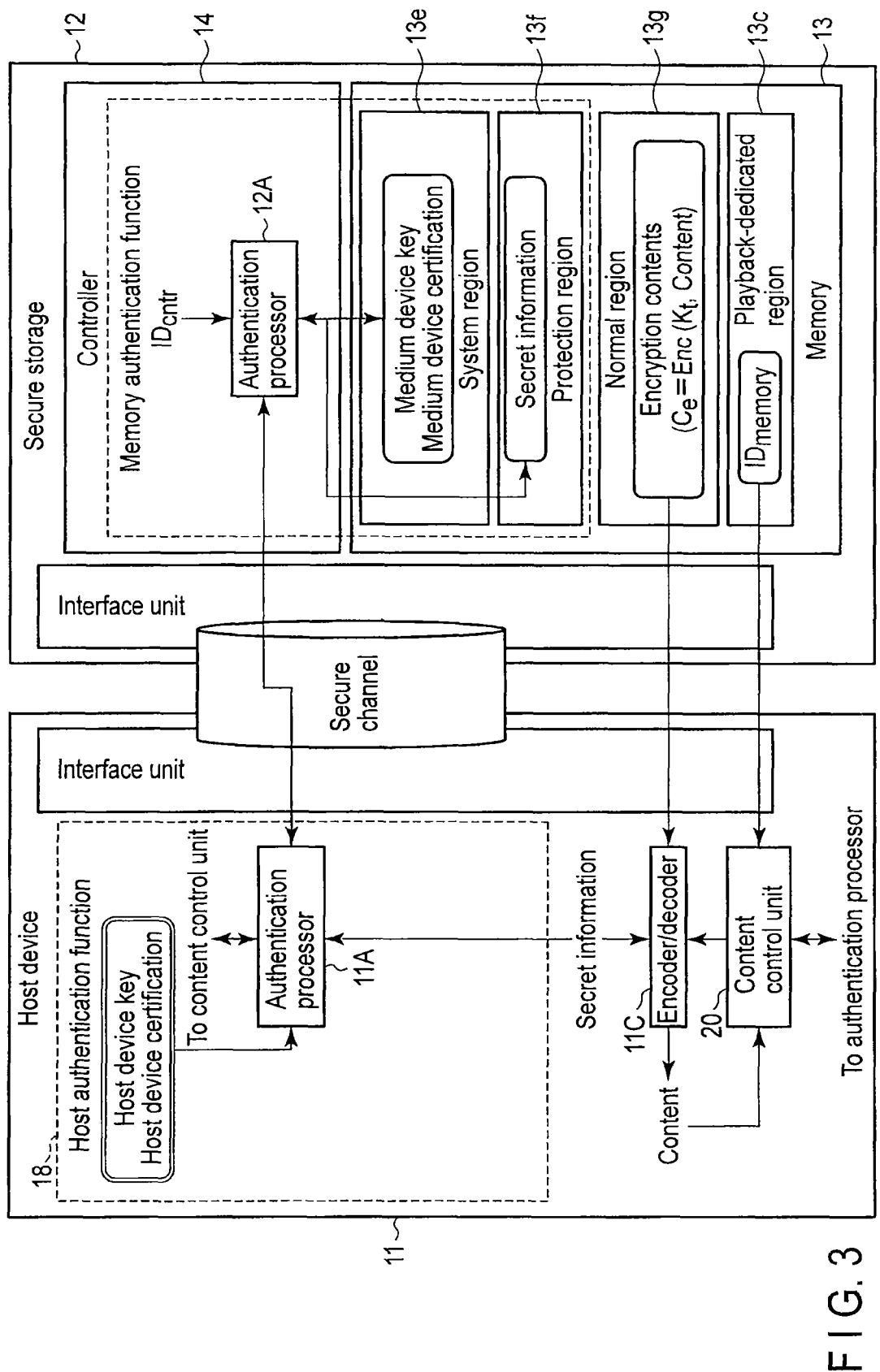
F I G. 3

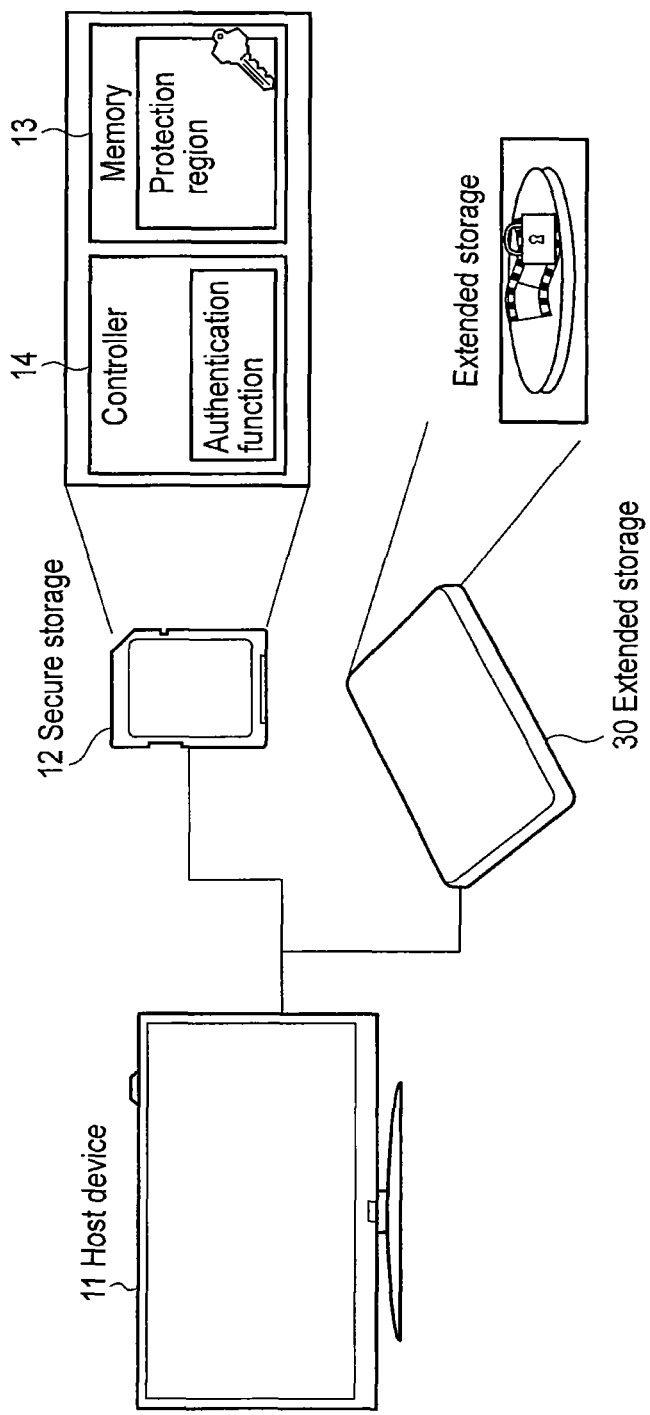
F I G. 5

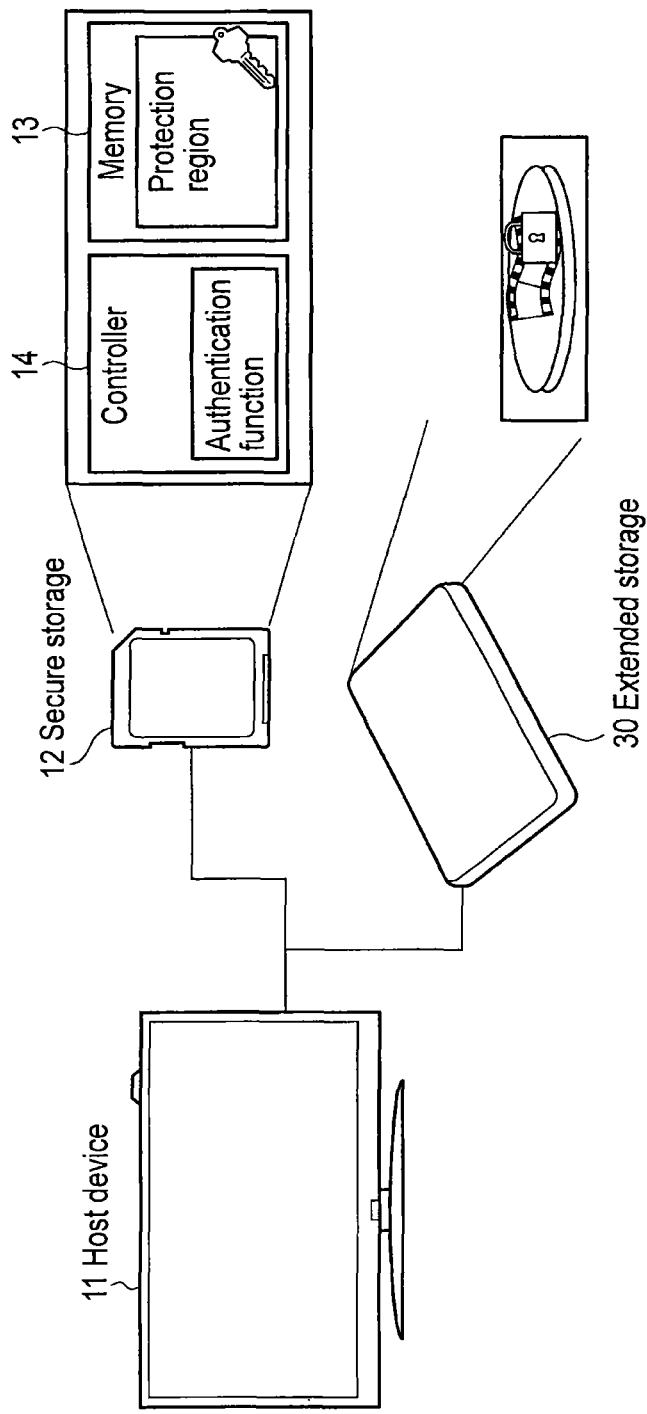
F I G. 6

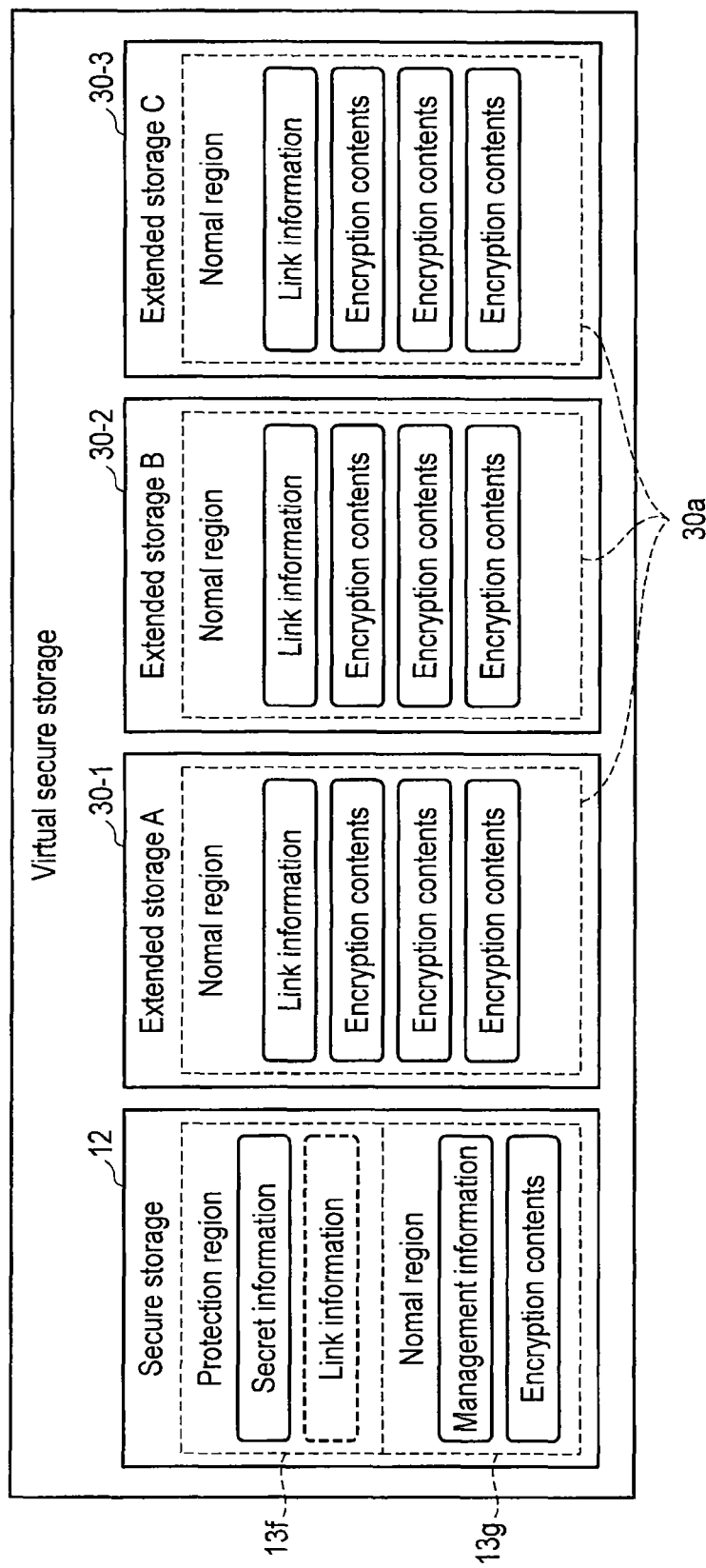
F I G. 10

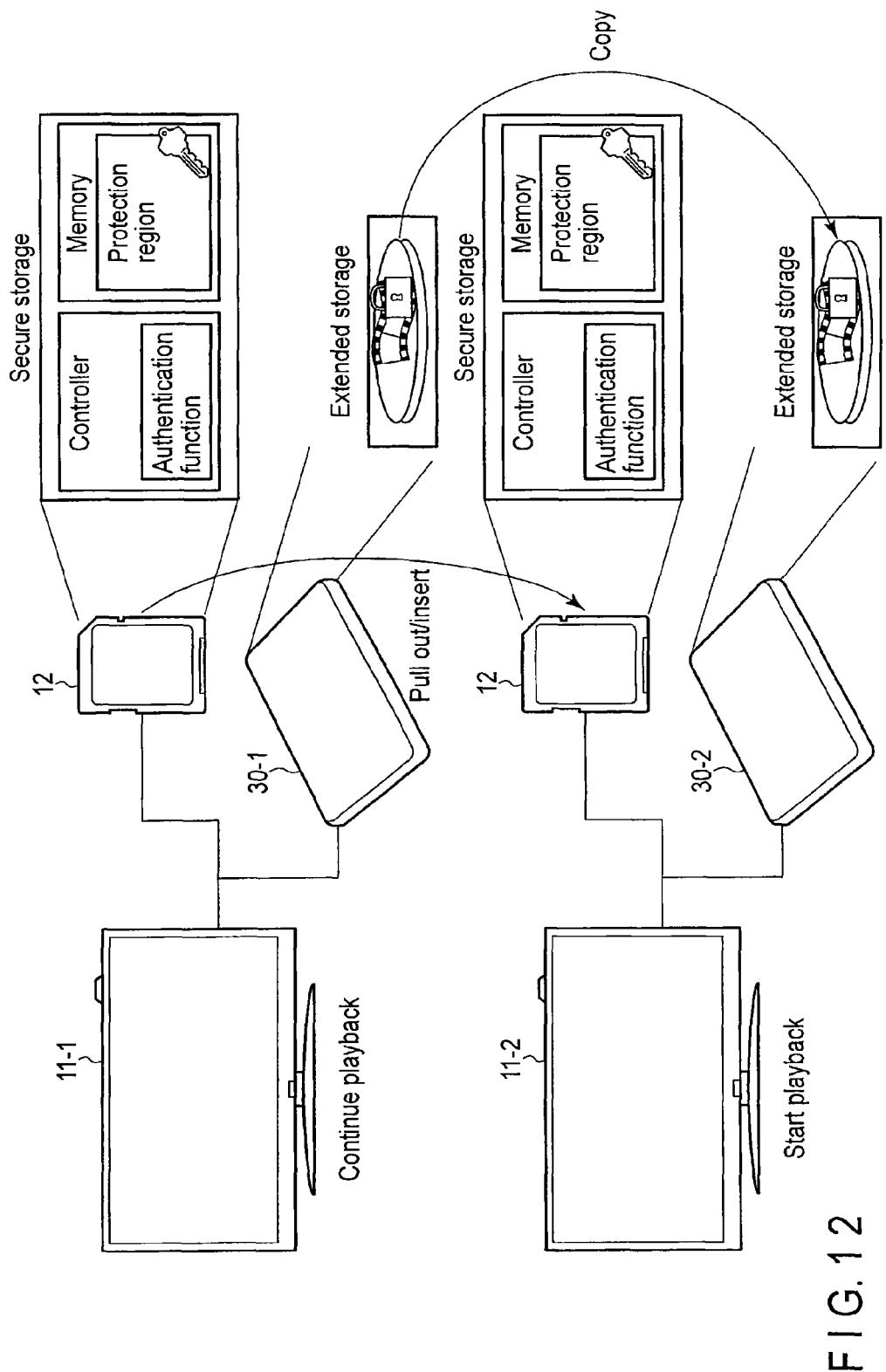
F I G. 12

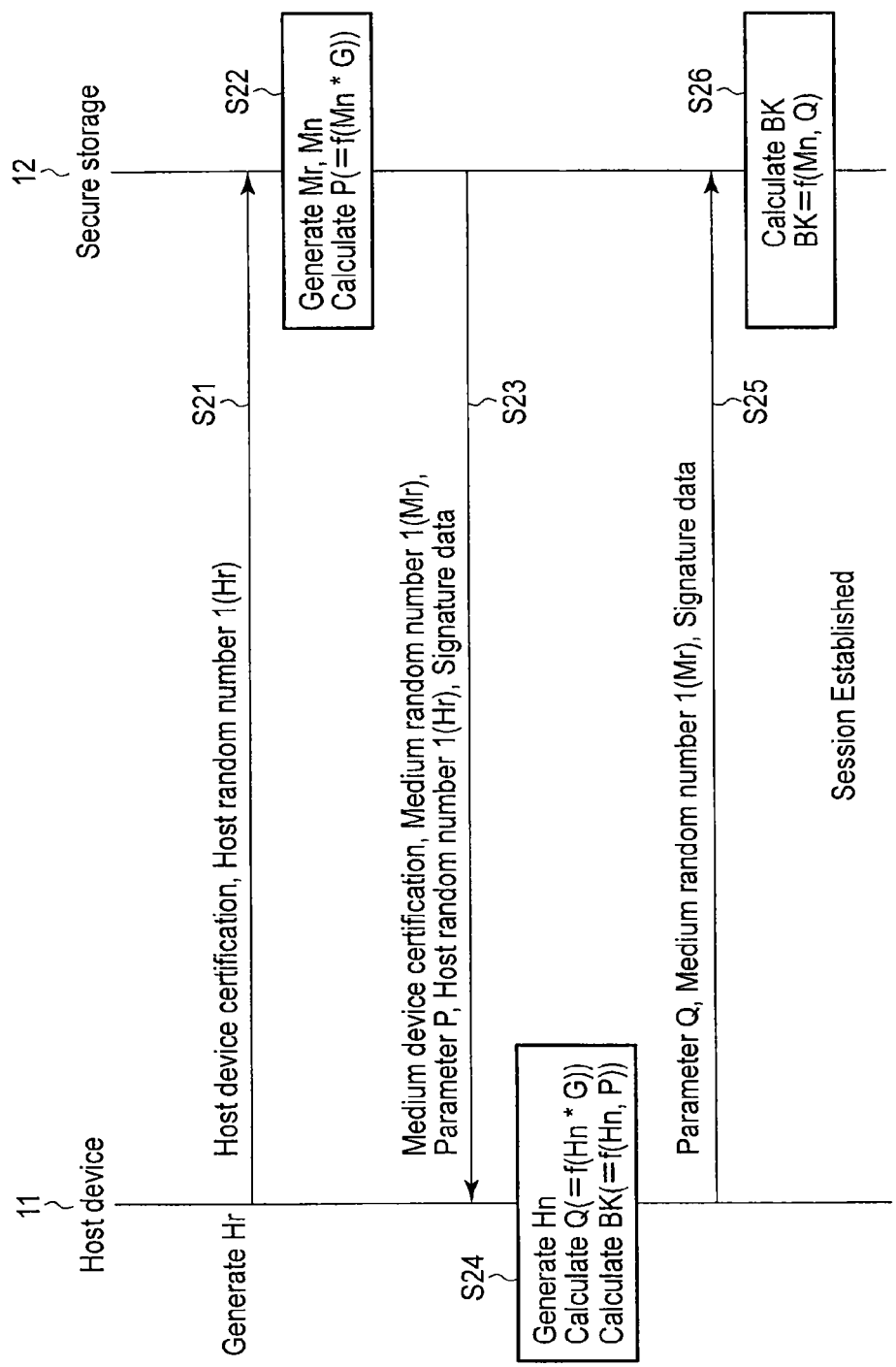
F I G. 15

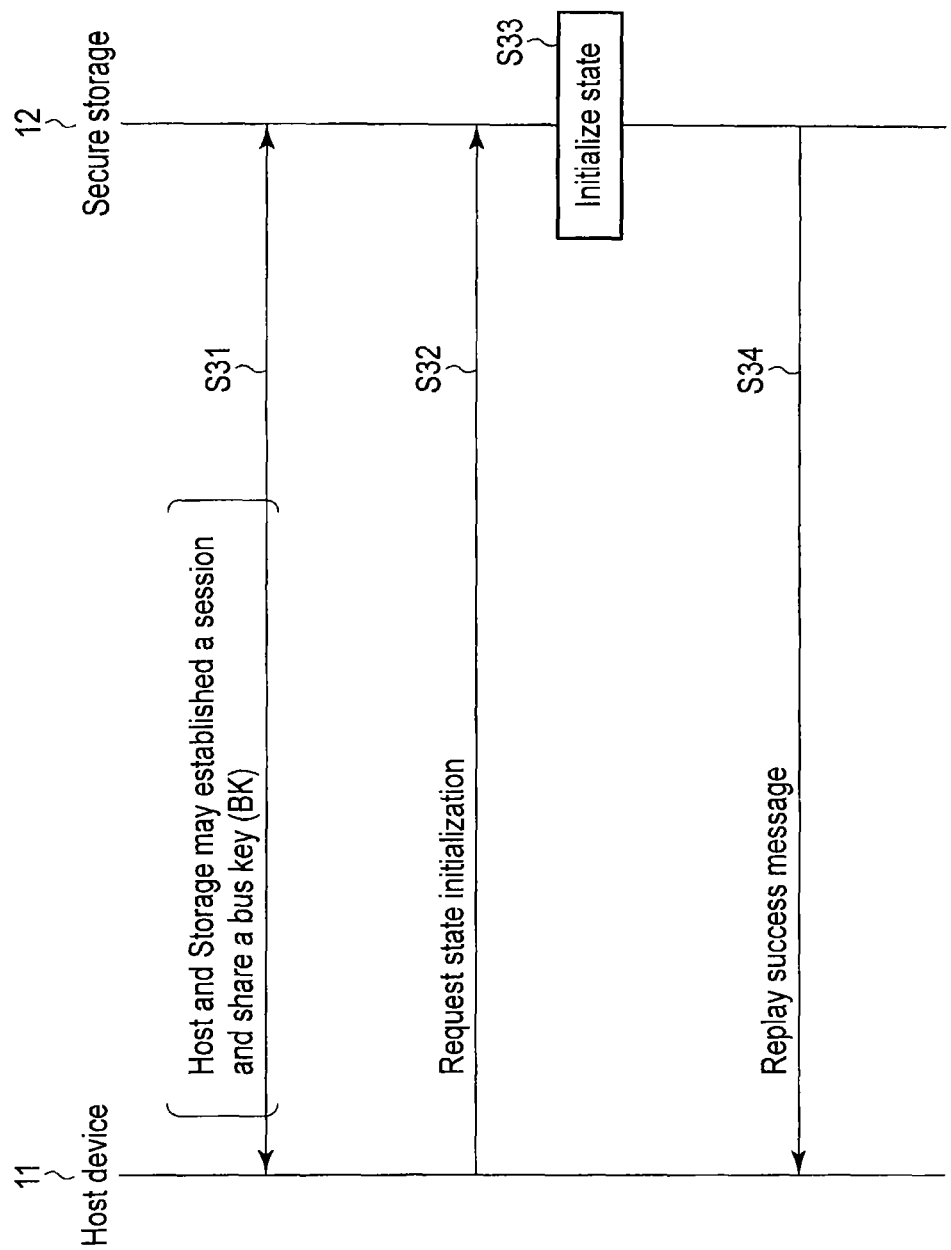
F I G. 16

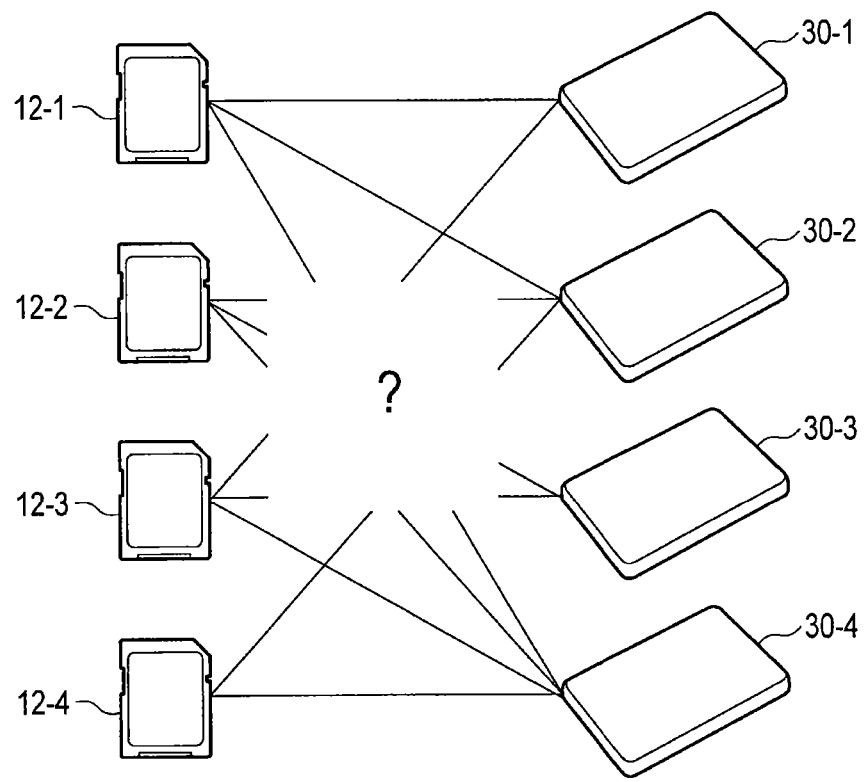
F I G. 19

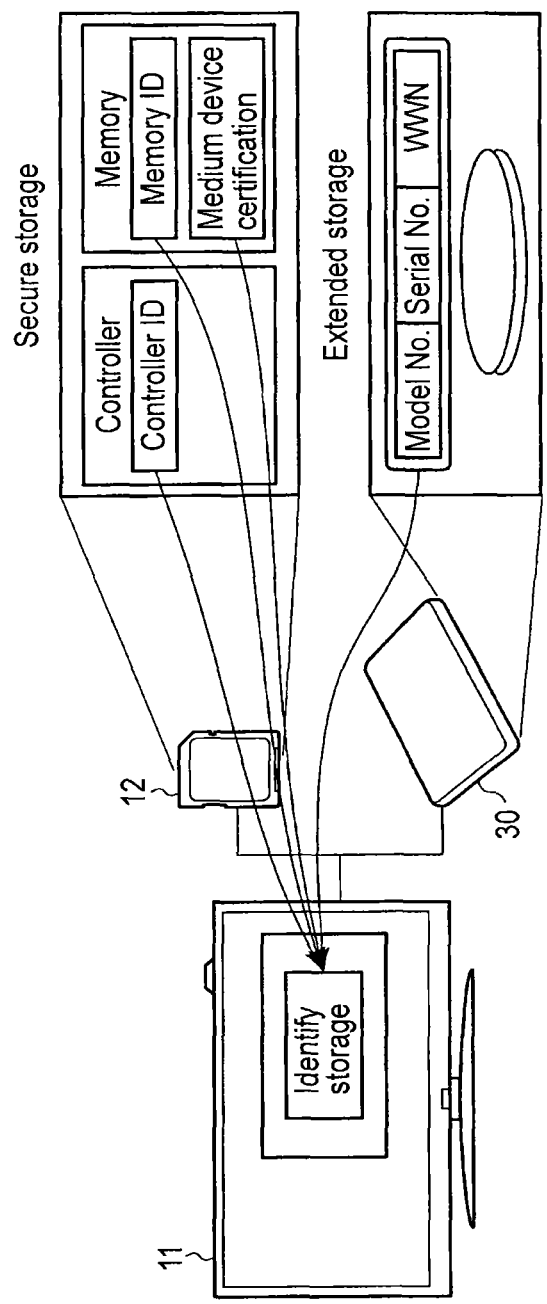
F I G. 20

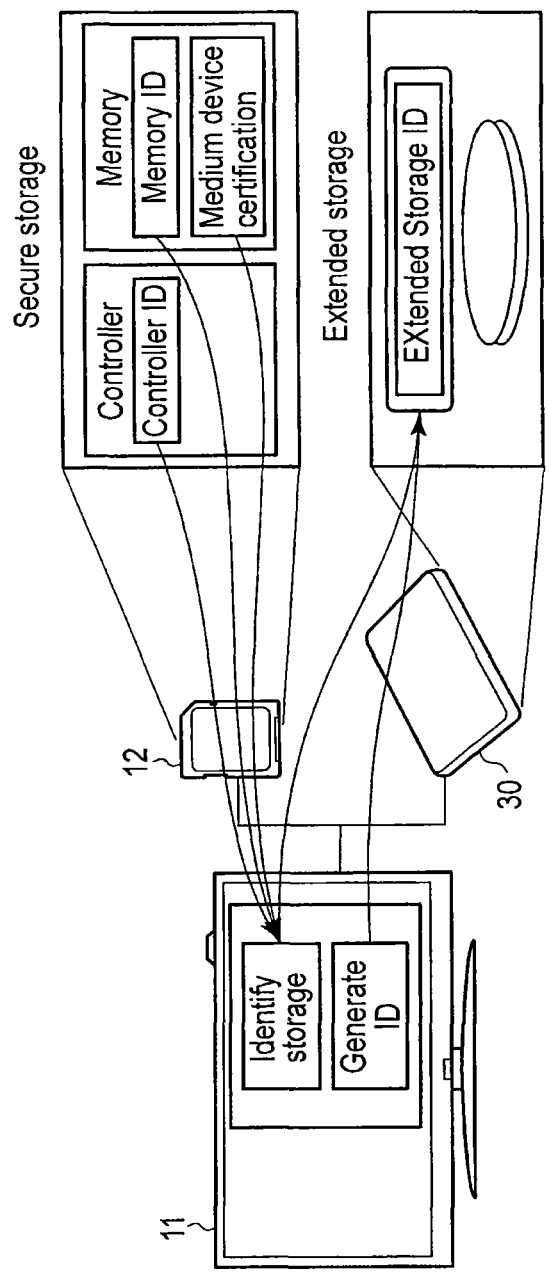
F I G. 21

FIG. 22A

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00h | Version | | | | N | Reserved | | | | | | | | | | |
| 10h | Extended Storage Info #0 | | | | | | | | | | | | | | | |
| 60h | Extended Storage Info #1 | | | | | | | | | | | | | | | |
| ... | ... | | | | | | | | | | | | | | | |
| nnh | Extended Storage Info #N-1 | | | | | | | | | | | | | | | |

FIG. 22B

|  | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 00h | Suffix of Directory | | | | Reserved | | | | | | | | | | | |
| 01h | Serial Number of Linked Extended Storage | | | | | | | | | | | | | | | |
| 02h | Model Number of Linked Extended Storage | | | | | | | | | | | | | | | |
| 03h | | | | | | | | | | | | | | | | |
| 04h | WWN of Linked Extended Storage | | | | | | | | | | | | | | | |

|     | 0 | 1 | 2 | 3 | 4 | 5 | 6 | 7 | 8 | 9 | A | B | C | D | E | F |
|-----|---|---|---|---|---|---|---|---|---|---|---|---|---|---|---|---|
| 00h | Version | | | | N | Reserved | | | | | | | | | | |
| 10h | Secure Media Info #0 | | | | | | | | | | | | | | | |
| 20h | Secure Storage Info #1 | | | | | | | | | | | | | | | |
| ... | ... | | | | | | | | | | | | | | | |
| nnh | Secure Media Info #N-1 | | | | | | | | | | | | | | | |

F I G. 2 3 A

|     | 0 | 1 | 2 | 3 | 4 | 5 | 6 | 7 | 8 | 9 | A | B | C | D | E | F |
|-----|---|---|---|---|---|---|---|---|---|---|---|---|---|---|---|---|
| 00h | Suffix of Directory | | | | Reserved | | | | | | | | | | | |
| 10h | Media ID | | | | | | | | | | | | | | | |

F I G. 2 3 B

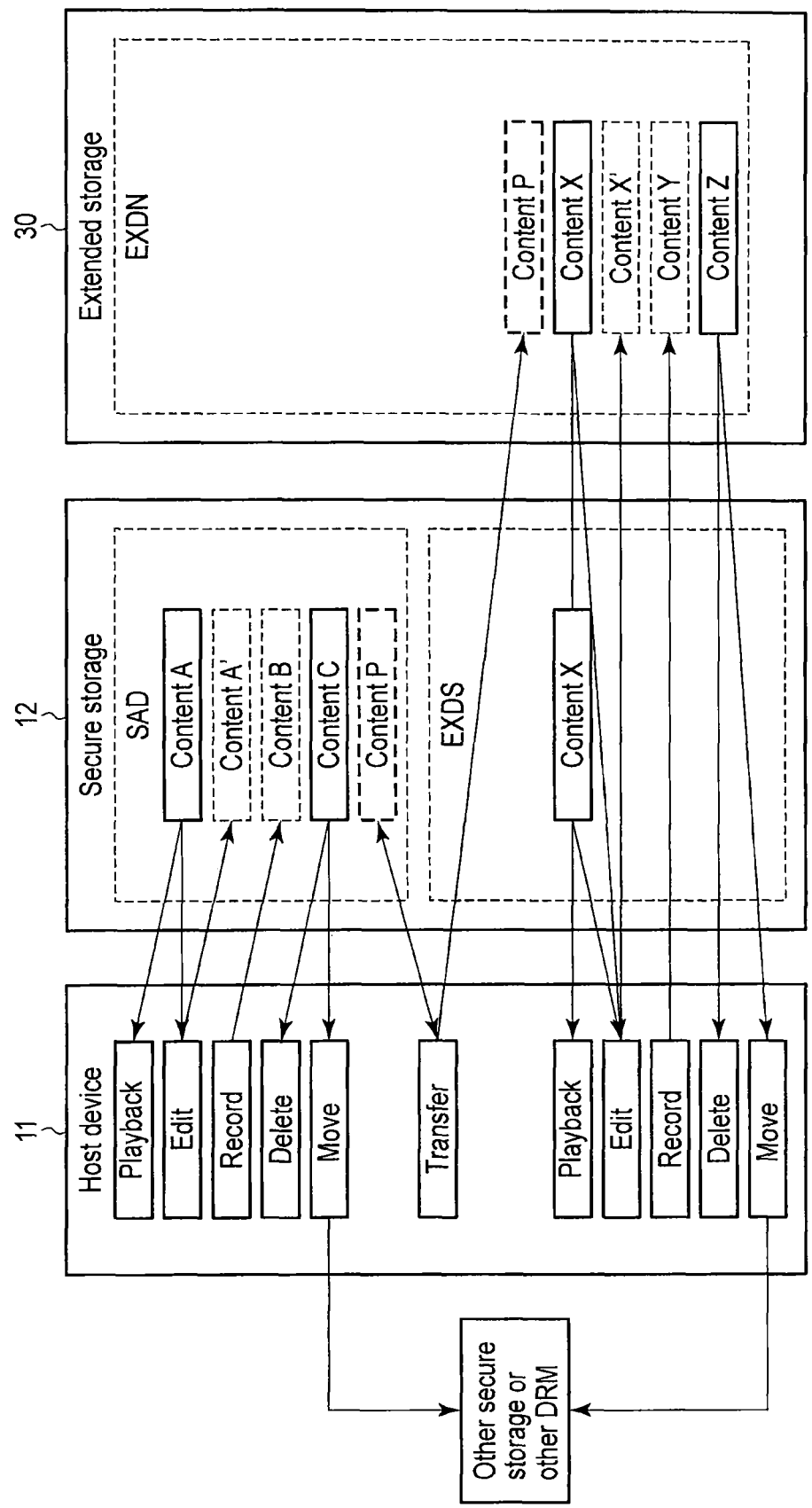
F I G. 26

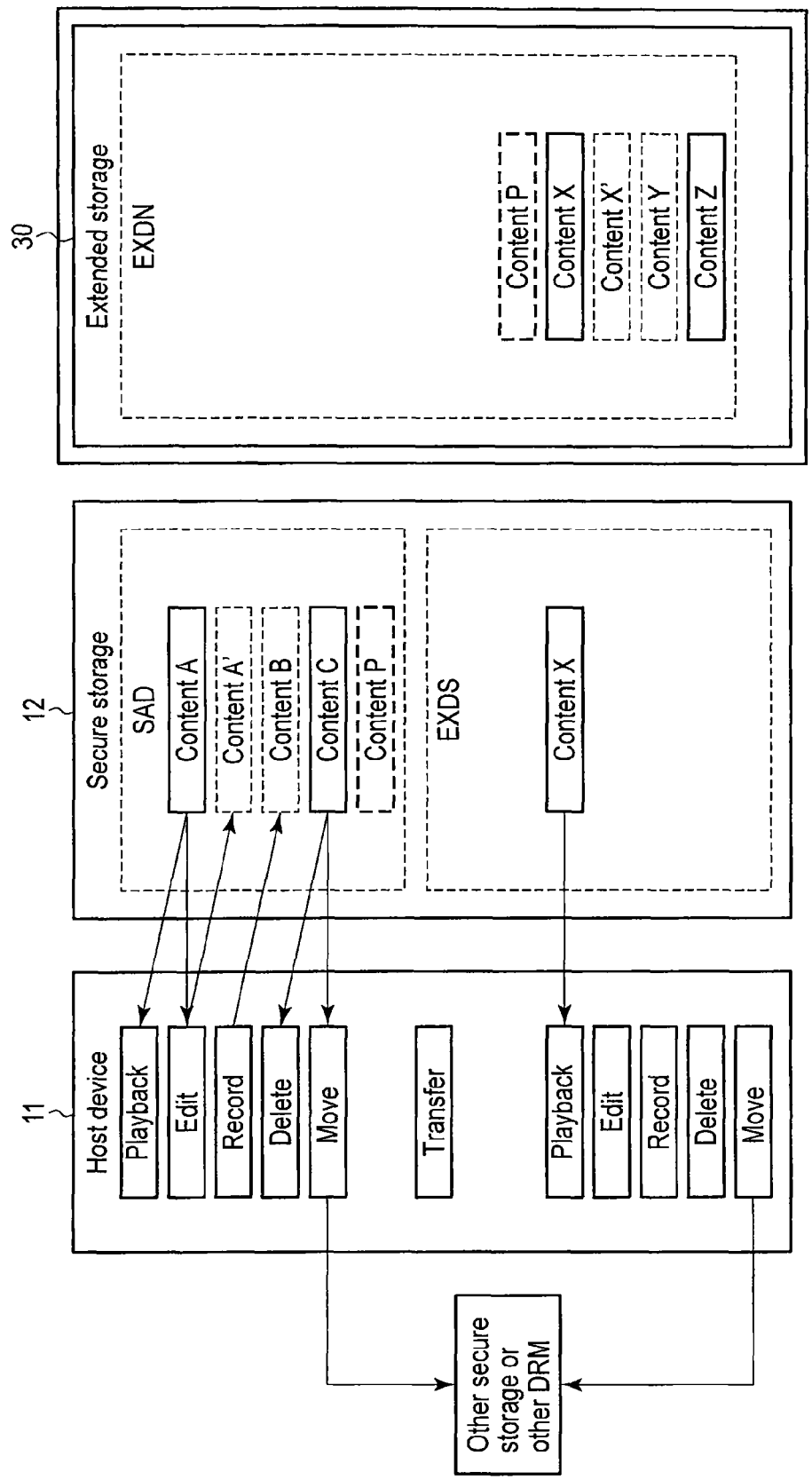
F I G. 27

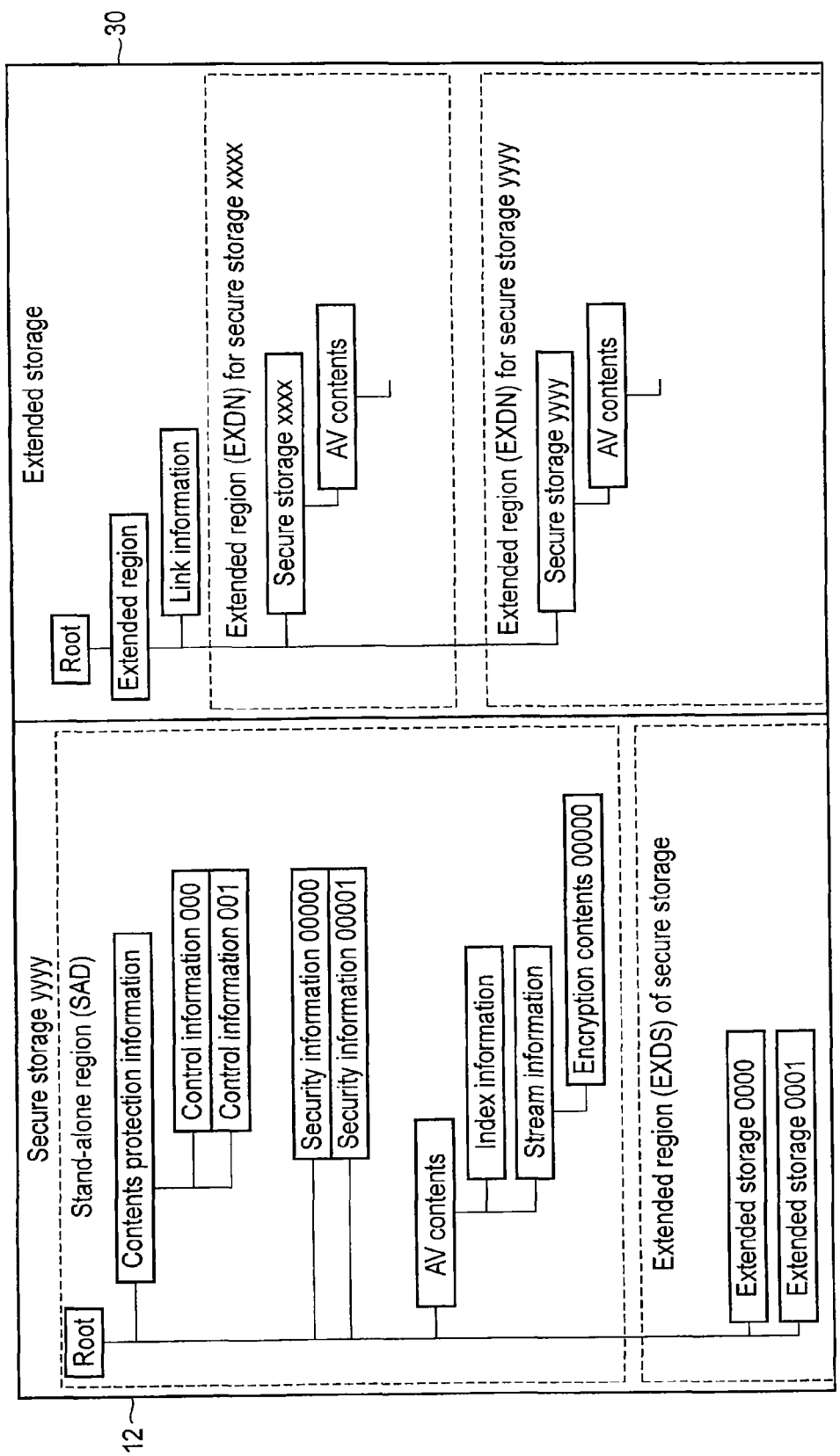
F I G. 31

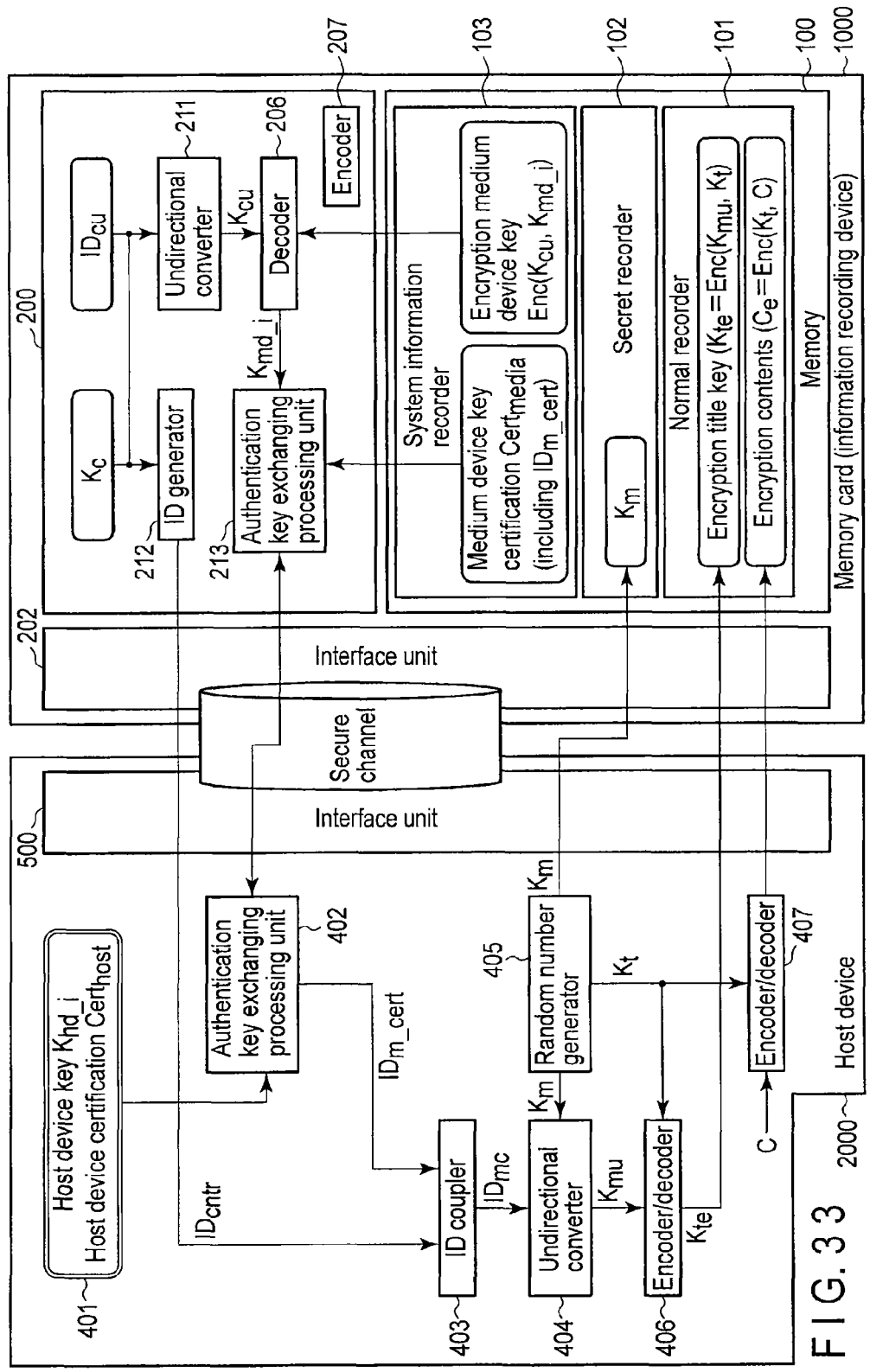
F I G. 33

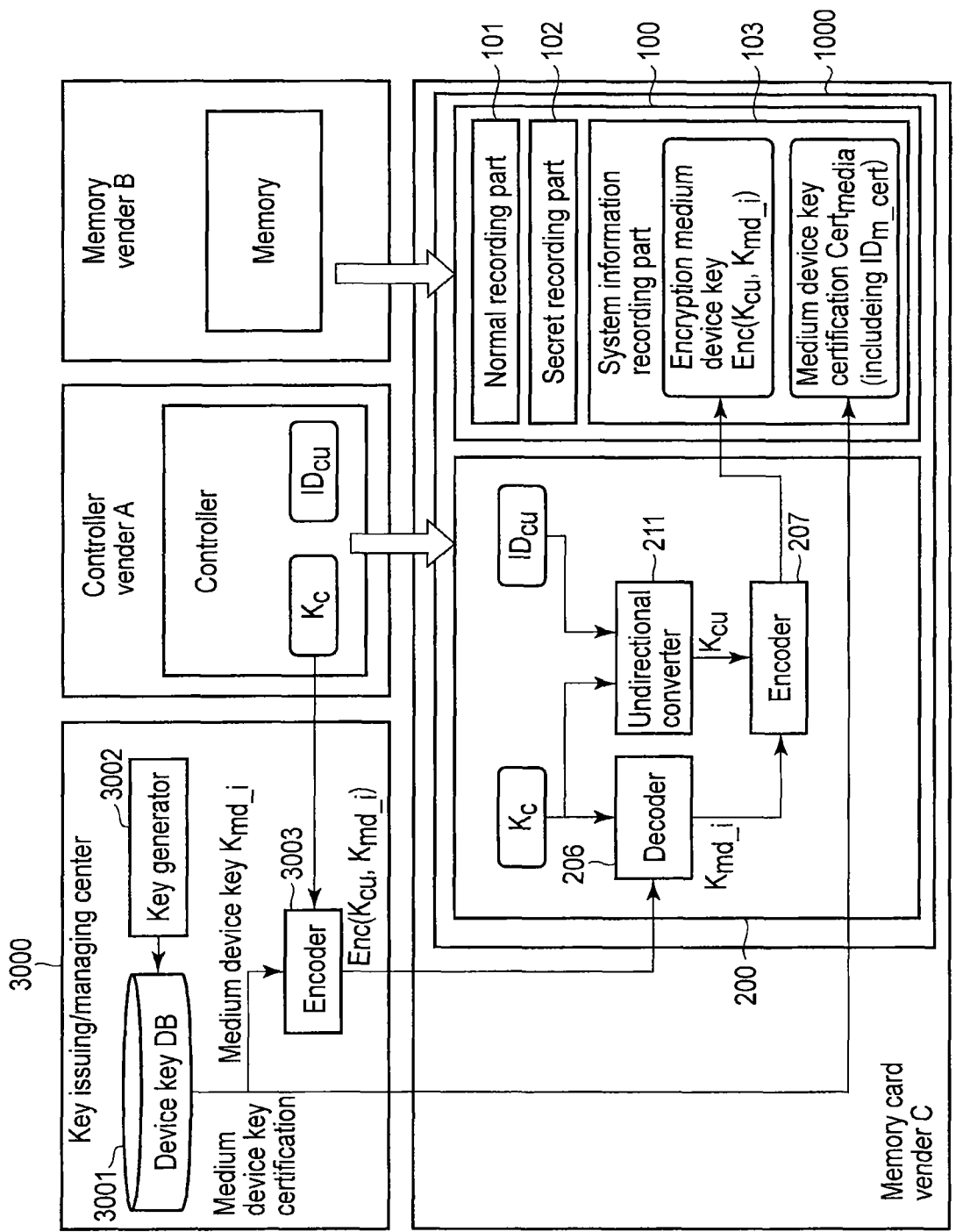
F I G. 34

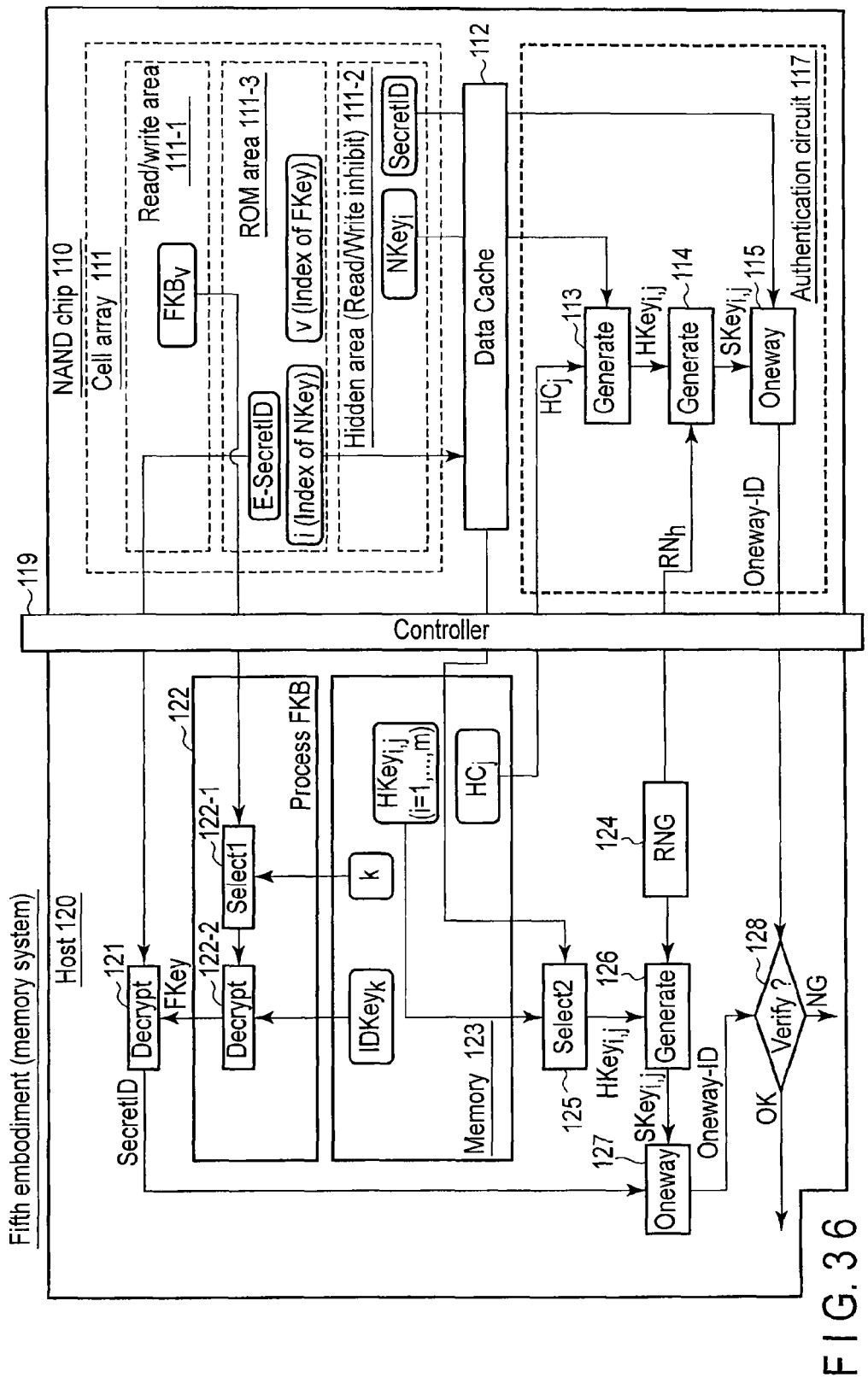
F I G. 36

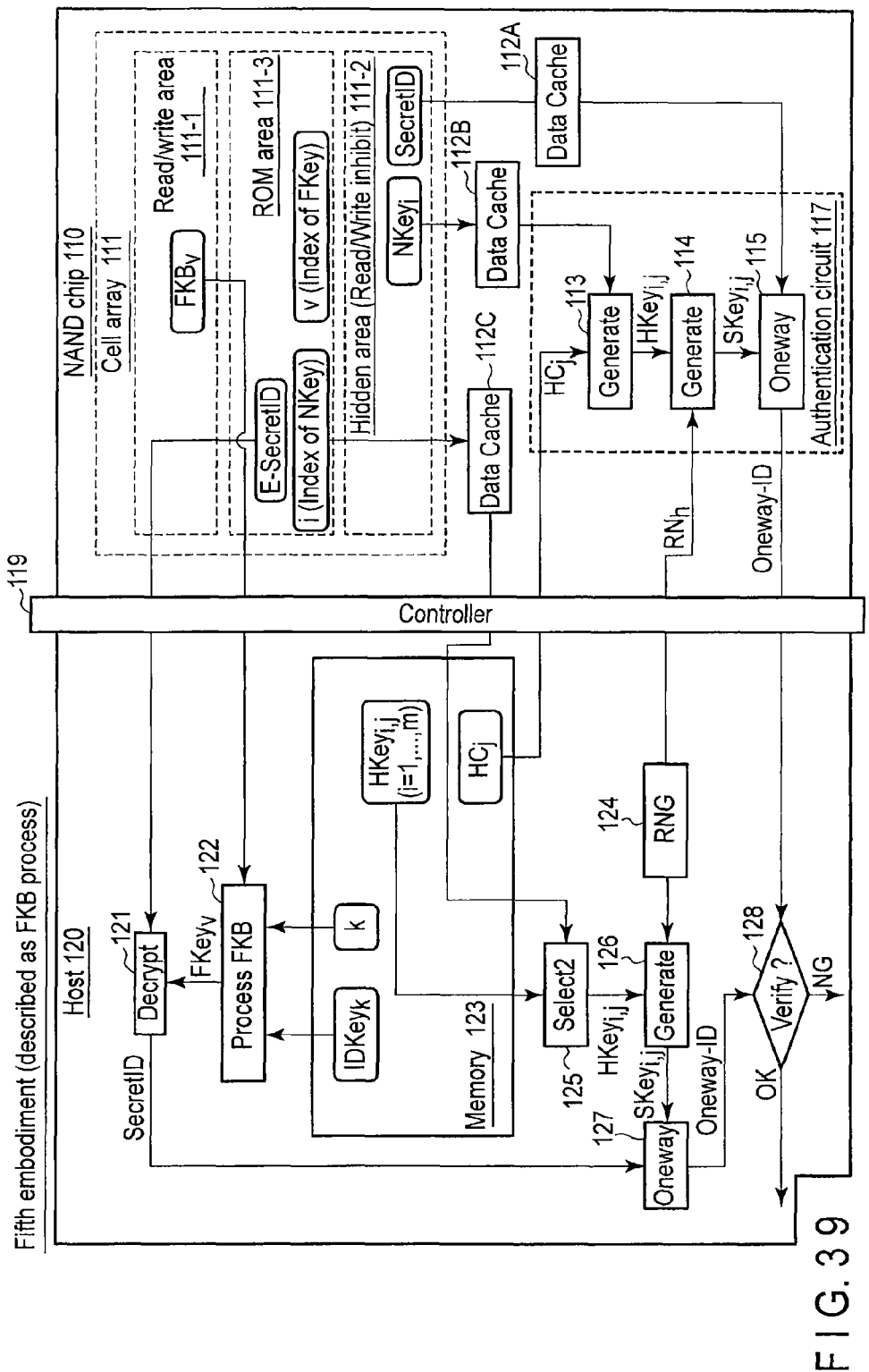
F I G. 39

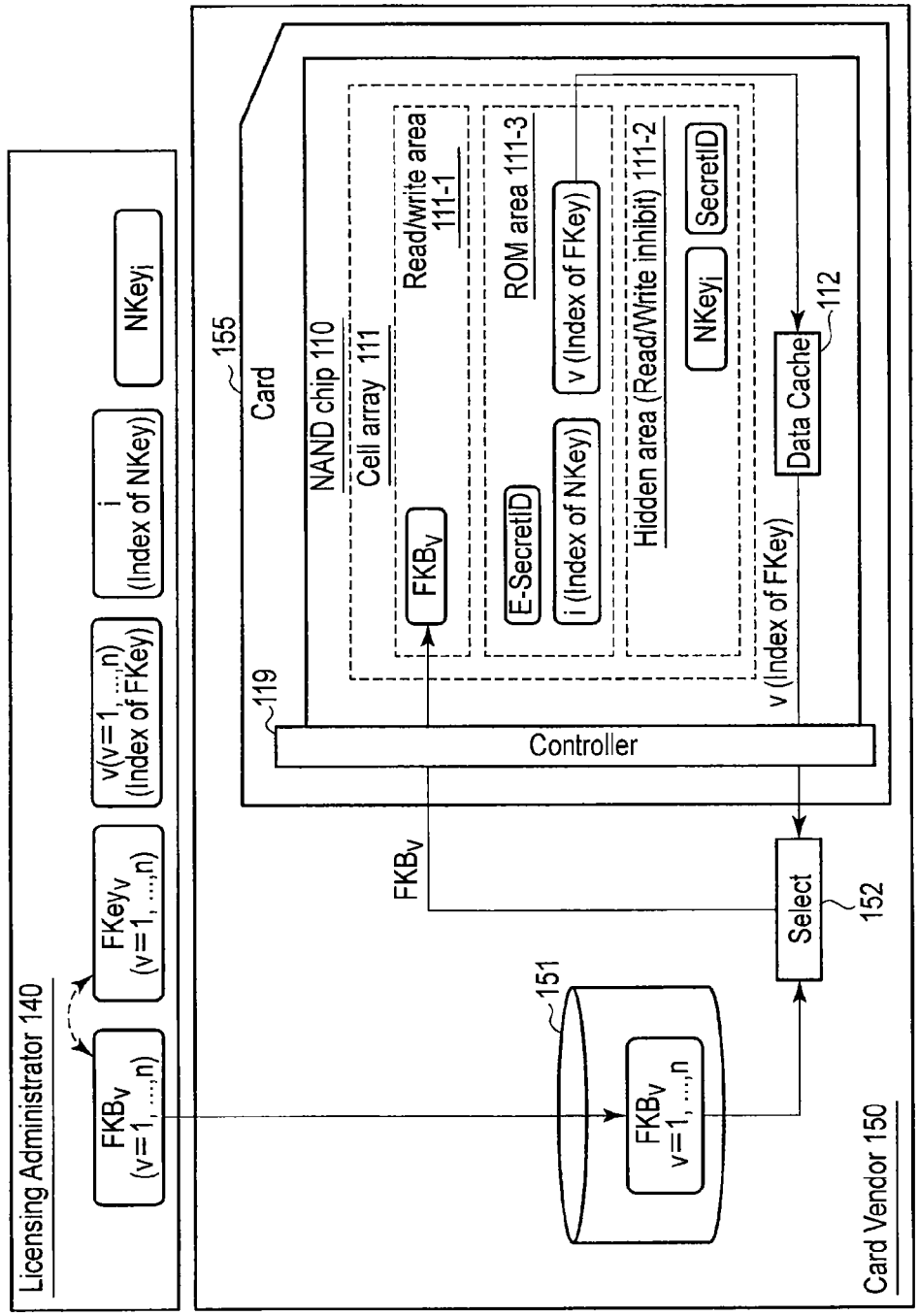
F I G. 4 2

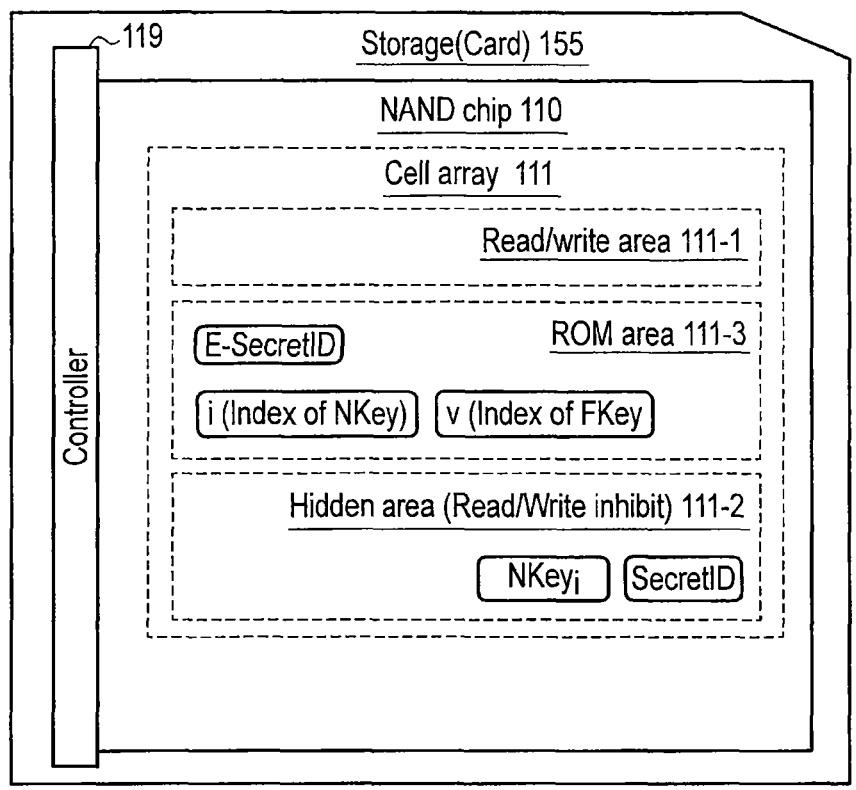
F I G. 44

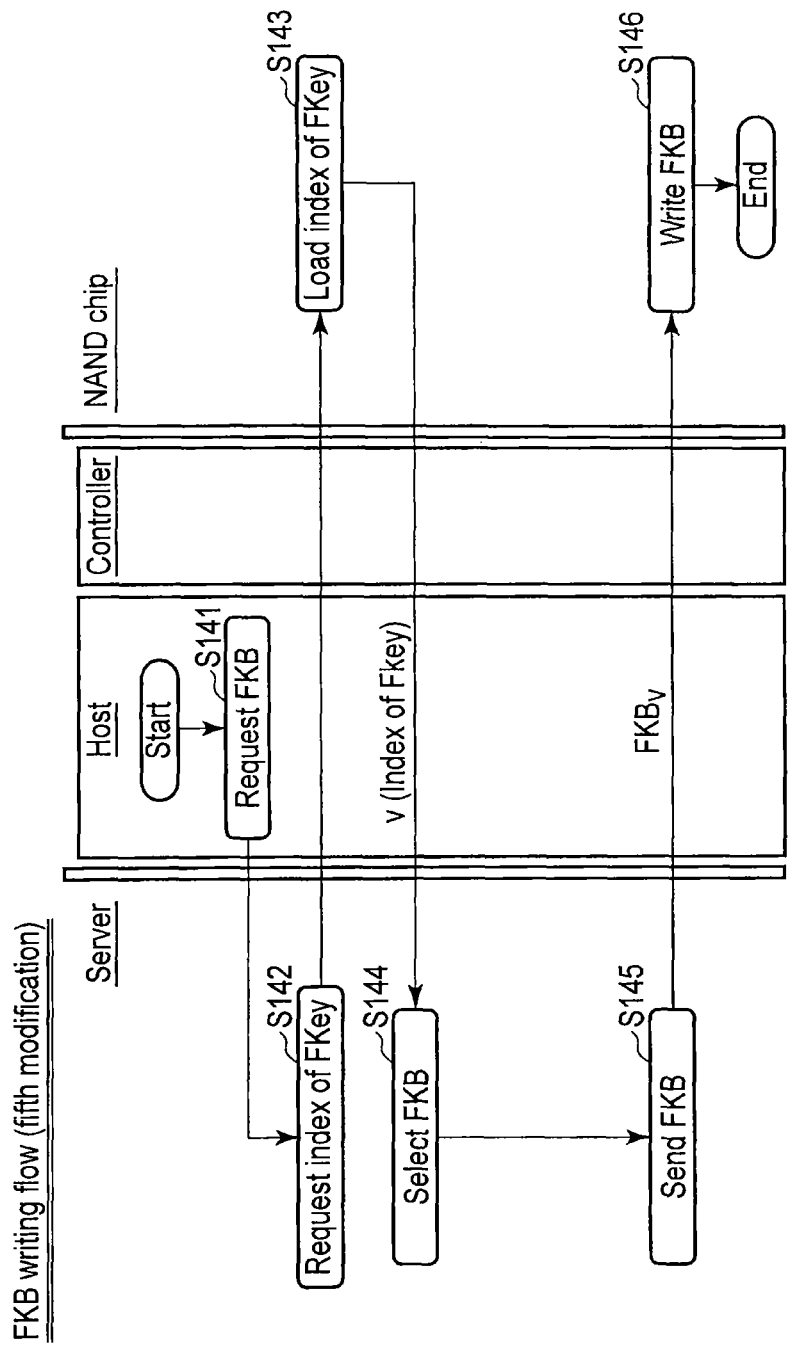
F I G. 46

STORAGE SYSTEM IN WHICH FICTITIOUS INFORMATION IS PREVENTED

CROSS-REFERENCE TO RELATED APPLICATIONS

This application is based upon and claims the benefit of priority from Japanese Patent Application No. 2012-166403, filed Jul. 26, 2012, the entire contents of which are incorporated herein by reference.

FIELD

Embodiments described herein relate generally to a secure storage system for example.

BACKGROUND

Generally, in a field requiring information security, there is employed an authentication technique using mutually shared confidential information and encoding as means for certifying transmission and reception of confidential information and self validity.

An application range of the authentication technique is very wide, and when this technique is applied to a storage device, this technique is used for protecting user's data and protecting a copyright of contents in some cases. As application examples for protecting a copyright of contents, there are known certification of validity of an SD card (registered trademark) as secure storage and CPRM (Content Protection for Recordable Media) for playing back, recording and managing secret information for protecting contents.

BRIEF DESCRIPTION OF THE DRAWINGS

FIG. 2 is a diagram showing an example of a case where contents are recorded from a host device into secure storage;

FIG. 3 is a diagram showing an example of a case where contents in the secure storage are read from the host device;

FIG. 5 is a diagram showing an example of connection between the secure storage and the extended storage;

FIG. 6 is a diagram showing another example of the connection between the secure storage and the extended storage;

FIG. 10 is a diagram showing another example of the data structures in the secure storage and the extended storage;

FIG. 12 is a diagram showing an example of a using method using the secure storage and the extended storage;

FIG. 15 is a diagram showing an example of status check processing of the host device and the secure storage according to the first embodiment;

FIG. 16 is a diagram showing an example of initialization processing according to the first embodiment;

FIG. 19 is a diagram showing an example of a case where the secure storage and the extended storage are used in combination;

FIG. 20 is a diagram showing a first example of identifiers according to a second embodiment;

FIG. 21 is a diagram showing a second example of the identifiers according to the second embodiment;

FIGS. 22A and 22B are diagrams showing an example of link information stored in the secure storage;

FIGS. 23A and 23B are diagrams showing an example of link information stored in the extended storage;

FIG. 26 is a diagram showing an example of a control method of contents according to the third embodiment;

FIG. 27 is a diagram showing a first control method of movement of contents according to the third embodiment;

FIG. 31 is a diagram showing another example of the data structures of the secure storage and the extended storage;

FIG. 33 is a diagram showing a specific example of a controller ID stored in a controller according to a fourth embodiment;

FIG. 34 is a diagram showing a specific example of the controller ID stored in a controller according to the fourth embodiment;

FIG. 36 is a diagram showing an example of a configuration of a memory system according to a fifth embodiment;

FIG. 39 is a diagram showing an example of a configuration of a memory system when an MKB technique is applied;

FIG. 42 is a diagram showing a case where a card vendor writes the key management information;

FIG. 44 is a diagram showing an example of a storage medium in which the key management information is not stored;

FIG. 46 is a diagram showing a case where an encoded FKeyID batch is downloaded and stored.

DETAILED DESCRIPTION

In general, according to one embodiment, a storage system includes a host device, a secure storing medium, and a non-secure storing medium. The secure storing medium includes: a memory provided with a protected first storing region which stores secret information sent from the host device, and a second storing region which stores encoded contents; and a controller which carries out authentication processing for accessing the first storing region. The host device and the secure storing medium produce a bus key which is shared only by the host device and the secure storing medium by authentication processing, and which is used for encoding processing when information of the first storing region is sent and received between the host device and the secure storing medium. The host device has the capability to request the secure storing medium to send a status. The secure storing medium produces a message authentication code based on the bus key in reply to the sending request of the status, and the host device verifies validity of the message authentication code based on the bus key.

Embodiments will be described with reference to the drawings. In the embodiments, the same members are designated with the same symbols.

Configurations of a host device and secure storage, as well as an authentication method will be described using FIGS. 1 to 3.

Figure 1:
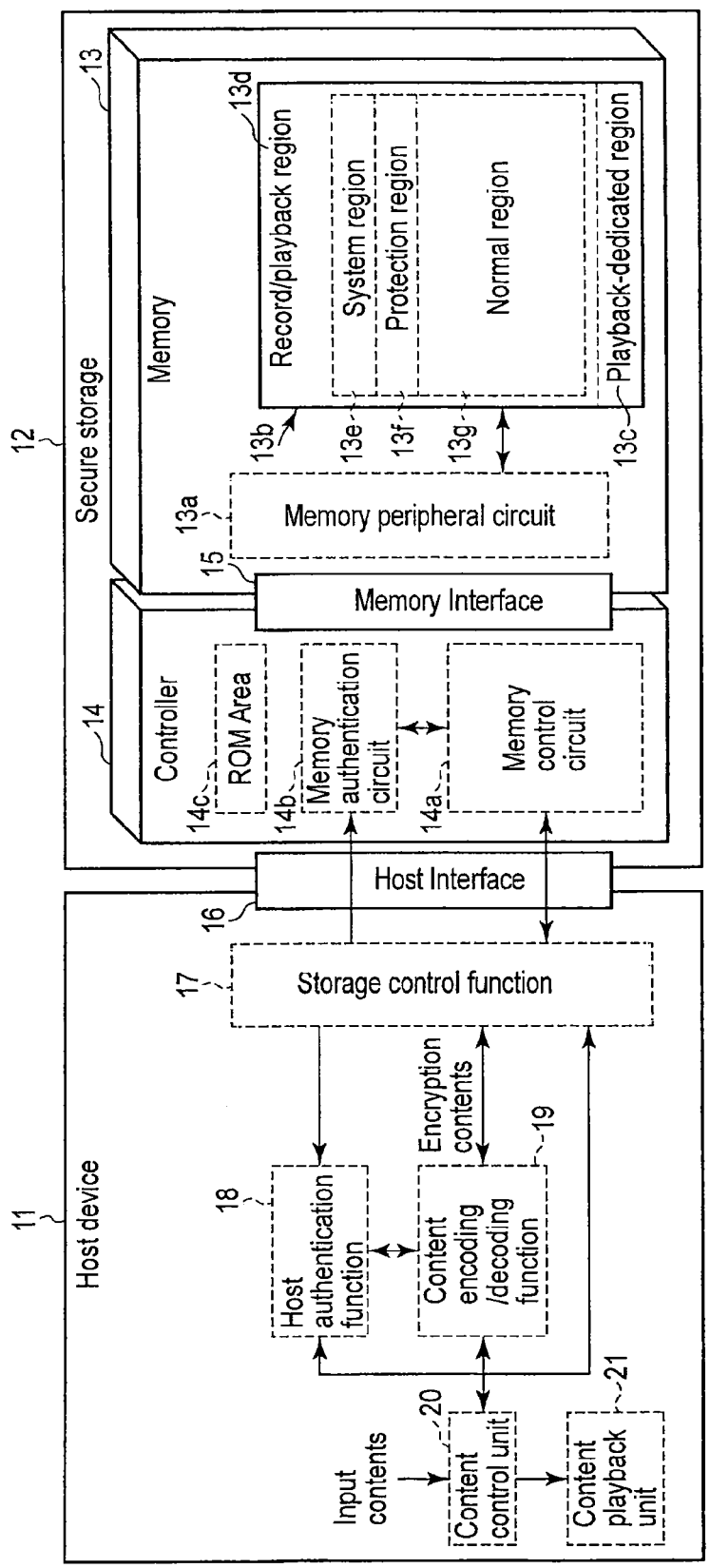
FIG. 1 is a diagram schematically showing a storage system to which an embodiment is applied.

FIG. 1 schematically shows a storage system to which the embodiment is applied, and shows the configurations of the host device 11 and the secure storage 12.

As the secure storage 12, a memory card such as a SD card and a hard disk (HDD, hereinafter) can be applied. The secure storage 12 includes a memory 13 and a controller 14 for controlling the memory 13. Examples of the memory 13 are a NAND flash memory and the HDD. A function required for the controller 14 varies in accordance with types of memories.

The memory 13 and the controller 14 are manufactured by the same vendor or by independent vendors depending upon a case.

The memory 13 is classified into a memory peripheral circuit 13a and a data holding region 13b as a storing section. The data holding region 13b is classified into a playback-dedicated region 13c and a record/playback region 13d.

Later-described contents such as image are stored in the playback-dedicated region 13c for example.

The record/playback region 13d includes a system region 13e in which system information is stored, a protection region 13f in which secure data such as content key is stored, and a normal region 13g in which data such as encoded contents are stored.

The memory peripheral circuit 13a carries out access control of data with respect to the data holding region 13b, and memory interface control corresponding to memory interface between the controller 14 and the memory 13.

When the memory 13 is a HAND flash memory, the interface is a NAND interface, and when the memory 13 is a HDD, the interface is a SATA interface.

The controller 14 includes a memory control circuit 14a, an authentication circuit 14b and a ROM Area 14c. The memory control circuit 14a controls the memory 13 through a memory interface 15.

Here, the memory control circuit 14a also carries out host interface control which corresponds to an interface between the host device 11 and the controller 14.

The memory authentication circuit 14b carries out processing concerning authentication between the secure storage 12 and the host device 11.

The host interface 16 is a SD interface when the secure storage 12 is a SD card, and is a USB or network interface when the secure storage 12 is a HDD.

The host device 11 is a television receiver or a personal computer for example, but the host device 11 is not limited to them.

The host device 11 includes a storage control function 17 for controlling the secure storage 12 through a host interface 16. The host device 11 reads data, records data and carries out authentication between the host device 11 and the secure storage 12 through this function.

The host device 11 includes a host authentication function 18 which carries out authentication between the host device 11 and the memory authentication circuit 14b, a content encoding/decoding function 19 for encoding/decoding contents, a content control unit 20 for controlling playback and recording operations of contents, and a content playback unit 21 for playing contents back.

Next, an example of the authentication method between the host device 11 and the secure storage 12 will be described using FIGS. 2 and 3.

FIG. 2 shows an example of a case where contents are recorded in the secure storage 12 from the host device 11.

The host device 11 includes a pair of a host device key and a host device certification. The secure storage 12 includes a medium device key and a medium device certification in a system region of the memory 13.

Here, the device keys and the device certifications have structures based on public key encoding. More specifically, a device public key corresponding to the device key is included in the device certification, and devices which authenticate exchange the device public keys with each other to authenticate. These public keys are exchanged by an authentication processor 11A of the host device 11 and an authentication processor 12A of the secure storage 12. An authentication step between the authentication processors will be described later.

The device certification includes a device ID and an electronic signature for certifying validity of a certification. If the authentication is established, the host device 11 can access the protection region 13f in the secure storage 12.

Secret information prepared by a secret information preparing unit 11B of the host device 11, e.g., a content key used for encoding of contents is recorded in the protection region 13f of the memory 13.

Secret information is used for an encoding/decoding (encrypting/decrypting) operation of contents, encoded contents encoded by an encoder/decoder (encryptor/decrypter) 11C are recorded in the normal region 13g in the secure storage 12.

The content control unit 20 controls all of processing of the authentication processor 11A, processing of the encoder/decoder 11C which encodes contents, and processing of the secret information preparing unit 11B.

The secure storage 12 may include a controller ID (IDcntr) as controller unique information which is attendant on the controller 14. The controller ID may be supplied to the host device 11 through the authentication processor 12A.

The secure storage 12 may include a memory ID (ID-memory) as memory unique information recorded in a playback-dedicated region 13c of the memory 13 or the like. The memory ID may be supplied to the host device 11 through the authentication processor 12A or without through the authentication processor 12A.

The secure storage 12 includes all of or some of a controller ID, a memory ID and a device ID, or combination information thereof as information capable of identifying individual secure storage.

(Secure Storage and Extended Storage)

FIG. 3 shows an example of a case where contents in the secure storage are read from the host device. Like the method described with reference to FIG. 2, if the authentication is established, the host device 11 can access the protection region 13f in the secure storage 12.

The host device 11 reads secret information recorded in the protection region 13f. Further, the host device 11 reads encoded contents recorded in the normal region 13g. The secret information and the encoded contents are processed by the encoder/decoder 11C and decoded contents are obtained. The content control unit 20 controls all of the authentication processing, and content decoding processing.

Figure 4:
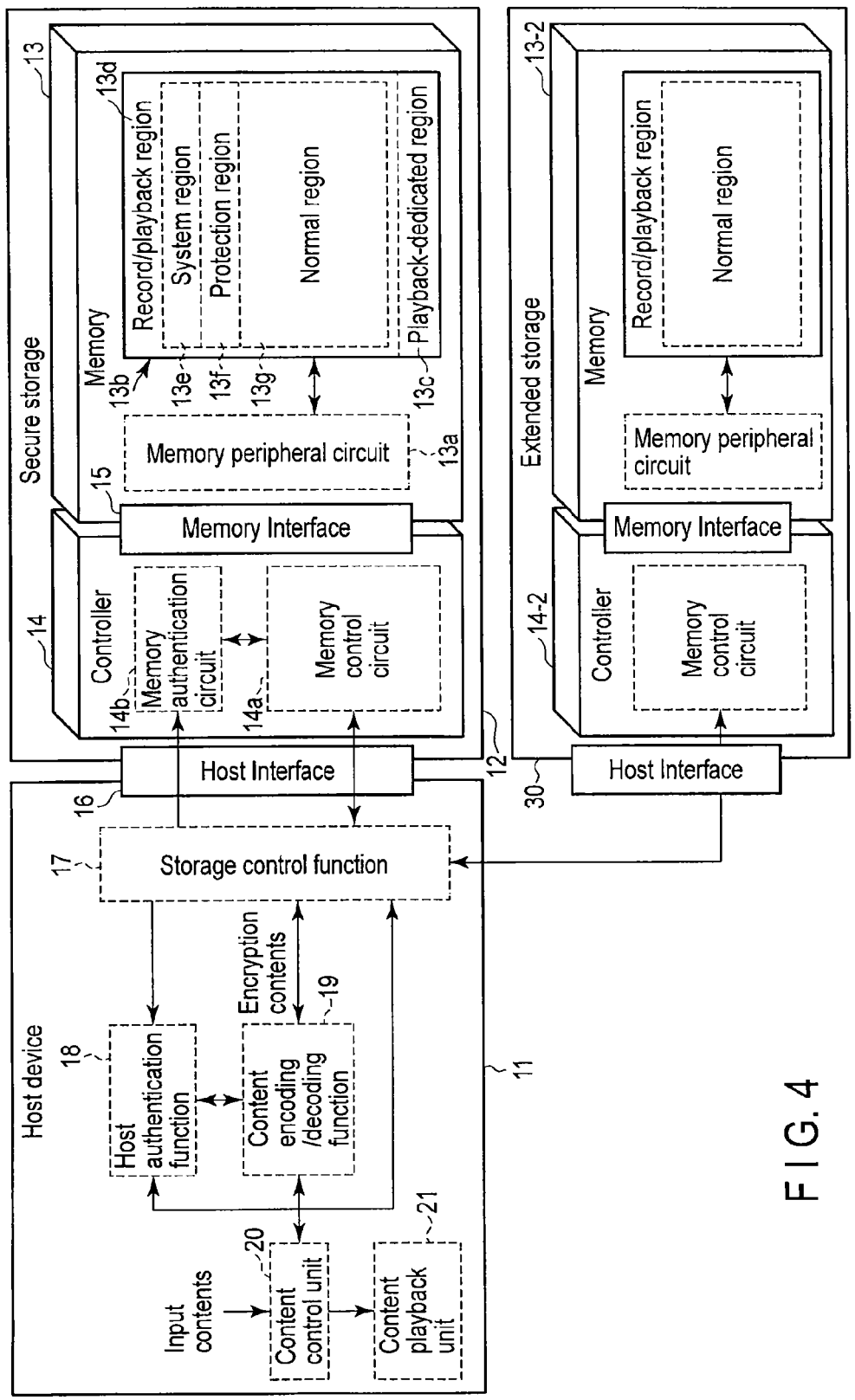
FIG. 4 is a diagram showing an example of a configuration in which the host device, the secure storage and extended storage are combined.

FIG. 4 shows a configuration in which the host device 11, the secure storage 12 and extended storage 30 are combined.

The host device 11 and the secure storage 12 have the same configurations as those shown in FIG. 1. The extended storage 30 has a configuration similar to that of the secure storage 12, but the extended storage 30 is non-secure storage which does not include the memory authentication circuit and the protection region.

The secure storage 12 and the extended storage 30 are connected to the host device 11.

This configuration is based on an assumption that the secure storage 12 is a SD card and the extended storage is a HDD.

Generally, a storage capacity of the SD card is as small as 1/10 to 1/100 of the HDD. When video contents are recorded in a SD card as the secure storage 12, the number of recordable contents is limited due to constraints of the storage capacity. Hence, if the HDD is connected to the host device 11 as the extended storage 30 and a record/playback region in the extended storage 30 is combined with a record/playback region of the SD card and used, the recording region of contents can largely be increased.

It is also possible to select a HDD as the secure storage 12 of course. In this case, although the constraints of the storage capacity are moderated, a form size is increased. In recent years, a utilizing scene of video contents is increased, and it becomes general not only to watch TV but also to watch video contents on a smartphone and a mobile terminal such as a tablet terminal. A storage having small form size is suitable for watching on a mobile terminal. Hence, a HDD having a large form size as compared with a SD card is not suitable for the mobile terminal.

Based on such a background, the embodiment proposes to satisfy both the storage capacity and the form size by combining the secure storage 11 and the extended storage 30.

(First Connecting Method Between Secure Storage and Extended Storage)

FIG. 5 shows a first connecting method between the secure storage 12 and the extended storage 30. In this example, the host device 11 is a television set for example, the secure storage 12 is a SD card for example, and the extended storage 30 is a HDD (USB-HDD) which can be connected through USB for example. In the following description, the host device 11 is also called a television set 11, the secure storage 12 is also called a SD card 12, and the extended storage 30 is also called an USB-HDD 30.

The television set 11 includes a SD card slot through which the television set 11 is connected to the SD card 12, and also includes a USB connection terminal through which the USB-HDD 30 is connected to the television set 11 as a USB device. The SD card 12 and the USB-HDD 30 are connected to the television set 11 using these connection interfaces.

In this example, secret information such as a key is recorded in the SD card 12, and encoded contents are recorded in the USB-HDD 30. By combining these information sets, the television set 11 can playback the contents.

FIG. 5 shows that encoded contents are recorded in the USB-HDD 30, but the embodiment is not limited to this, and the encoded contents may be recorded in the SD card 12. The number of encoded contents is not limited to one and may be two or more.

(Second Connection Method Between Secure Storage and Extended Storage)

FIG. 6 shows a second connection method between the secure storage 12 and the extended storage 30. In this example, the USB-HDD 30 as the extended storage includes a SD card slot through which the SD card 12 as the secure storage is connected to the USB-HDD 30. The television set 11 as the host device includes a USB connection terminal through which the USB-HDD 30 is connected to the television set 11.

The SD card 12 is connected to the USB-HDD 30 and the USB-HDD 30 is connected to the television set 11 using these connection interfaces. Secret information such as a key is recorded in the SD card 12, and encoded contents are recorded in the USB-HDD 30. The television set 11 can playback contents by combining these information sets.

The USB-HDD 30 includes a function for accessing the protection region and the normal region in the SD card 12. More specifically, the USB-HDD 30 includes a bridge controller (not shown) for converting the SD interface into a USB interface.

(Combination of Secure Storage and Extended Storage)

The secure storage 12 and the extended storage 30 can be combined variously.

Figure 7B:
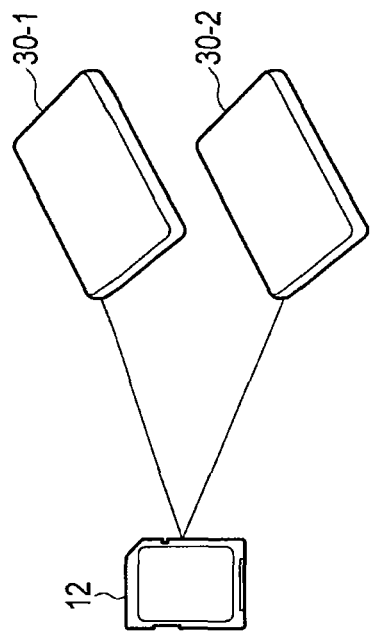
FIGS. 7A, 7B and 7C are diagrams showing examples of combination of the secure storage and the extended storage.
Figure 7C:
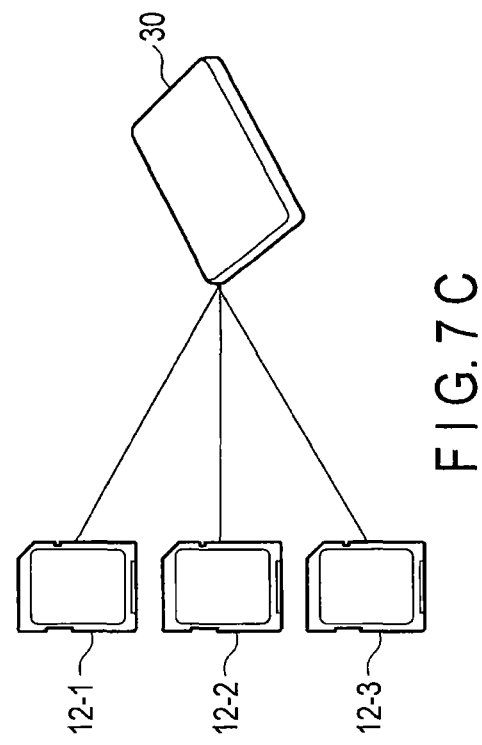
Figure 7A:
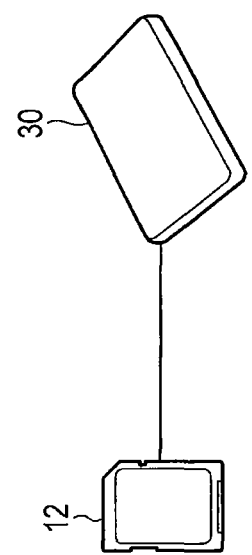

FIGS. 7A, 7B and 7C show combining methods of the secure storage and the extended storage.

FIG. 7A shows an example in which one secure storage 12 and one extended storage 30 are combined.

FIG. 7B shows an example in which one secure storage and two extended storage 30-1 and 30-2 are combined. In this case, the one secure storage is commonly possessed by the two extended storage 30-1 and 30-2.

FIG. 7C shows an example in which three secure storage 12-1, 12-2 and 12-3 and one extended storage 30 are combined. In this case, the one extended storage 30 is commonly possessed by the three secure storage 12-1, 12-2 and 12-3.

Figure 8:
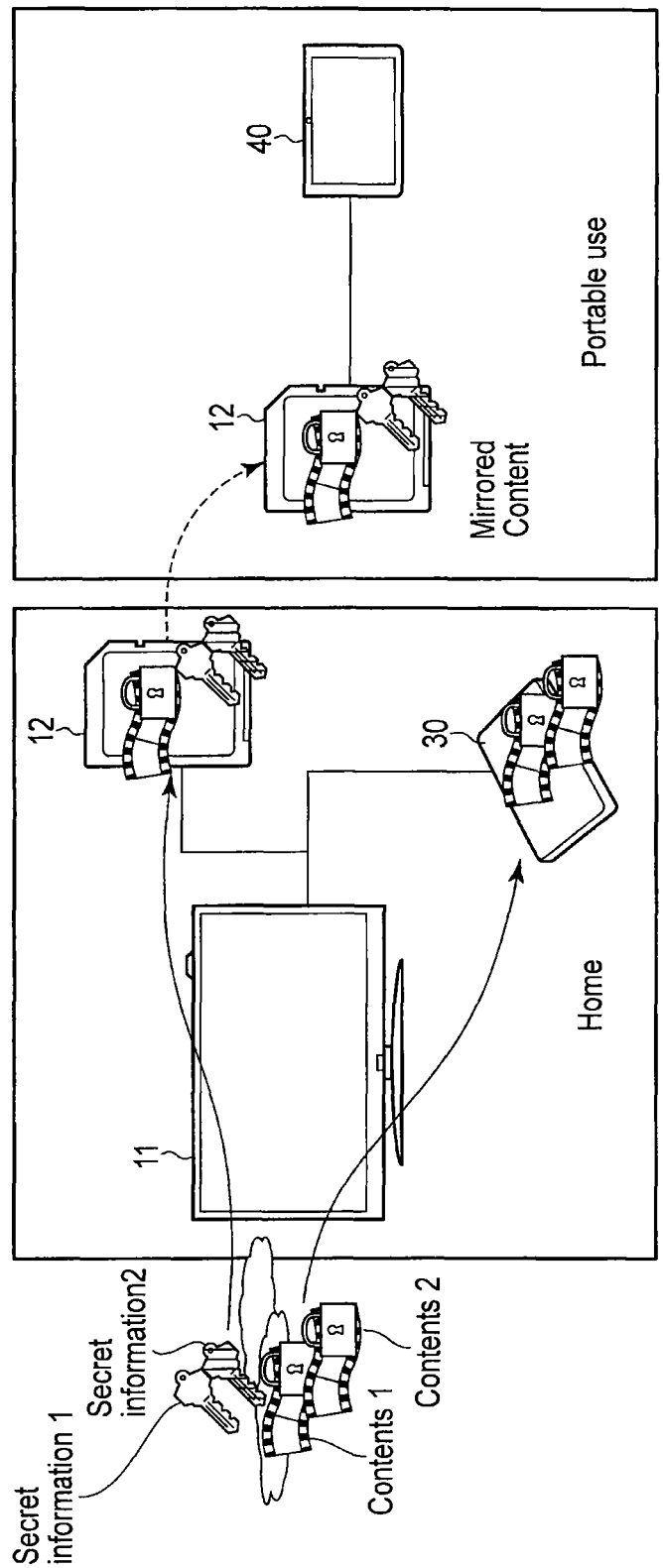
FIG. 8 is a diagram showing an example of a using method of the secure storage and the extended storage.

FIG. 8 shows a using example of the secure storage 12 and the extended storage 30. In the case of the shown in FIG. 8, contents and secret information are downloaded to the television set 11 as the host device 11 from a content server (not shown). In this example, secret information 1 corresponds to contents 1, and secret information 2 corresponds to contents 2. Any of the secret information sets are recorded in the SD card as the secure storage 12 through the television set 11. The contents 1 and the contents 2 are recorded in the USB-HDD 30. The contents 1 are recorded in the SD card 12.

After the contents and the secret information sets are recorded in the SD card and the USB-HDD, the television set 11 decodes contents in the SD card 12 or the USB-HDD 30 using the secret information in the SD card 12 and plays back the contents. This can be carried out at home.

The SD card 12 of high portability can be taken out from home and can be inserted into a tablet terminal 40. The tablet terminal 40 combines the secret information 2 and the contents 2 recorded in the SD card 12, decodes the contents 1 in the SD card 12, and plays back the contents 1.

FIG. 8 shows the example in which information or content is downloaded from the content server. However, the embodiment is not limited to this, and the embodiment can also be applied to a case where contents are sent from a broadcasting device to the television set 11 for example. In this case, the host device 11 such as the television set usually produces the secret information.

(Internal Data Configuration of Secure Storage and Extended Storage)

Figure 9:
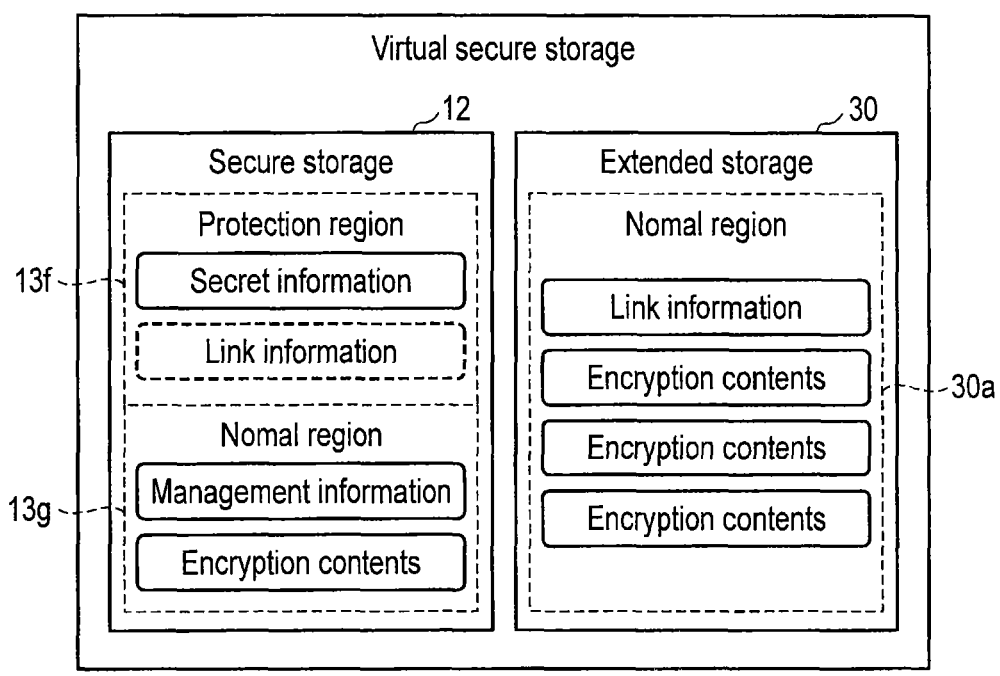
FIG. 9 is a diagram showing an example of data structures in the secure storage and the extended storage.

FIG. 9 is a diagram showing an example of a data structure in the secure storage and the extended storage.

The data configuration in a combination of the secure storage 12 and the extended storage 30 shown in FIG. 4 will be described. The configuration shown in FIG. 9 corresponds to the shown in FIG. 7A.

As described above, there are the protection region 13$f$ and the normal region 13$g$ in the secure storage 12, and there is a normal region 30$a$ in the extended storage 30. The combination of the secure storage 12 and the extended storage 30 is called a virtual secure storage.

As described above, secret information is recorded in the protection region 13$f$ in the secure storage 12, and encoded contents are recorded in the normal region 13$g$. Memory interface which is attendant on the encoded contents is also recorded in the normal region 13$g$.

Link information indicative of a relation between the secure storage 12 and the extended storage 30 is recorded in the protection region 13$f$ of the secure storage 12. Here, the link information may be recorded in the normal region 13$g$ instead of in the protection region 13$f$. That is, when it is necessary to protect the link information itself, it is recorded in the protection region 13$f$, and when it is unnecessary to protect the link information, it is recorded in the normal region 13$g$.

As described above, encoded contents are recorded in the normal region 30$a$ in the extended storage 30, and link information is also recorded in the normal region 30$a$. Here, link information recorded in the secure storage 12 and link information recorded in the extended storage 30 may be of the same format or different format. At least information designating the extended storage 30 is included in link information recorded in the secure storage 12, and at least information designating the secure storage 12 is included in link information recorded in the extended storage 30. A configuration of link information will be described later.

FIG. 10 shows data configuration in another combination of a secure storage and extended storage. The configuration shown in FIG. 10 corresponds to the shown in FIG. 7B.

That is, a virtual secure storage includes one secure storage 12 and a plurality of extended storage 30-1, 30-2 and 30-3. Information designating the extended storage 30-1, 30-2 and 30-3 is included in link information in the secure storage 12, and information designating the secure storage 12 is included in link information in each of the extended storage 30-1, 30-2 and 30-3. The secure storage 12 and the extended storage 30-1, 30-2 and 30-3 are associated with each other by the link information.

Figure 11:
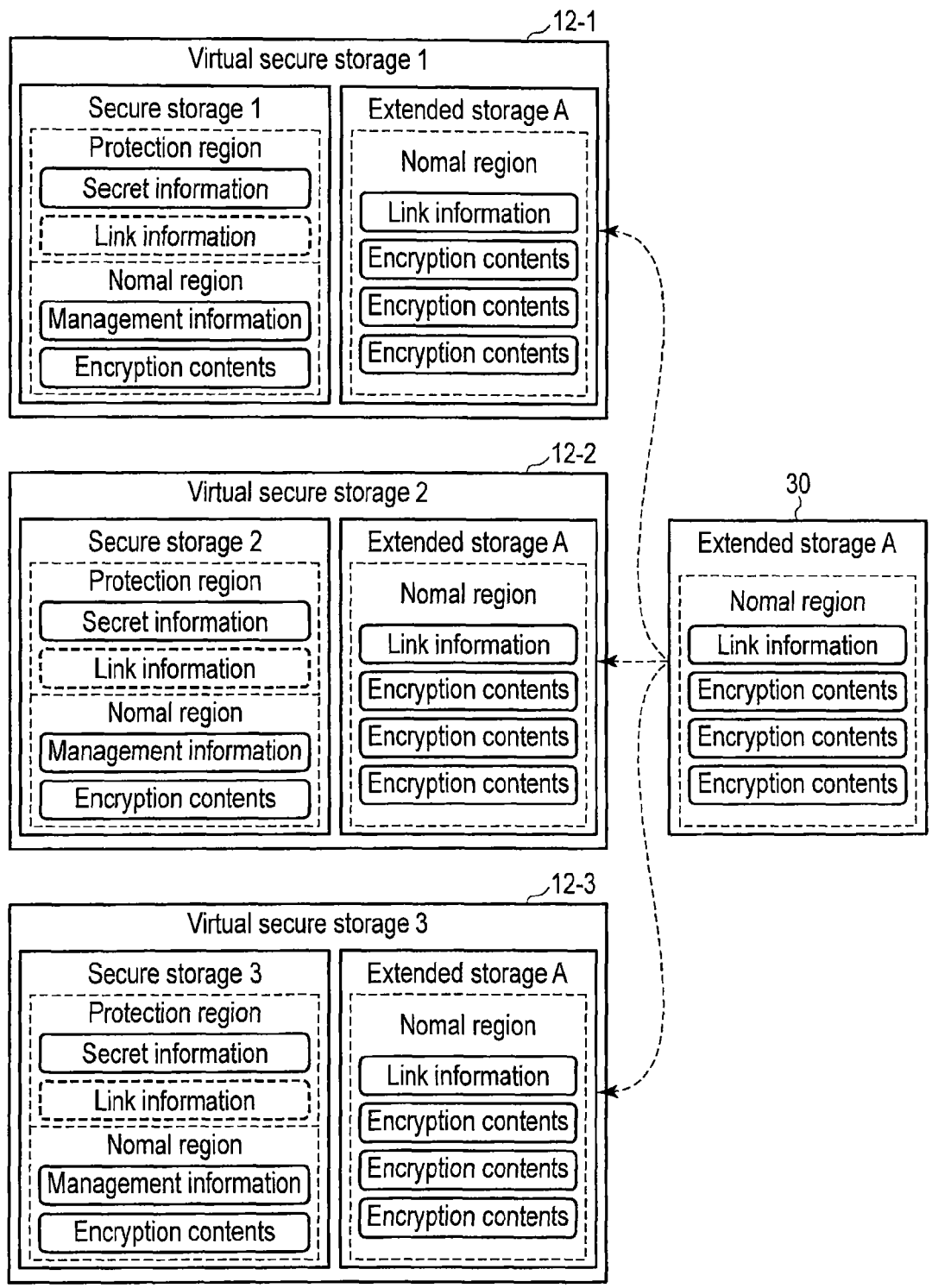
FIG. 11 is a diagram showing another example of the data structures in the secure storage and the extended storage.

FIG. 11 shows a data configuration of another combination of secure storage and an extended storage. The configuration shown in FIG. 11 corresponds to the shown in FIG. 7C. That is, virtual secure storages 12-1, 12-2 and 12-3 include a plurality of secure storage and one extended storage 30. Information designating the extended storage 30 is included in link information in each of the secure storage 12-1, 12-2 and 12-3, and information designating the secure storage 12-1, 12-2 and 12-3 is included in link information in the extended storage 30. The secure storage 12-1, 12-2 and 12-3 and the extended storage 30 are associated with each other by the link information.

The basic configurations of the host device 11 and the secure storage 12, the authentication method, and the combining methods of the secure storage 12 and the extended storage 30 have been described above.

To realize the authentication method, and the combining method of the secure storage 12 and the extended storage 30, there are several problems which must be solved.

FIG. 12 shows one example of the using method using a secure storage and extended storage, and is a diagram for explaining a first problem.

As described above, secret information which is required for playing back contents such as a key is recorded in the protection region 13$f$ of the secure storage 12. To read secret information recorded in the protection region 13$f$ and to record the secret information, authentication is required. Hence, secret information is prevented from being read, being written or being copied in an unauthorized manner. However, encoded contents themselves are recorded in the normal region 13$g$. Hence, it is possible to easily read, write and copy the encoded contents.

When the host device 11 plays back contents, secret information in the secure storage 12 is necessary irrespective of a place where encoded contents are recorded and irrespective of a copy status. However, data size of the secret information is generally much smaller than that of encoded contents.

Hence, as shown in FIG. 12, a secure storage 12 and an extended storage 30-1 are connected to a host device 11-1 for example, and when contents are to be played back, the host device 11 first reads secret information from the secure storage 12. Then, encoded contents in the extended storage 30-1 are sequentially read to playback the contents.

Normally, if secret information is once acquired, the host device 11 caches it in an internal memory in a playback process of encoded contents. That is, when secret information is cached in the host device 11, it is possible to continue the playback operation even if the secure storage 12 is pulled out from the host device 11-1. In this state, the secure storage 12 is inserted into a host device 11-2.

Another extended storage 30-2 is connected to the host device 11-2, and similar encoded contents are recorded in the extended storage 30-2. In this case, the host device 11-2 reads secret information from a connected secure storage, reads encoded contents from similarly connected another extended storage, and the host device 11-2 can playback the contents.

As described above, the host device 11-1 continues the playback operation. In this state, although copy of the secret information is prevented, the secret information can be played back from a plurality of locations at the same time, and it looks as if the contents are copied. Of course, since the secret information itself is not copied, a secure storage is required for playing back the contents, and the contents are prevented from being simultaneously and freely copied and played back on a large scale, but there is a possibility that such an operation manner is forbidden depending upon an entitled person of contents.

Figure 13:
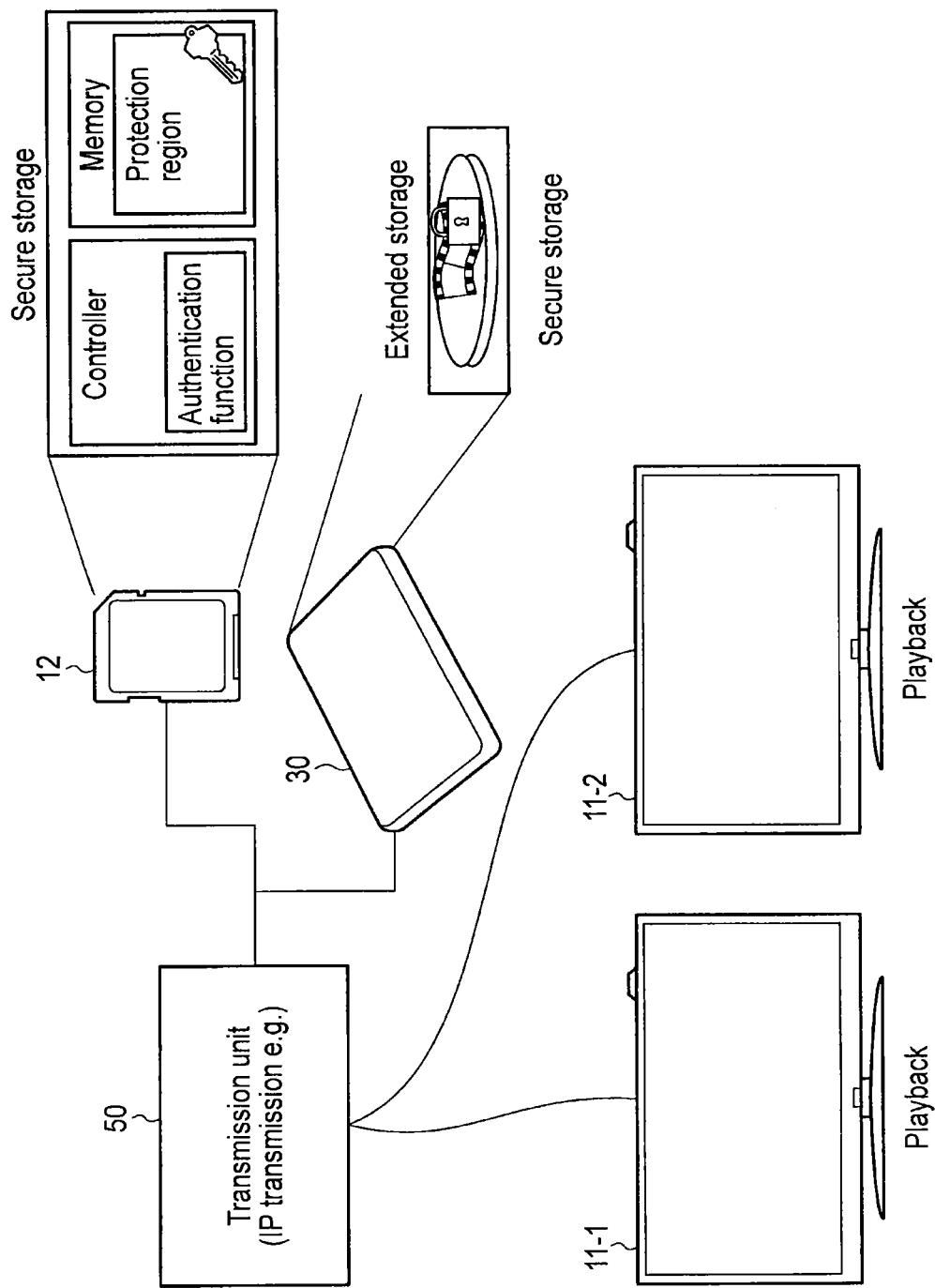
FIG. 13 is a diagram showing another example of the using method using the secure storage and the extended storage.

FIG. 13 shows another example of the using method using a secure storage and an extended storage, and is a diagram for explaining a second problem.

In FIG. 13, a host device 11-1 and a host device 11-2 are connected to a transmission unit 50 at the same time. The transmission unit 50 carries out IP transmission on a local network for example.

The transmission unit 50 is connected to a secure storage 12 and an extended storage 30, and the host device 11-1 and the host device 11-2 can access the protection region 13f and the normal region 13g of the secure storage 12 and the normal region of the extended storage 30 through the transmission unit 50.

In the state shown in FIG. 13, although the number of secret information sets connected to the protection region 13f of the secure storage 12 is one, the secret information can be accessed from the plurality of host devices 11-1 and 11-2 at the same time. Hence, the host devices 11-1 and 11-2 can playback contents recorded in the extended storage 30.

In this example also, like the first problem, there is a possibility that such an operation manner is forbidden depending upon a person entitled of contents. Especially, this operation manner can be carried out even when secret information and encoded contents are recorded in the secure storage 12 no matter whether the extended storage 30 exists.

(First Embodiment)

FIGS. 14 to 18 show a first embodiment, and this embodiment is for solving the first and second problems.

Figure 14:
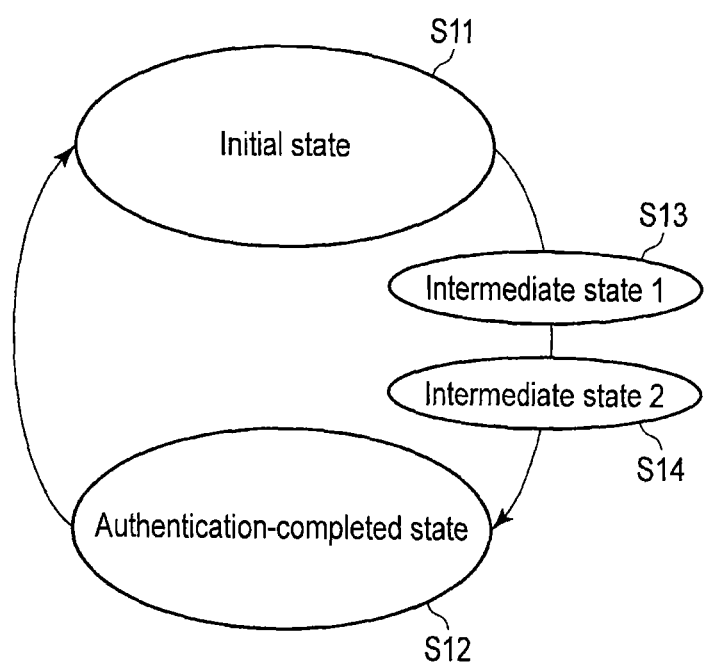
FIG. 14 is a diagram showing an example of authentication processing of the host device and the secure storage according to a first embodiment.

FIG. 14 is a state diagram of authentication. FIG. 14 shows a possible state of a host device 11 and secure storage 12.

First, there is an initial state (S11) as a state where authentication between the host device 11 and the secure storage 12 is not completed. In this state, the host device 11 cannot access the protection region 13f in the secure storage 12.

Next, there is an authentication-completed state (S12) where authentication between the host device 11 and the secure storage 12 is completed. In this state, the host device 11 can access the protection region 13f in the secure storage 12.

In addition to these states, an intermediate state 1 (S13) and an intermediate state 2 (S14) may exist during process in which the initial state S11 is shifted to the authentication-completed state S12.

Arrows shown in FIG. 14 show directions in which a state can be shifted to another state. Each of these states is commonly possessed by one host device 11 and one secure storage 12, and the secure storage 12 cannot possess the plurality of host devices 11 and the authentication-completed state at the same time.

FIG. 15 shows an example of authentication processing according to the first embodiment.

As described above, the host device 11 and the secure storage 12 respectively include device keys and device certifications. The host device 11 sends the host device certification and a host random number 1 (Hr) to the secure storage 12 (S21).

The secure storage 12 produces a medium random number 1 (Mr) and a medium random number 2 (Mn), and calculates a parameter P from the medium random number 2 (S22).

The secure storage 12 gives a signature calculated by the medium device key to these messages together with the medium device certification, the medium random number 1, the parameter P and the host random number 1, and sends them to the host device 11 (S23).

The host device 11 produces a host random number 2 (Hn), and calculates a parameter Q from the host random number 2. A bus key (BK) is calculated from the host random number 2 and the parameter P (S24).

The host device 11 gives a signature calculated by the host device key to the parameter Q and a medium random number (Mr) and these messages, and send them to the secure storage 12 (S25).

The secure storage 12 calculates the bus key BK using the parameter Q and the host random number 2 (S26).

When the above processing is completed without any delay, this means that a common bus key is established between the host device 11 and the secure storage 12, and this state is called a session established or an authentication-completed state.

Here, the bus key is commonly possessed, in a confidential fashion, by the secure storage 12 and a host device 11 of an interested party who carries out the authentication processing, and a person other than this secure storage 12 and this host device 11 of the interested party cannot know the bus key. The bus key is used for encoding processing when information of the protection region 13f is sent or received between the host device 11 and the secure storage 12. That is, a person other than the host device 11 as the interested party and the secure storage 12 cannot acquire or falsify the information of a transmission path between the host device 11 and the secure storage 12.

A signature given from a distributor of the certification is put on the device certification, and when the certification is received, the validity of the signature is checked. Further, a certification identification number or a device identification number is included in the device certification.

This authentication step is based on a known method, various modifications can be conceived from differences in authentication types, and the present application can be applied to any of the methods.

According to the first embodiment, when the authentication processing is carried out by the host device 11 and the secure storage 12, a common bus key is produced only for the host device 11 and the secure storage 12 which carry out the authentication processing. Hence, even if a secure storage 12 having this bus key is connected to another host device at the same time, since this other host device does not have a bus key which is in common with the secure storage 12, it is not possible to access the protection region 13f in the secure storage 12.

(Initialization Processing)

FIG. 16 shows one example of initialization processing according to the first embodiment. When a host device 11 carries out authentication with a secure storage 12, if the secure storage 12 is in an authentication-completed state with another host device (S31), it is necessary to first bring a state of the secure storage 12 back to the initial state and then, authentication processing is carried out.

Hence, in this case, the host device 11 first issues an initializing request to the secure storage 12 (S32).

In accordance with the initializing request, the secure storage 12 shift a state of itself from the authentication-completed state to the initial state (S33). The shifting operation to the initial state corresponds to abandonment of a produced bus key.

When the shifting operation to the initial state is completed, the secure storage 12 sends a response to indicate that the initialization is normally completed (S34).

Concerning this initializing request, the host device 11 may output the initializing request irrespective of a state of the secure storage 12. In this case, even if the secure storage 12 is in the initial state, the secure storage 12 receives this request, an internal state is left as the initial state as it is, and sends, to the host device, information that the secure storage 12 is in the initial state.

(Status Check)

Figure 17:
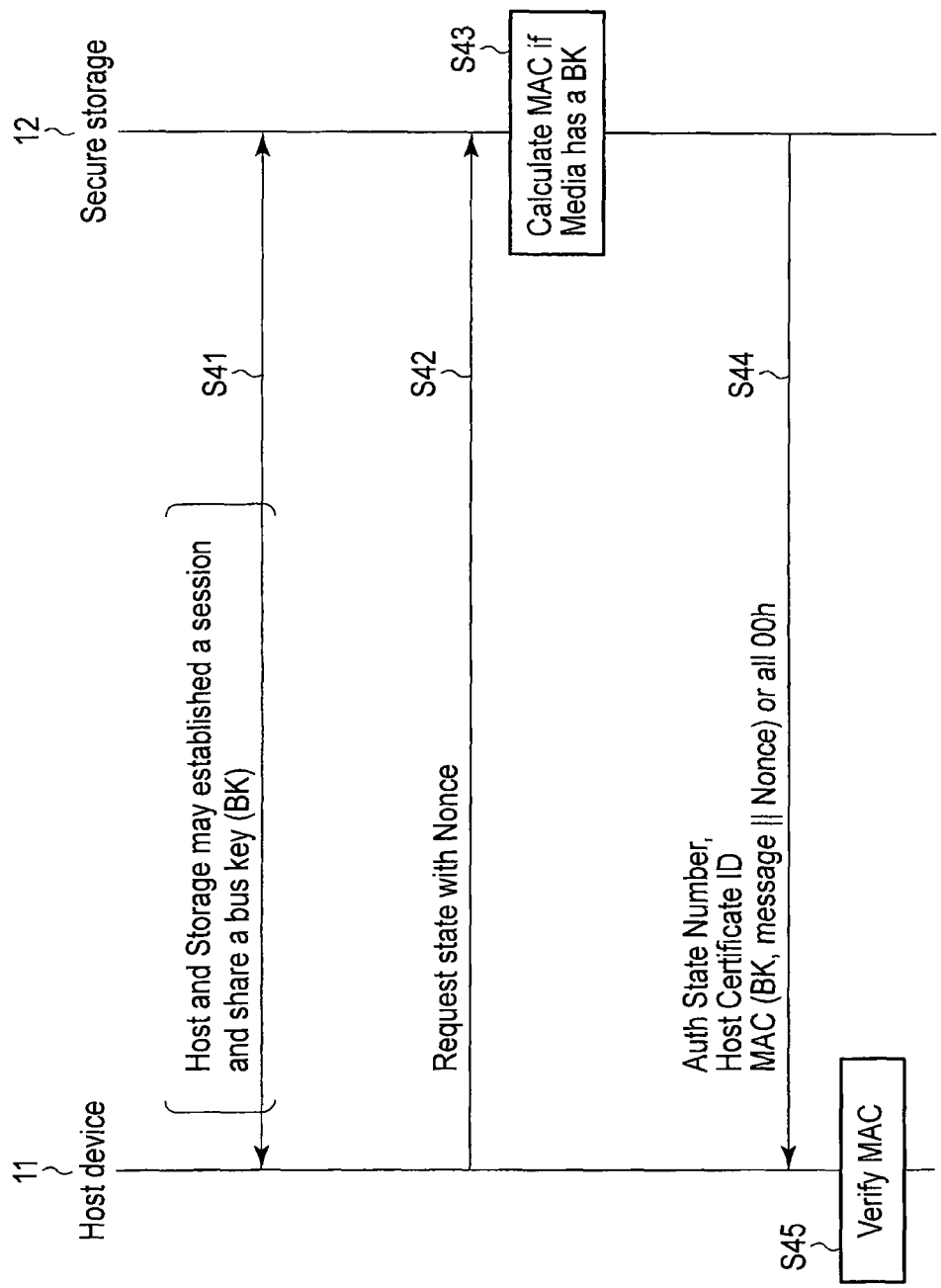
FIG. 17 is a diagram showing an example of processing of the host device for checking a state of the secure storage.

FIG. 17 shows a status check step of the first embodiment in which the host device 11 checks a state (status) of the secure storage 12.

Here, the host device 11 may be already in the authentication-completed state between the host device 11 and the secure storage 12, or may be in a stage before the host device 11 carries out authentication and the secure storage 12 is already in the authentication-completed state with another host device (S41).

Hence, the host device 11 sends, to the secure storage 12, a request to confirm the authentication state and nonce information (S42). Here, the term "nonce" is very much like a random number which is produced by host device 11 every time.

In accordance with the received request, the secure storage 12 gives a message authentication code (MAC) produced using a bus key to an authentication state of the secure storage 12 itself, an authenticated host certification number and received nonce information (S43), and sends them to the host device 11 (S44).

If the secure storage 12 is in the initial state, production of the message authentication code may be omitted. Further, the host certification number may be omitted.

The host device 11 verifies validity of the message authentication code of information received from the secure storage 12 based on the bus key, and if the validity is verified, it is determined that the received message is proper, and an authentication state of the secure storage 12 is obtained (S45).

According to the first embodiment, the secure storage 12 produces the message authentication code based on the bus key, and the host device 11 verifies the validity of the message authentication code. Therefore, it is possible to avoid a case where an authentication state is falsified by a third person having no bus key.

Further, the host device 11 requests the secure storage 12 to send nonce information, and the secure storage 12 produces a message authentication code in a state where nonce information is included. Therefore, it is possible to prevent a third person having no bus key from pretending to be an authenticated party.

Figure 18:
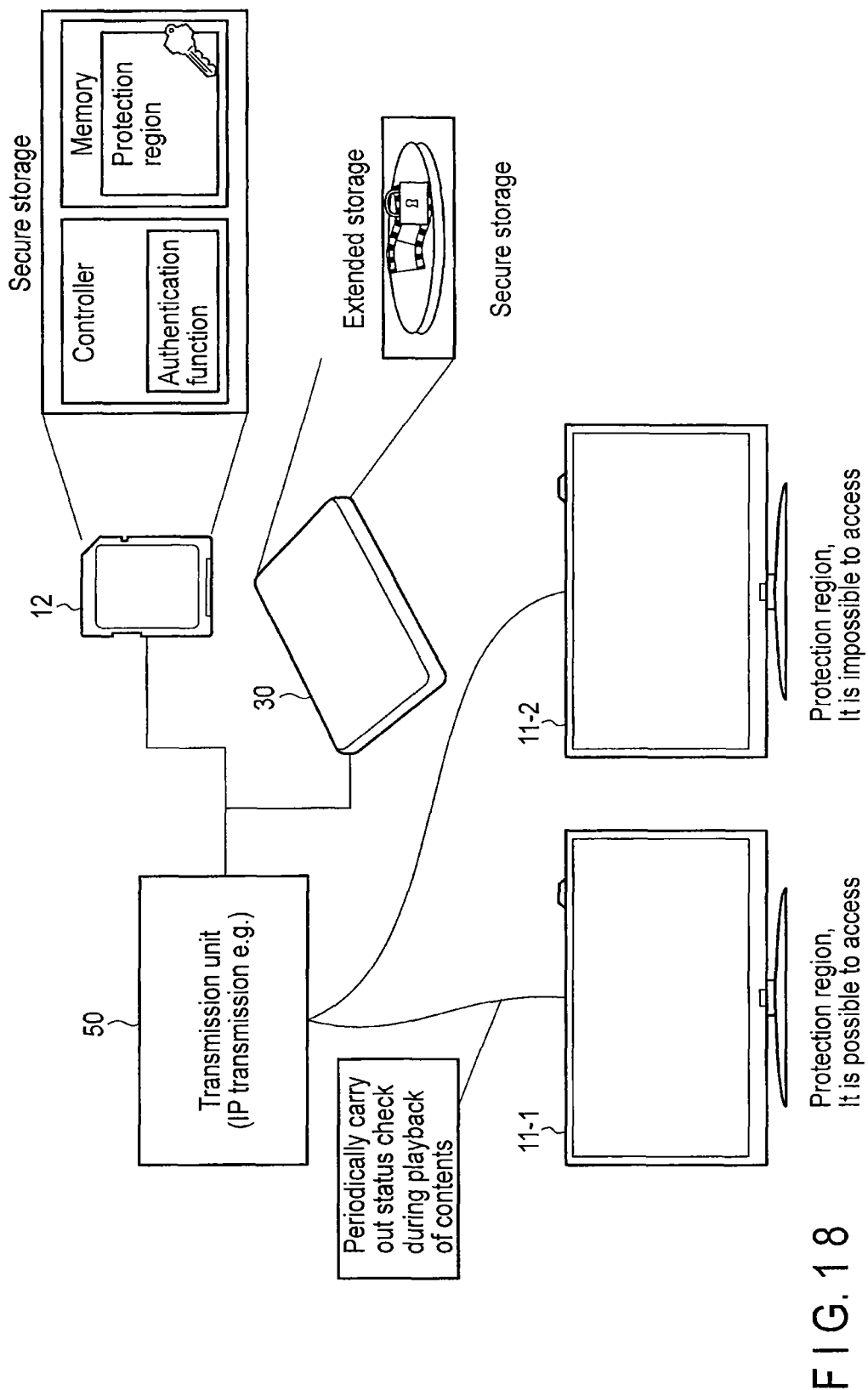
FIG. 18 is a diagram showing an example of a method for preventing a plurality of host devices from simultaneously playing back contents according to the first embodiment.

FIG. 18 shows a method of solving the second problem according to the first embodiment. This method can also be used for solving the first problem.

This method is based on assumption that a plurality of host devices 11-1 and 11-2 can access the secure storage 12 and the extended storage 30 through the transmission unit 50 as described above.

Here, the host device 11-1 is in the authentication-completed state with the secure storage 12. That is, since the host device 11-1 can access the protection region of the secure storage 12, the host device 11-1 can obtain secret information and can playback encoded contents.

The host device 11 checks a status of the secure storage 12 periodically during playback of contents. As a result of the status check, if the secure storage 12 is shifted to a non-authentication-completed state, or although the authentication is completed, if the secure storage 12 is in the authentication-completed state with another host device, the host device 11-1 performs control, e.g., stops the playback for example.

According to this method, the host device 11-1 can playback contents only when the host device 11-1 can possess the authentication state of the secure storage 12. Hence, it is possible to avoid the problem that a plurality of host devices can playback contents at the same time.

It is also possible to solve the first problem by this method. For example, in a state where the secure storage 12 is connected to the host device 11-1, if the host device 11-1 periodically checks the status of the secure storage 12 and the secure storage 12 is pulled out from the host device 11-1 during playback of contents and the secure storage 12 is connected to another host device 11-2, the host device 11-1 cannot obtain a proper result of status check. Hence, the host device 11-1 can finish the playback of contents.

Effects and expansion of the using method of the first embodiment will also be described. In recent years, with the development of an IP network, an infrastructure of accessing contents recorded in a home server located at home from outside to playback the contents is being set up. When the contents are commercial contents having a copyright, there is a possibility that simultaneous access from a plurality of locations causes a serious problem. Especially since data size of secret information recorded in a protection region is small, an unspecified number people can playback the contents in principle.

As means for preventing this, an encoded type for exchanging information in a safe manner between two devices which are generally called link protection is applied. Typical examples of the link protection are DTCP-IP (Digital Transmission Content Protection) and DRM (Digital Rights Management).

These link protections require re-encoding of contents in some cases. The re-encoding of contents is a method of once decoding the encoding in a recording state by a device, and contents are re-encoded by a bus key produced by the link protection technique and the re-encoded contents are sent. In this case, a sending-side device must carry out the decoding operation and the encoding operation at the same time, and a mounting load is large.

According to the method of the embodiment, on the other hand, since it is unnecessary to re-encoding contents, it is easy to mount the device, and it is possible to prevent an unspecified number persons from playing back contents at the same time.

When this method is applied, the following method can additionally be applied.

It is described above that it is possible to access the protection region 13*f* existing in the secure storage 12 if the host device 11 and the secure storage 12 completes the authentication. Here, an interior of the protection region 13*f* may be divided into a plurality of protection regions.

Each of the divided protection regions of the protection region 13*f* may be allocated as a region for recording secret information of contents supplied from an entitled person of the content. Here, when it is required to possess the authentication state by the status check depending upon an entitled person of contents or when it is not required to possess the authentication state depending upon an entitled person of contents, a problem whether the status check should be applied may be determined in each of the divided protection regions in the protection region 13*f*. For example, in the case of downloaded contents, an entitled person of the downloaded contents does not require to possess the authentication state. Hence, when accessing a protection region where secret information of content distributed by the entitled person of contents is recorded, it is possible to select an operation manner that it is unnecessary to confirm that the authentication state should be possessed.

In the case of broadcasted videotaped content, an entitled person of the broadcasted videotaped content requires to possess the authentication state. Hence, when accessing a protection region where secret information of contents distributed by the entitled person of the contents, it is possible to select an operation manner that it is necessary to confirm that the authentication state is possessed.

By confirming the possession of the authentication state in accordance with request of an entitled person of contents, there is the following merit for example. Generally, when video contents are delivered from a network server, it takes time to download the contents. On the other hand, a user desires to playback the video contents without waiting for completion of the download. In the download, it is necessary to carry out the authentication between the server and the secure storage 12, and to record secret information.

In playback, it is necessary to carry out the authentication processing between a playback unit and the secure storage 12, and to read secret information. That is, contents are played back while downloading the contents, it is necessary that two different persons carry out the authentication processing with respect to the same secure storage 12. Here, when an entitled person of contents who delivers the video contents does not require possession of the authentication state, it is possible to continue the playback even if the two different persons appropriately carry out the authentication processing with respect to the same secure storage 12.

In the broadcasted videotaped content also, it is desired to playback contents while recording the contents in some cases, i.e., it is desired to record and read secret information at the same time in some cases, like competing-program playback or chasing playback. In this case, however, a picture recorder and a playback unit are usually the same device. That is, when recording and reading operations of secret information, the same host device certification can be utilized. In other words, in a recording processor and a playback processor in the same device, since it is possible to share the possessed authentication state, it is unnecessary to again carry out the authentication processing whenever secret information is recorded or read.

(Second Embodiment)

FIG. 19 shows an example of a case where secure storage and extended storage are used in combination.

As described above, one secure storage and one extended storage are combined in some cases, a plurality of extended storage is combined with one secure storage in some cases, or a plurality of secure storage is combined with one extended storage in some cases.

As shown in FIG. 19, a plurality of extended storage 30-1 to 30-4 is combined with a plurality of secure storage 12-1 to 12-4 in some cases. In this case, the host device needs to know which secure storage and which extended storage are combined and used. Hence, it is necessary to obtain an identifier to identify each of the secure storage and extended storage.

FIGS. 20 to 23 show the second embodiment, and shows means for identifying which secure storage and which extended storage are combined and used.

FIG. 20 shows a first example of the identifier. In FIG. 20, a controller ID is stored in a controller 14 in a secure storage 12, and a memory ID is stored in a playback-dedicated region of a memory 13. A device ID is given to a medium device certification held in a system region of a memory 13 in some cases. A host device 11 can uniquely identify individual secure storage 12 by any one of them or a combination thereof.

The extended storage 30 is provided with a number which can identify the individual elements in many cases. In an ATA (AT Attachment) interface which is widely used as an interface of a HDD for example, a command called an identify device exists as a command for obtaining an attribute of individual ATA devices. If the identify device is issued, the ATA device sends device information to the host device 11 as a response to the command. An example of the device information is information which can identify individual elements such as a model number, a serial number and world wide name (WWN). The information can be used so that the host device 11 uniquely identifies an extended storage 30.

FIG. 21 shows a second example of the identifier. In FIG. 21, the secure storage 12 is the same as that shown in the first example shown in FIG. 20. In the extended storage 30, if an individual identifiable number is not included in the extended storage 30 when the extended storage 30 is shipped, the host device 11 can give the individual identifiable number.

In this case, the host device 11 has an identifier producing function formed from firmware for example, and produces an extended storage ID by the identifier producing function. This produced extended storage ID is supplied to the extended storage 30, and is recorded in the normal region as an identification number of the extended storage 30.

According to such a configuration, an identifier can be given to an extended storage having no individual identifiable number, and based on this identifier, the host device 11 can identify the extended storage.

Next, a using method of an identifier obtained from FIG. 20 or 21, or a combination thereof will be described.

As described with reference to FIGS. 9 to 11, the data structure includes link information indicative of a relation between the secure storage 12 and the extended storage 30. The link information is recorded in both the secure storage and extended storage.

FIGS. 22A and 22B show link information recorded in the secure storage 12. An identifier of the extended storage obtained by FIG. 20 or 21 is included in link information in the secure storage 12.

Here, for a case where one secure storage 12 is combined with a plurality of extended storage 30 and used, link information is formed from a plurality of extended storage information #0 to #N-1 as show in FIG. 22A.

As show in FIG. 22B, an identifier of an extended storage is included in extended storage information. More specifically, for example, a serial number, a model number and a world wide name shown in FIG. 20 are included.

When these identifiers are not set, an extended storage ID given by the host device 11 shown in FIG. 21 can be used as extended storage information.

The extended storage information may include both an identifier which is set in the extended storage and an extended storage ID given by the host device 11.

The extended storage information may include information which designates a file directory in the secure storage 12 associated with the extended storage 30. This will be described later.

FIGS. 23A and 23B show one example of link information which is recorded in the extended storage 30.

FIG. 23A is similar to FIG. 22A. As shown in FIG. 23B, an identifier (Media ID) of the secure storage 12 is included in link information in the extended storage. That is, the identifier (Media ID) of the secure storage 12 is included in each extended storage information.

In this example, a medium ID is included as a secure storage identifier which is obtained by one of a controller ID, a memory ID and a device certification, or a combination thereof. Information which is associated with the secure storage 12 and which designates a file directory in the extended storage 30 may also be included. This will be described later.

According to the second embodiment, the extended storage 30 and the secure storage 12 include link information which associate each of secure storage and each of extended storage, and this link information includes an identifier which is set for the secure storage 12 and the extended storage 30. Hence, even when a plurality of secure storage and a plurality of extended storage are combined and used, it is possible to uniquely identify each of the secure storage and each of the extended storage by referring to the link information.

(Third Embodiment)

As described above, secret information corresponding to each of contents is recorded in the protection region in the secure storage 12, and encoded contents are recorded in one or both of the normal region in the secure storage 12 and the normal region in the extended storage 30.

Generally, video contents are not only played back, and changing processing of substance of encoded contents such as editing processing including division of video contents and deleting processing of video contents are also carried out.

Figure 24:
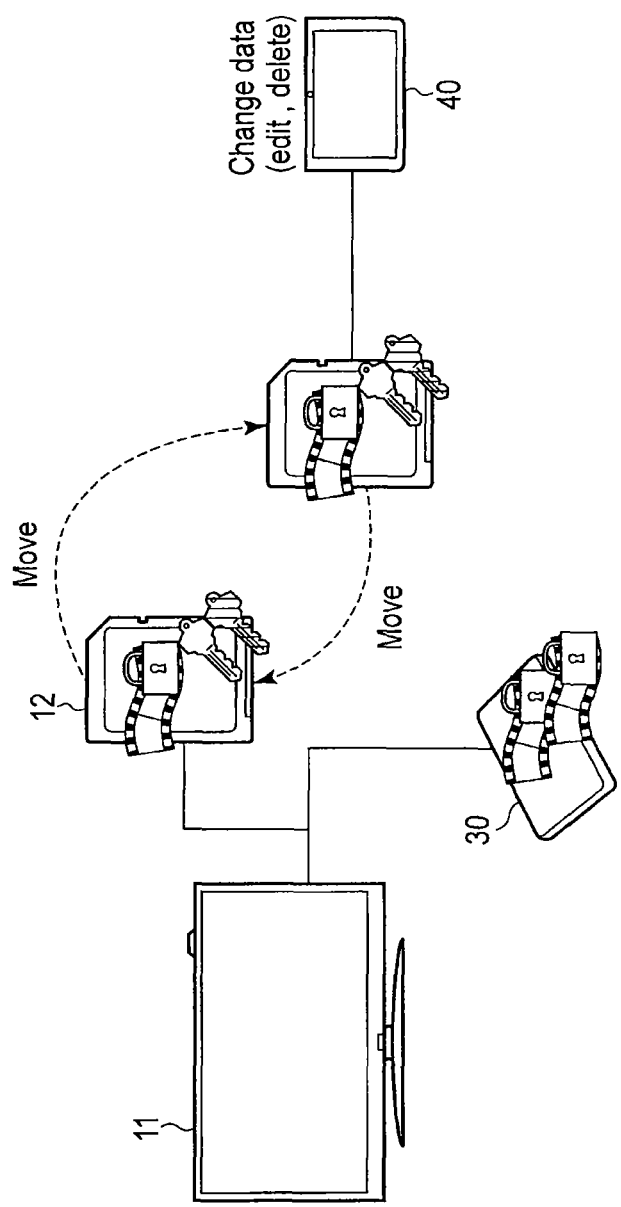
FIG. 24 is a diagram showing an example of an editing operation of contents.

As shown in FIG. 24, when the same encoded contents exist in both the secure storage 12 and the extended storage 30 and only the secure storage 12 is taken out and connected to the tablet terminal 40 and operation such as edition and deletion is carried out with respect to the contents in the tablet terminal 40, a mismatch is generated between the contents in the secure storage 12 and the contents in the extended storage 30.

There exists a case where video contents are played back and a user watches motion picture of one hour for example, and the video contents are halfway played back for 30 minutes and playback is once stopped and then, rest is played back. This is generally called resume playback, and information of timing when playback is stopped is stored in a non-volatile memory in the host device 11 as mark information. Alternatively, similar mark information is recorded in the secure storage 12 or the extended storage 30.

When playback is carried out, host device 11 selects one of the mark information sets based on which the playback of rest content is carried out. At this time, there is a case where the mark information exists in both the secure storage 12 and the extended storage 30, only the secure storage 12 is connected to the host device 11 and playback is continued and in this state, the playback is stopped. In such a case, there is a possibility that a mismatch is generated between the mark information in the secure storage 12 and the mark information in the extended storage 30 and the host device 11 becomes confused about which mark information should be used.

When only the secure storage 12 is taken out to access contents and then the secure storage 12 and the extended storage 30 are connected to each other to access the contents, it becomes difficult to handle the information.

Hence, in such a using state of the secure storage 12 and the extended storage 30, the third embodiment makes it possible to reliably carry out processing without causing confusion of a user concerning a using method, and without causing a problem of compatibility when the secure storage 12 and the extended storage 30 are used by a plurality of host devices 11 which are manufactured by different vendors.

The third embodiment will be described using FIGS. 25 to 32.

Figure 25:
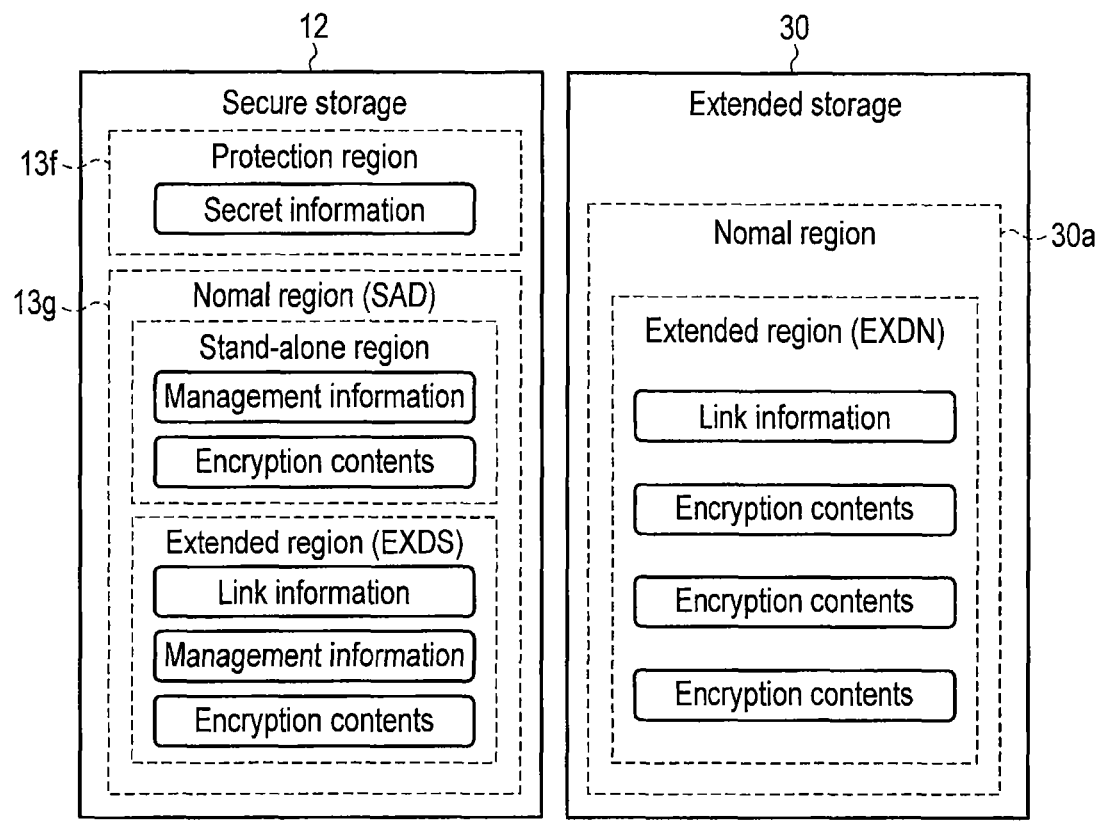
FIG. 25 is a diagram showing an example of data structures of the secure storage and the extended storage according to a third embodiment.

FIG. 25 shows a data structure in the secure storage 12 and the extended storage 30. As described above, the system region, the protection region, the playback-dedicated region and the normal region exist in the secure storage 12 but here, the normal region will be described.

As shown in FIG. 25, a normal region 13g in the secure storage 12 is classified into a stand-alone region (SAD) and an extended region (EXDS). The stand-alone region (SAD) is a region where contents, secret information, control information and the like are stored, and contents in the stand-alone region (SAD) can be played back and substance thereof can be changed by the secure storage 12 alone as will be described later. An extended region (EXDS) can be used in information which is used in combination with contents saved in an extended region (EXDN) or can be used only in the extended region (EXDN), and information which is used by providing a using rule is stored in the extended region (EXDS) as will be described later.

A normal region 30a in the extended storage 30 is the extended region (EXDN).

Here, the following rule is applied to the stand-alone region (SAD) and the extended region (EXDS).

The same content must not be stored in the stand-alone region (SAD) and the extended region (EXDS) redundantly.

When contents are moved from the stand-alone region (SAD) to the extended region (EXDS), the contents must be moved to the extended region (EXDS) and the contents in the stand-alone region (SAD) must be deleted.

When contents are moved from the extended region (EXDS) to the stand-alone region (SAD), the contents must be moved to the stand-alone region (SAD) and the contents in the extended region (EXDS) must be deleted.

The same contents may be recorded in the extended region (EXDS) of the secure storage 12 and the extended region (EXDN) in the extended storage 30.

Different contents having the same file name must not be recorded in the extended region (EXDS) of the secure storage 12 and the extended region (EXDN) in the extended storage 30.

Secret information has a relation with contents in the stand-alone region (SAD), contents in the extended region (EXDS) and contents in the extended region (EXDN).

Content management information of contents recorded in the stand-alone region (SAD) of the secure storage 12 must be recorded in the stand-alone region (SAD) of the secure storage 12.

Content management information of contents recorded in the extended region (EXDS) of the secure storage 12 or the extended region (EXDN) of the extended storage 30 must be recorded in the extended region (EXDS) of the secure storage 12.

Further, the following constraints may be added depending on circumstances.

A group of contents recorded in the extended region (EXDS) of the secure storage 12 must be a subset of a group of contents recorded in the extended storage 30.

(Control of Movement of Contents)

FIG. 26 shows a control method of contents when both the secure storage 12 and the extended storage 30 are connected to the host device 11. More specifically, FIG. 26 shows the control method of contents in the stand-alone region (SAD) and the extended region (EXDS) of the secure storage 12. Here, the following terms will be defined.

Playback: To playback contents

Record: To record contents

Edit: To edit contents. Edit includes division of contents, deletion of a portion of contents, and connection portions of contents.

Move: To move contents and secret information to another secure storage, or to move contents and secret information to another device or storage which is protected by another DRM (Digital Rights Management)

Transfer: To transfer contents between stand-alone region (SAD) and extended region (EXDS)

In FIG. 26, the initial state is as follows:
Contents A and contents C are recorded in the stand-alone region (SAD) of the secure storage 12.
Contents X are recorded in the extended region (EXDS) of the secure storage 12.
Contents X and contents Z are recorded in the extended region (EXDN) of the extended storage 30.
Contents P are recorded in the stand-alone region (SAD) of the secure storage 12 or the extended region (EXDN) of the extended storage 30.

In the above described initial state, the host device 11 is permitted to carry out the following control methods:
To carry out the playback processing, the editing processing, the deleting processing, the moving processing and the transferring processing for the contents in the stand-alone region (SAD) of the secure storage 12
To carry out the playback processing, the editing processing, the recording processing, deleting processing, the moving processing and the transferring processing for the contents in the extended region (EXDS) of the secure storage 12 and contents in the extended region (EXDN) of the extended storage 20

That is, when both the secure storage 12 and the extended storage 30 are connected to the host device 11, the host device 11 can carry out all of the processing (playback processing, editing processing, recording processing, moving processing and transferring processing). In the drawing, arrows and boxes in which names of the processing in the host device 11 are described show how contents move as a result of the processing.

That is, if the playback processing is carried out, the contents A in the stand-alone region (SAD) of the secure storage 12 are moved to the host device 11.

If the editing processing is carried out, the contents A in the stand-alone region (SAD) of the secure storage 12 are moved to the host device 11, and the contents A are edited to contents A' in the host device 11. The edited contents A' are stored in the stand-alone region (SAD) of the secure storage 12.

If the recording processing is carried out, the contents B are stored in the stand-alone region (SAD) of the secure storage 12 from the host device 11.

If the deleting processing is carried out, the contents C are deleted from the stand-alone region (SAD) of the secure storage 12 for example.

If the moving processing is carried out, the contents C in the stand-alone region (SAD) of the secure storage 12 are read into the host device 11, and the contents C are moved to another secure storage or another DRM. By carrying out the moving processing, the contents C are deleted from the stand-alone region (SAD).

If the transferring processing is carried out, the contents P in the extended region (EXDN) of the extended storage 30 are moved into the stand-alone region (SAD) of the secure storage 12 for example. By carrying out the transferring processing, the contents C are deleted from the stand-alone region (SAD).

The moving processing of contents in the stand-alone region (SAD) of the secure storage 12 is mainly explained in the above description. Moving processing of contents in the extended regions (EXDS) and (EXDN) are also carried out in the same manner.

FIG. 27 shows a first control method of the moving processing when only the secure storage 12 is connected to the host device 11.

In FIG. 27, an initial state is the same as that shown in FIG. 26. In the initial state, the host device 11 is permitted to carry out the following control methods:
To carry out playback processing, editing processing, recording processing, deleting processing, moving processing and transferring processing for contents in the stand-alone region (SAD) of the secure storage 12
To carry out the playback processing for contents in the extended region (EXDS)

The host device 11 can carry out the same processing for the contents in the stand-alone region (SAD) as that described above with reference to FIG. 26. However, for contents in the extended region (EXDS), the host device 11 is not permitted to carry out the deleting processing, the moving processing, the transferring processing and the recording processing as processing which generates addition, deletion and change of substance of the contents.

Figure 30:
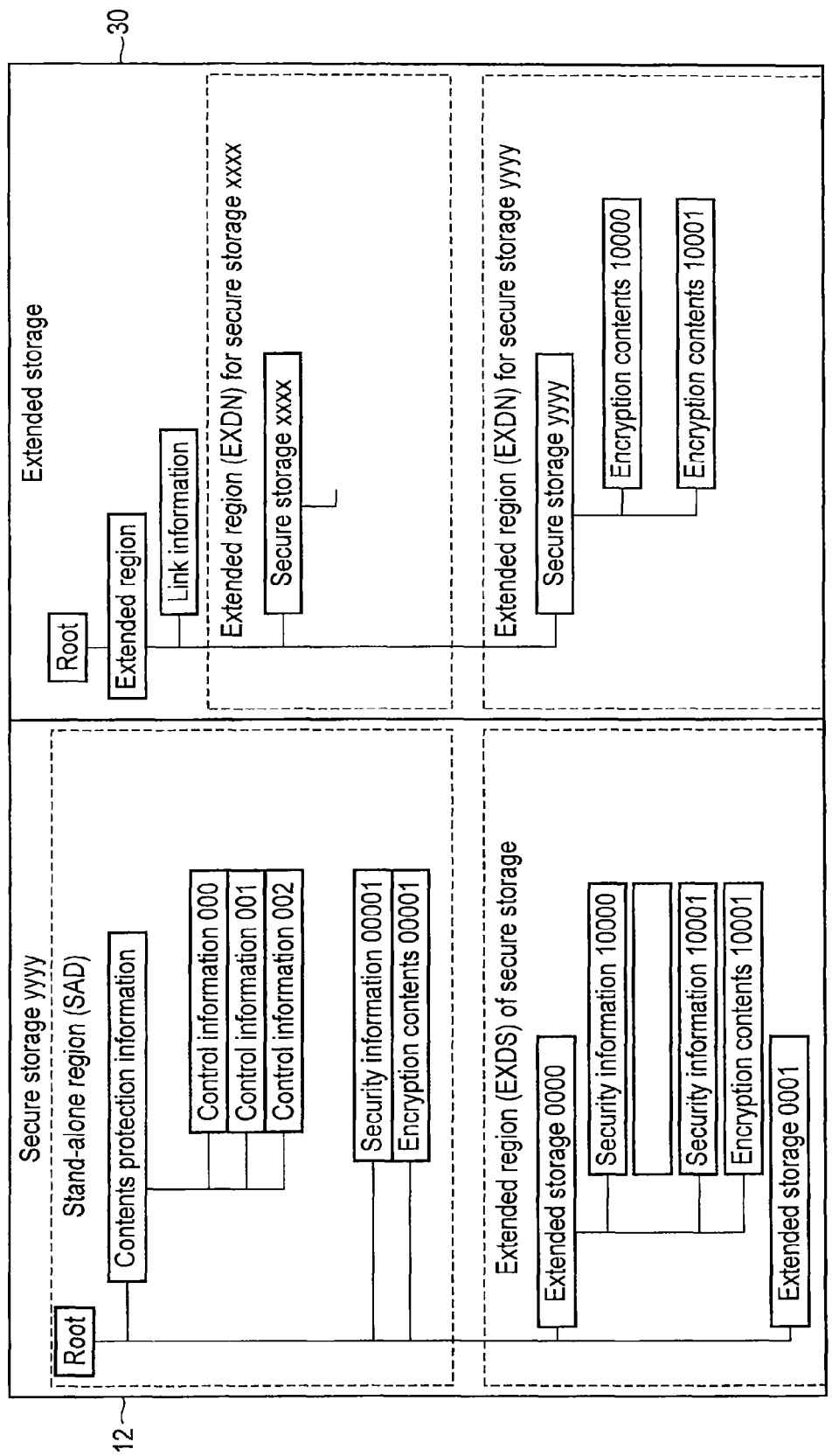
FIG. 30 is a diagram showing an example of data structures of the secure storage and the extended storage.

That is, when the same contents are copied in the secure storage 12 and the extended storage 30, more specifically, when the contents X shown in FIG. 27 exist in the secure storage 12 and the extended storage 30, if the processing is carried out for the contents X, a mismatch is generated in the substance of the contents. Hence, to avoid such a case, the host device 11 is not permitted to carry out the deleting processing, the moving processing, the transferring processing and the recording processing for the contents in the extended region (EXDS). This operation manner is preferable when a data structure shown in FIG. 30 is employed. Details there of will be described later with reference to FIG. 30.

Figure 28:
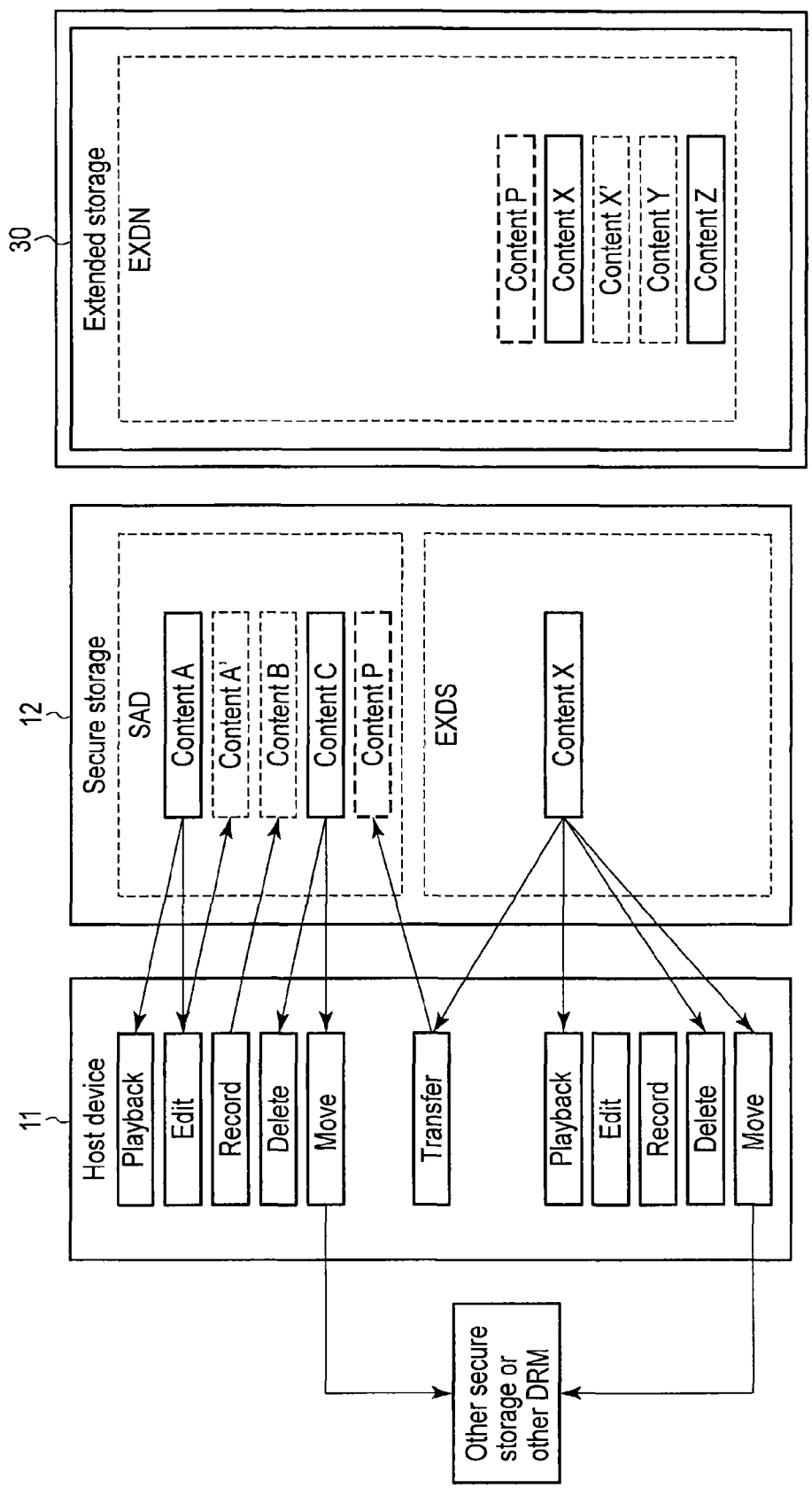
FIG. 28 is a diagram showing a second control method of movement of contents according to the third embodiment.

FIG. 28 shows a second control method of the moving processing of contents when only the secure storage 12 is connected to the host device 11.

In FIG. 28, an initial state is the same as that shown in FIG. 27. In the initial state, the host device 11 is permitted to carry out the following control methods:
To carry out the playback processing, the editing processing, the recording processing, the deleting processing, the moving processing and the transferring processing for the contents in the stand-alone region (SAD) of the secure storage 12
To carry out the playback processing, the deleting processing, the moving processing and the transferring processing for the contents in the extended region (EXDS)

In this example, it is possible to carry out the same processing for the contents in the stand-alone region (SAD) as that described above with reference to FIG. 27. However, for contents in the extended region (EXDS), the host device 11 is not permitted to carry out the recording processing and the editing processing as processing which generates addition and change of substance of the contents.

That is, when the same contents are copied in the secure storage 12 and the extended storage 30, more specifically, when the contents X exist in the secure storage 12 and the extended storage 30 shown in FIG. 28, if the contents X are edited, a mismatch is generated in the substance of the contents X in the secure storage 12 and the extended storage 30. To avoid such a case, the host device 11 is not permitted to carry out the recording processing and the editing processing for the contents in the extended region (EXDS) of the secure storage 12.

Processing which generates deletion such as the moving processing, the deleting processing and the transferring processing can relatively easily solve a mismatch. For example, since management information indicative of a list of contents is recorded in the secure storage 12, it is possible to handle by removing contents which are deleted from the content list of the management information.

If an added state or an edited state is held in the management information, it is possible to carry out the processing such as the recording processing and the editing processing which are prohibited in the above description. However, if the rule "a group of contents recorded in the extended region (EXDS) of the secure storage 12 must be a subset of a group of contents recorded in the extended storage 30" is applied, processing for bringing the substance of contents in the extended region (EXDS) in the secure storage 12 and the substance of contents in the extended region (EXDN) in the extended storage 30 into synchronization with each other is required. Hence, since synchronization time is increased, this configuration is not preferable.

If this rule is not applied, the following rule can be applied to the host device 11.

Contents which exist only in the extended region (EXDS) in the secure storage 12 are subjected to the playback processing, the editing processing, the recording processing, the deleting processing, the moving processing and the transferring processing.

Figure 32:
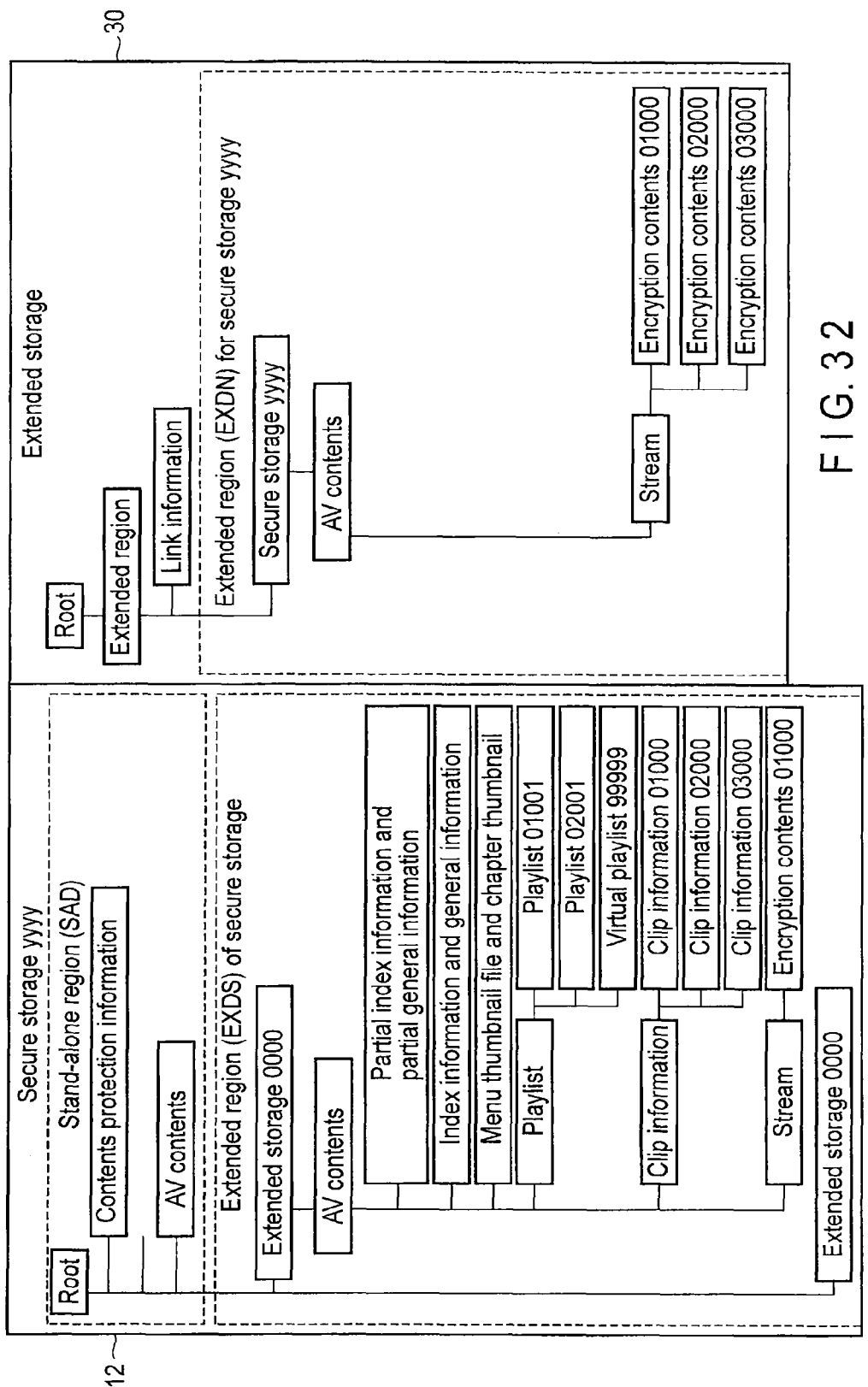
FIG. 32 is a diagram showing another example of the data structures of the secure storage and the extended storage.

This operation manner is preferable when a later-described data structure shown in FIGS. 31 and 32 is employed.

(Synchronization Method of Secure Storage and Extended Storage)

Figure 29:
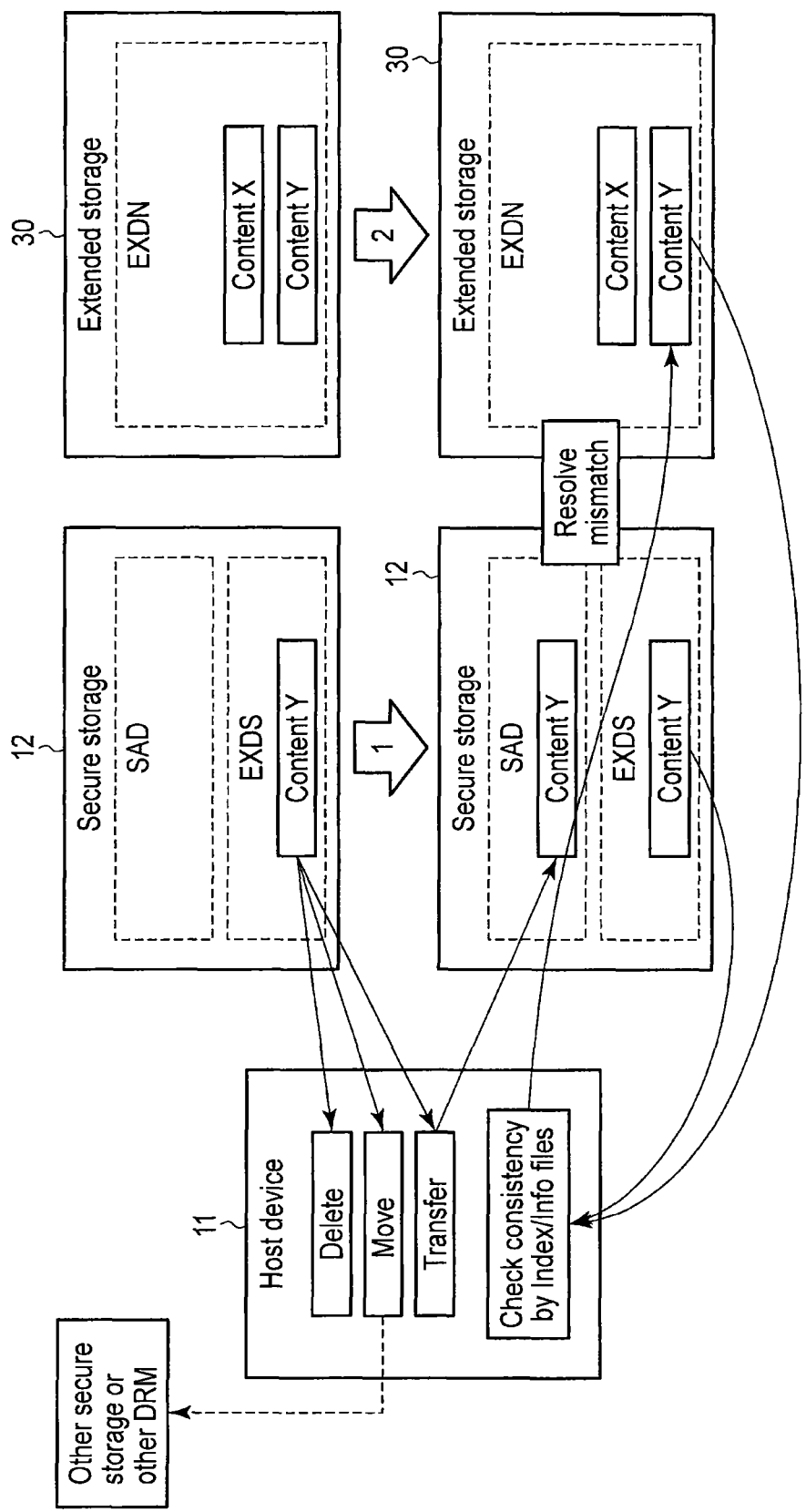
FIG. 29 is a diagram showing a synchronization method of the secure storage and the extended storage according to the third embodiment.

FIG. 29 shows a synchronization method of the secure storage 12 and the extended storage 30 when FIG. 28 is applied.

Contents X are recorded in the extended region (EXDS) of the secure storage 12, and contents X and contents Y exist in the extended region (EXDN) of the extended storage 30.

Here, only the secure storage 12 is connected to the host device 11, and the contents Y are subjected to any of the deleting processing, the moving processing and the deleting processing. After the processing, the secure storage 12 and the extended storage 30 are connected to the host device 11, and the synchronization processing is carried out.

The host device 11 determines which one of a deleted state and a recorded state is correct as a state of the contents Y based on the management information recorded in the extended region (EXDS) of the secure storage 12. Details of the management information will be described later.

As a result of determination, it is indicated in the management information that the deleted state is correct as the state of the contents Y, the host device 11 deletes the contents Y in the extended storage 30. Here, if it is prohibited to carry out processing such as the editing processing and the recording processing for contents in the extended region (EXDS) of the secure storage 12, it is possible to largely shorten time required for the synchronization processing. Because, the editing processing and the recording processing correspond to addition of contents which do not exist in the extended region (EXDN) of the extended storage 30 to the extended region (EXDS) of the secure storage 12. Therefore, the synchronization processing corresponds to copying processing of contents from the secure storage 12 to the extended storage 30.

Generally, video contents have large data size. Hence, time required for the copying processing of contents is not negligible, and there is a possibility that user-friendliness is largely deteriorated. Especially in the case of a consumer broadcast recorder such as a HDD recorder, when the HDD recorder is started, if the secure storage 12 and the extended storage 30 are connected to the HDD recorder, there is no means for determining whether they are continuously connected to the HDD recorder or the secure storage 12 is once detached from the HDD recorder and the editing processing or the recording processing is carried out. Hence, it is necessary to carry out the synchronization processing whenever the HDD recorder is started, and it is extremely important to shorten the time of the synchronization processing.

Of course, as mentioned in the description with reference to FIG. 27, it is preferable that the rule shown in FIG. 28 is provided with a configuration in which an edited state and an added state are held in the management information. According to this configuration, since the synchronization processing is unnecessary in the first place, it is unnecessary to shorten the time.

(Example of Data Configuration)

FIG. 30 shows an example of, data configurations of the secure storage 12 and the extended storage 30, and includes the above described details. FIG. 30 shows the example of detailed data configuration when the rule described with reference to FIG. 27 is applied.

A content-protecting information directory exists in the stand-alone region (SAD) of the secure storage 12. One or more content-protecting control information 000 to 002 is included below the directory. The content-protecting control information 000 to 002 has a corresponding relation with respect to the secret information existing in each of the protection regions, and the content-protecting control information 000 to 002 is referred to by later-described security information.

In the stand-alone region (SAD) of the secure storage 12, one or more security information 00001 and one or more encoded contents 00001. The security information 00001 has a relation with the encoded contents 00001. Information indicative of the control information 000 to 002 is included in the security information 00001. That is, it is possible to trace secret information in the protection region which relates to decoding of encoded contents from the security information 00001 and the control information 000 to 002.

According to such a configuration, it is possible to control the contents of the stand-alone region (SAD).

One or more security information 10000 to 10001 and one or more encoded contents 10001 are included in the extended region (EXDS) in the secure storage 12.

The security information 10000 to 10001 has a relation with the encoded contents 10001, and information indicative of the control information 000 to 002 is included in the security information 10001. That is, it is possible to trace secret information in the protection region which relates to decoding of encoded contents from the security information 10001 and the control information 000 to 002.

The encoded contents 10000 to 10001 are included in the extended region (EXDN) in the extended storage 30.

Here, the security information 10000 to 10001 in the extended region (EXDS) of the secure storage 12 is associated with one or both of the encoded contents 10001 included in the extended region (EXDS) of the secure storage 12 and the encoded contents 10001 included in the extended region (EXDN) of the extended storage 30.

In the extended region (EXDS) of the secure storage 12, the security information 10000 to 10001 and the encoded contents 10001 are recorded under the directory of each of the extended storage 30. Here, a name (secure storage xxx, secure storage yy) of the directory of the extended storage 30 corresponds to a name of the secure storage. That is, a name of a directory of the extended storage 30 is associated with information indicative of a directory described in the configuration of the link information. Hence, from the link information, the host device 11 can trace which directory information corresponds to which extended storage 30.

Similarly, in the extended region (EXDN) of the extended storage 30, the encoded contents 10000 to 10001 are recorded under the directory of each of the secure storage 12. Here, a name of the directory of the secure storage 12 is associated with information indicative of a directory described in the configuration method of the link information. Hence, from the link information, the host device 11 can trace which directory information corresponds to which secure storage 12.

These configurations include details described above, and it is possible to control contents when the rules in FIG. 28 are applied.

It is also possible to divide the directory structure, and the embodiment can be realized without depending upon the configuration shown in FIG. 30. For example, the control information, the security information, and the encoded contents may exist under further classified directories. For example, directories which are classified for each of distributors of contents, and directories classified for each of encoding types may exist. Configurations of the classification can also be applied to later-described FIGS. 31 and 32.

The above description is made along a case where the rules shown in the description of FIG. 27 is applied, but it is also possible to apply the rules which are made along the description of FIG. 28. In the rules in FIG. 28, it is necessary to determine which one of a deleted state and a recorded state is correct and the synchronization processing is carried out as shown in FIG. 29. As this method, it is possible to delete unnecessary files by comparing and referring the presence or absence of security information which is recorded in the extended region (EXDS) of the secure storage 12 and the presence or absence of the encoded contents which are recorded in the extended region (EXDN) in the extended storage 30.

Further, the deleting processing and the adding processing of contents are not permitted in FIG. 28. However, like the determination which one of the deleting processing and the recording processing be correct, it is also possible to determine which one of the editing processing or non-editing processing is correct, or which one of the editing processing and non-editing processing is correct by comparing and referring the presence or absence of the security information which is recorded in the extended region (EXDS) of the secure storage 12 and the extended region (EXDN) in the extended storage 30.

FIGS. 31 and 32 show other examples of the data configuration.

Examples of detailed data configurations which include the above described details and to which the rules in FIGS. 27 and 28 are applied will be described using FIGS. 31 and 32.

In FIG. 31, a direction of content-protecting information exists in the stand-alone region (SAD) of the secure storage 12. One or more content-protecting control information 000 to 001 is included under the directory. The content-protecting control information 000 to 001 has a corresponding relation with respect to the secret information existing in each of the protection regions, and the content-protecting control information 000 to 001 is referred to by a later-described security information.

One or more security information 00000 to 00001 exists in the stand-alone region (SAD) of the secure storage 12. The security information 00000 to 00001 has a relation with the encoded contents 00000, and information indicative of the control information 000 to 001 is included in the security information 00000 to 00001. That is, it is possible to trace secret information in the protection region which relates to decoding of the encoded contents from the security information 00000 to 00001 and the control information 000 to 001.

In this example, the encoded contents 00000 are recorded under a directory of AV content. As the AV content, there is an index information file including list information of the encoded contents 00000, and the encoded contents 00000 are included under a stream information directory. Other files are also included under the AV content directory. Details thereof will be described with reference to FIG. 32.

According to such a configuration, it is possible to control contents of the stand-alone region (SAD).

FIG. 32 shows a configuration of the extended region (EXDS) of the secure storage 12.

In FIG. 32, the AV content directory exists in the extended region (EXDS) of the secure storage 12. For example, an index information file, a general information file, a menu thumbnail file, a chapter thumbnail, a play list, clip information and a stream are recorded in the AV content directory.

The index information file and the general information file include list information of the encoded contents.

The menu thumbnail file is information for a menu when a content list is displayed as a user interface.

In the chapter thumbnail, contents is divided for each of scenes, and thumbnail information corresponding to each of the scenes and thumbnail information at the above-described resume timing are included in the chapter thumbnail.

A playback pattern lying astride a portion of the encoded content, the entire encoded content or a plurality of encoded contents is recorded in the play list.

The clip information includes various information (length, encode state, and other information which is attendant on contents) of each of encoded contents.

Encoded contents and the like are recorded in the stream.

There is a directory of AV contents in the extended region (EXDN) in the extended storage 30. The AV content directory includes a stream, and the stream includes a plurality of encoded contents for example.

Here, each of files in the extended region (EXDS) of the secure storage 12 is associated with one or both of encoded contents included in the extended region (EXDS) of the secure storage 12 and encoded contents included in the extended region (EXDN) of the extended storage 30.

To realize the operation manners shown in FIGS. 27 and 28, a partial index information file and a partial general information file are also recorded in the AV content directory of the extended region (EXDS) of the secure storage 12 in addition to the index information file and the general information file. The partial index information file and the partial general information file include a list of encoded contents existing only in the extended region (EXDS) of the secure storage 12.

That is, the index information file and the general information file include information designating all of encoded contents existing in one or both of the extended region (EXDS) of the secure storage 12 and the extended region (EXDN) in the extended storage 30. The partial index information file and the partial general information file include information designating only encoded contents existing in the extended region (EXDS) of the secure storage 12. According to this configuration, the host device 11 can grasp a list of encoded contents existing in each of the extended regions, and it is possible to realize the synchronization method described with reference to FIG. 29. In other words, as a method of determining which one of the deleted state and the recorded state is correct, it is possible to delete an unnecessary file by comparing and referring the partial index information file and the partial general information file; the index information file and the general information file; and a file recorded in the extended region (EXDN) in the extended storage 30.

It is prohibited to edit and add contents in FIG. 28. However, like the determination which one of the deleted state and the recorded state is correct, it is possible to determine which one of the edited state and the non-edited state is correct, or which one of the added state and the non-added state is correct by comparing and referring the partial index information file and the partial general information file; the index information file and the general information file; and the file record in the extended region (EXDN) in the extended storage 30.

A directory structure of the extended storage 30 designated by the link information and a directory structure of the secure storage 12 are the same as the configurations shown in FIG. 30.

According to the third embodiment, the secure storage 12 includes the stand-alone region (SAD) and the extended region (EXDS), the stand-alone region (SAD) and the extended region (EXDS) includes management information for managing contents, and the management information and the extended region (EXDS) include link information indicative of a relation with the extended storage 30. Further, the management information of the extended region (EXDS) includes information designating only encoded contents existing only in the secure storage 12. Therefore, even if the deleting processing, the moving processing or the transferring processing is carried out for the contents of the secure storage 12 irrespective of the extended storage 30, the host device 11 can delete corresponding contents in the extended storage 30 based on the management information. Therefore, it is possible to easily carry out the synchronization processing between the secure storage 12 and the extended storage 30.

(Fourth Embodiment)

Figure 35:
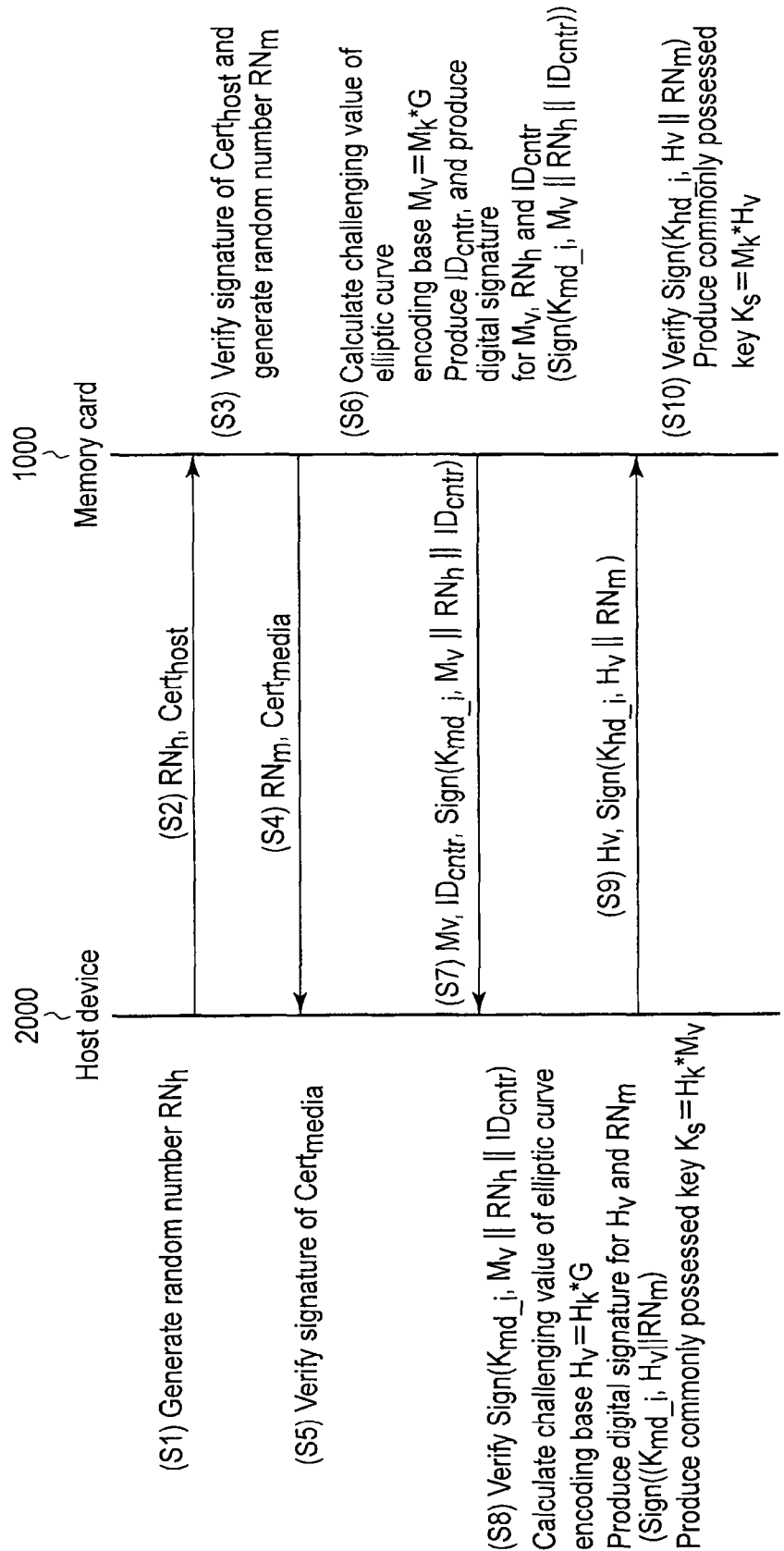
FIG. 35 is a diagram showing operation procedure when an authentication key exchange based on elliptic curve encoding is used.

FIGS. 33, 34 and 35 show a fourth embodiment.

Next, a specific mounting mode of a controller ID stored in a controller 14 will be described.

A controller in the embodiment stores a controller key Kc and a controller unique ID (IDcu) for identifying a content control unit 20.

The secure storage of the embodiment includes an ID generator 212, the ID generator 212 (controller identification information generator) generates a public control unique ID (IDcntr) which is sent outside while using a controller key Kc and a controller unique ID (IDcu) as input values.

The controller key Kc and the controller unique ID (IDcu) are written in a controller 200 as secret information by a controller vendors when the controller 200 is manufactured. The controller key Kc is commonly used by a plurality of controllers 200 due to a reason in terms of manufacturing process in some cases. Controller unique IDs differ for every controller 200, and a controller unique key generated in a certain controller 200 is always different from a controller unique key generated by another controller 200.

As shown in FIG. 34, a controller vendor A discloses data of a controller key Kc given to the controller 200 for a key issuing/managing center 3000. The controller key Kc can be sent from the controller vendors A to the key issuing/managing center 3000 using PGP encoding.

The key issuing/managing center 3000 includes a key generator 3002 which generates a medium device key Kmd_i and a medium device key certification $Cert_{media}$, a device key data base 3001 which manages the produced medium device key Kmd_i and medium device key certification $Cert_{media}$, and an encoder 3003 which encodes the medium device key Kmd_i using the controller key Kc received from the controller vendor A.

The controller key Kc is used for encoding the medium device key Kmd_i in the key issuing/managing center 3000. After the medium device key Kmd_i is produced by the key generator 3002, it is stored in the device key data base 3001. A corresponding medium device key Kmd_i is supplied from the device key data base 3001 to the encoder 3003, it is encoded by the controller key Kc to produce an encoded medium device key Enc (Kc, Kmd_i).

The controller key Kc is information which is known only by the controller vendor A and the key issuing/managing center 3000. However, to reduce damage when information of the controller key Kc leaks outside due to accident or circumstances, it is preferable change it for every controller of given amount such as manufacturing lot.

The key generator 3002 and the device key data base 3001 produce and manage not only the medium device key Kmd_i and medium device key certification $Cert_{media}$ for the secure storage, but also a host device key Khd_i and a host device certification Certhost for a later-described host device 2000.

A memory card vendor C receives, from the key issuing/managing center 3000, supply of controller 200 from the controller vendor A, and receives a medium device key (encoded medium device key Enc (Kc, Kmd_i)) which is encoded for the controller 200 and a medium device key certification $Cert_{media}$ which corresponds to the medium device key (encoded medium device key Enc (Kc, Kmd_i)). To receive a desired encoded medium device key Enc (Kc, Kmd_i), if a model number or a manufacturing lot number of the controller 200 is indicated for example, it is possible to receive a medium device key which is encoded by a correct controller key Kc.

The encoded (encrypted) medium device key Enc (Kc, Kmd_i) is once written in a buffer RAM 203 of the controller 200. Then the controller 200 decodes the encoded medium device key Enc (Kc, Kmd_i) using a controller key Kc possessed by the controller 200 itself in the decoder 206. According to this configuration, the medium device key Kmd_i is obtained in the controller 200.

A unidirectional converter 211 calculates a unidirectional function using the controller key Kc and the controller unique ID (IDcu) held by the controller 200 as input values, and produces a controller unique key Kcu. The medium device key Kmd_i is again encoded in an encoder 207 using the newly produced controller unique key Kcu, and the encoded medium device key Enc (Kc, Kmd_i) is produced. The encoded medium device key Enc (Kc, Kmd_i) is stored in a system information recorder 103 of a memory 100 supplied from a memory vendor B. At this time, medium device key certification $Cert_{media}$ which corresponds to the written encoded medium device key Enc (Kc, Kmd_i) is also stored in the system information recorder 103.

The controller unique key (Kcu) is produced using the controller key Kc and the controller unique ID (IDcu) which are kept confidential in the controller 200. Therefore, a risk that information which is necessary for decoding the encoded medium device key Enc (Kc, Kmd_i) leaks outside is low, and the encoded medium device key Enc (Kc, Kmd_i) which is once written in the memory 100 can be used by the other controller 200. Hence, it is extremely difficult to improperly re-encode (after decoding using original controller unique key Kcu 1, it is encoded using another controller unique key Kcu 2).

In this embodiment, the unidirectional function is used when the second controller unique ID (IDcntr) is produced from the controller key Kc and the first controller unique ID (IDcu), but it is only necessary that the function can produce one output data from two input data, and the function is not limited to the unidirectional function.

In this embodiment, the medium device key Kmd_i and the medium device key certification $Cert_{media}$ which are obedience to a public key encoding system are used for exchanging processing of the authentication key. However, the controller unique ID (IDcntr) in which the controller unique ID (IDcntr)

is produced based on the controller key Kc and the controller unique key Kcu of the controller 200 is supplied to the host device 2000 through a secure channel. Since the key is sent through the secure channel, the controller unique ID (IDcntr) does not leak outside, and falsification is also prevented. A memory card unique ID (IDmc) is produced by an ID coupler 403 based on the controller unique ID (IDcntr) and a medium device key certification ID (IDm_cert). A medium unique key Kmu of the memory 100 in the secure storage is produced based on the memory card unique ID (IDmc). As described above, according to the embodiment, even when the exchanging processing of the authentication key which is obedience to a public key encoding system is carried out, the pair of the public key and the secret key and the controller unique ID (IDcntr) inherent in the controller 200 can be associated with each other and this can prevent the falsification of a clone card.

Operation procedure when an authentication key is exchanged which is carried out based on the elliptic curve encoding will be described with reference to FIG. 35.

The host device generates a random number RNh (step S1), and sends it to the secure storage together with a host device key certification $Cert_{host}$ (step S2). The secure storage verifies a digital signature which is given to the received host device key certification $Cert_{host}$, and generates a random number RNm (step S3).

Subsequently, the secure storage sends the random number RNm and the medium device key certification $Cert_{media}$ to the host device (step S4). Upon receipt of them, the host device 2000 verifies a digital signature which is given to the received medium device key certification $Cert_{media}$ (step S5). The secure storage carries out the processing in step S4, produces a random number Mk which is required for exchanging processing of a Diffie-Hellman key in the elliptic curve encoding, and calculates a challenging value My (=Mk*G) using an elliptic curve base point G. The ID generator 212 generates an IDcntr. The challenging value Mv, the random number RNh received in step S2, and a digital signature with respect to the controller unique ID (IDcntr) are produced (step S6). The secure storage sends the challenging value Mv, the controller unique ID (IDcntr) and the digital signature produced in step S6 to the host device 2000 (step S7).

The host device 2000 verifies the signature received in step S7, produces a random number Hk which is required for the exchanging processing of the Diffie-Hellman key in the elliptic curve encoding, and calculates a challenging value Hv (=Hk*G) using the elliptic curve base point G. The challenging value Hv and a digital signature with respect to the random number RNm which is received in step S4 are produced using a host device key Khd_j, and a shared key Ks (=Hk*Mv) which is shared in the exchanging processing of the authentication key is calculated (step S8). The host device 2000 sends the challenging value Hv and the digital signature produced in step S8 to the secure storage (step S9). Upon receipt of them, the secure storage verifies the digital signature received in step S9, and calculates a shared key Ks (=Mk*Hv). When the signature is not correctly verified in the verifying process of the digital signature in the above processing, further processing is cancel no matter which step the procedure is carried out.

By carrying out the exchanging processing of the authentication key, the host device and the memory card vendor C can share the shared key in a confidential fashion. In the exchanging processing of the authentication key, since the shared key is calculated using the challenge mutually produced by the host device and the memory card, a value of the shared key is different whenever the exchanging processing of the authentication key is carried out.

(Fifth Embodiment)

Next, an embodiment of a memory ID stored in the memory 13 will be described.

<1. Configuration Example (Memory System)>

A configuration example of a memory system according to the first embodiment will be described by using FIG. 36.

As shown in FIG. 36, the memory system according to the first embodiment includes a NAND flash memory 110 as an authenticity, a host device 20 as an authenticator, and a controller 119 mediating therebetween. The host device 20 accesses the NAND flash memory 110 via the controller 119.

Here, a manufacturing process of a semiconductor product such as the NAND flash memory 110 will briefly be described. The manufacturing process of a semiconductor product can mainly divided into a preprocess to form a circuit on a substrate wafer and a postprocess to cut the wafer to individual pieces and then to perform wiring and packaging a piece in a resin.

The controller 119 is configured in various ways such being configured to be included in the NAND flash memory 110 in the preprocess, configured to be included in the same package in the postprocess, though not included in the preprocess, and provided as a different chip from the NAND flash memory 110. The description below including FIG. 36 is provided by taking a case when the controller 119 is provided as a different chip from the NAND flash memory 110 as an example.

If not mentioned specifically below, the controller 119 mediates between the host device 20 and the NAND flash memory 110 in many cases to exchange data and instructions therebetween. Even in such a case, the controller 119 does not change intrinsic content of the above data and instructions and thus, details may be provided below as an abbreviated description. Details of configuration examples of the NAND flash memory 110 and the controller 119 will be provided later.

If the host device 20 is configured as dedicated hardware like a consumer device, not only a case where the device is configured by combining dedicated hardware with firmware to operate the dedicated hardware, but also a case where all functions of the device are realized by software operating in a PC can be assumed. The present embodiment can basically be applied regardless of which configuration the host device 120 adopts.

Each component and data processing shown in FIG. 36 will be described below. The present embodiment shows the method of reading secret identification information SecretID recorded in an authenticity in a state hidden from third parties and also verifying that the data has been read from an authentic authenticity and a configuration example when the method is applied to a memory system using the NAND flash memory 110.

1-1. NAND Flash Memory

In the present embodiment, the NAND flash memory 110 is an authenticity.

As shown in FIG. 36, the NAND flash memory 110 according to the present embodiment includes a cell array (Cell array) 111, a data cache (Data Cache) 112 disposed in a peripheral area of the cell array 111, data generators (Generate) 113, 114, and a one-way converter (Oneway) 115. The data generators (Generate) 113, 114 and the one-way converter (Oneway) 115 constitute an authentication circuit 117.

The cell array 111 includes a read/write area (Read/Write area) 111-1 permitted to read and write into from outside, a hidden area (Hidden area) 111-2 inhibited from both reading and writing into from outside, and a ROM area (ROM area) 111-3 inhibited from writing into from outside.

The read/write area (ordinary area) 111-1 is an area into which data can be written and from which data can be read from outside the NAND flash memory 110. In the read/write area 111-1, key management information FKBv (Family Key Block) that is an encrypted FKey bundle prepared to hide FKeyv is stored. In contrast to other data recorded in the NAND flash memory 110, FKBv may be record when the NAND flash memory 110 is fabricated, or when the storage media for general user is fabricated by connecting the controller to the NAND flash memory 110. Alternatively, FKBv may be downloaded from a server in accordance with a user's request after shipping. That is, a third memory area 111-1 is used to store a family key block FKB including data generated by encrypting the family key FKey with a host identification key IDKey, the third memory area 111-1 being required to be readable and writable from outside of the authenticator. Details thereof will be described below.

The key management information FKBv is information used to decrypt hidden information FKeyv based on secret information IDKeyk held by the host device 120 and index information k of the secret information IDKeyk, or information used to decrypt hidden information FKeyv based on secret information IDKeyk held by the host device 120 and identification information of the host device 120.

The key management information FKBv is also information not only prepared uniquely for each of the NAND flash memories 110, but also can be commonly attached to (can be associated with) a plurality of the NAND flash memories 110 such as the production lot unit or wafer unit of the NAND flash memories 110 in accordance with the manufacturing process. Index information v of the key management information FKBv may be identification information or version number information of the key management information FKBv.

The hidden area 111-2 is an area inhibited from both reading and writing into from outside the NAND flash memory 110. In the hidden area 111-2, secret information NKeyi used by the NAND flash memory 110 for an authentication process and secret identification information SecretID of the NAND flash memory 110 are recorded.

The ROM area 11-3 is an area inhibited from writing into from outside the NAND flash memory 110, but is permitted to read data therefrom. In the ROM area 111-3, index information v (index of FKey) to indicate hidden information FKeyv hidden by the key management information FKBv, secret identification information (SecretID) encrypted by the hidden information Fkeyv (E-SecretID), and index information i (index of NKey) to indicate the secret information NKeyi are recorded.

In the present embodiment, data is generally recorded after an error correction code being attached so that, even if an error occurs in data when the index information i or the index information v is recorded, correct identification information can be read. However, to simplify the description, error correction encoding and decoding processes are not specifically illustrated.

Incidentally, the ROM area 111-3 may be, for example, an OTP (One Time Program) area into which data is permitted to write only once or an ordinary area permitted to read and write into in the manufacturing process of the NAND flash memory 110 before being converted into a read-only area by rewriting a management flag after shipment. Alternatively, a method may be used in which the specific write command for accessing to the ROM area and different to the command for accessing to the normal area is prepared, and this specific write command is not provided to the recipient of the NAND flash memory 110. In addition, the ROM area may be handled as an ordinary area in the NAND flash memory 110, but the controller 119 limits functions provided to the host device 120 to reading only.

Because, as will be described below, information recorded in the ROM area 111-3 is associated with information recorded in the hidden area 111-2, if information recorded in the ROM area 111-3 is tampered with, the authentication function of the NAND flash memory 110 cannot be made to work effectively. Therefore, there is no cause for security concern due to tampering and thus, the ROM area 111-3 may be replaced with an ordinary area in which the reading and writing data is permitted. In such a case, the ROM area 111-3 in FIG. 36 may be replaced with the read/write area (ordinary area) 111-1. In this connection, a portion of data recorded in the ROM area 111-3 may be recorded in the read/write area (ordinary area) 111-1. For example, a configuration in which index information v (index of FKey) is recorded in the read/write area (ordinary area) and encrypted secret identification information (E-SecretID) and index information v (index of FKey) are recorded in the ROM area 111-3 is allowed. The above configuration examples of the ROM area 111-3 are also applicable to the ROM area 111-3 described herein as other embodiments or modifications below.

E-SecretID is data obtained by encrypting SecretID attached uniquely to each of the NAND flash memories 110 by FKeyv. Alternatively, the same encrypted secret identification information may be recorded in a plurality of NAND flash memories as usage. For example, in pre-recording content distribution, the same content data is recorded in NAND flash memories in advance to sell the NAND flash memories, and the same E-SecretID is recorded in the NAND flash memories storing the content.

The data cache 112 temporarily stores data read from the cell array 111.

The data generators 113, 114 are circuits that generate output data from a plurality of pieces of input data by a preset operation.

The data generator 113 generates secret information HKeyi,j by converting a constant HCj received from the host device 120 by using the above secret information NKeyi. The data generator 114 generates a session key SKeyi,j by converting a random number RNh received from the host device 120 by using the secret information HKeyi,j. The data generators 113, 114 can be implemented as hardware (circuit), software, or a combination of hardware and software.

If the data generators 113, 114 are implemented as circuits, the same circuit as the one-way converter 115 described below, a circuit diverting the one-way converter, or an Advanced Encryption Standard (AES) encryptor can be used to make the circuit size smaller as a whole. Similarly, the same circuit can be used repeatedly for two data generators illustrated as different structural elements to make the data processing procedure easier to understand. In this example, a configuration of HKeyi,j=AES_E (NKeyi, HCj), SKeyi,j=AES_E (HKeyi,j, RNh) and the like can be adopted. That is, a first data generator 13 is configured to generate a second key HKey by encrypting a host constant HC with the first key NKey in AES operation. A second data generator 114 is configured to generate a session key SKey by encrypting a random number RN with the second key HKey in AES operation.

The one-way converter 115 performs a one-way conversion on input data and key data input separately to output one-way converted input data. The one-way converter 115 can be implemented as hardware (circuit), software, or a combination of hardware and software.

The one-way converter 115 converts the SecretID read from the hidden area 111-2 by a one-way function using the SKeyi,j generated by the data generator 114 to generate one-way conversion identification information Oneway-ID (=Oneway(SKeyi,j, SecretID)). If implemented as a circuit, the one-way converter 115 can also be used by diverting the data generator 114 or the like to make, as described above, the circuit size smaller as a whole. In this example, a configuration like Oneway-ID=AES_E(SKeyi,j, SecretID) (+) SecretID can be adopted.

Though not shown, an output unit to output data to the host device 120 via the controller 119 and like are actually arranged as structural elements.

1-2. Host Device

In the present embodiment; the host device 120 is an authenticator.

As shown in FIG. 36, the host device 120 according to the present embodiment includes a decrypter (Decrypt) 121, an FKB processor (Process FKB) 122, a memory (Memory) 123, a random number generator (RNG) 124, a selector (Select 2) 125, a data generator (Generate) 126, a one-way converter (Oneway) 127, and a data verification unit (Verify) 128. In addition, for example, an error correction processing unit and the like may be included if necessary.

The decrypter 121 decrypts input data by using key data input separately to output decrypted input data. In the present embodiment, the decrypter 121 reads E-SecretID from the NAND flash memory 110 via the controller 119. Then, the decrypter 121 decrypts the E-SecretID by using hidden information FKey input from the FKB processor 122 (data selector 122-1) described below to output SecretID.

The FKB processor 122 decrypts key management information FKBv read from the NAND flash memory 110 by using secret information IDKeyk and index information k of the IDKeyk hidden in the memory 123 to output generated hidden information FKey to the decrypter 121. In the present embodiment, the FKB processor 122 includes a data selector (Select 1) 122-1 and a decrypter (Decrypt) 122-2.

The data selector 122-1 in the first stage selects data that can be decrypted by IDKeyk hidden in the memory 123 by using index information k recorded in the memory 123 from among an encrypted FKey bundle (key management information FKBv) read from the NAND flash memory 110 and outputs the selected data to the decrypter 122-2.

The decrypter 122-2 decrypts data selected by the data selector 122-1 by using the IDKeyk hidden in the memory 123 to output generated hidden information FKey to the decrypter 121.

The memory 123 records k, IDKeyk, set of HKeyi,j (i=1, ..., m; j is a fixed value for HKeyi,j), and HCj and hides at least IDKeyk and set of HKeyi,j (i=1, ..., m) from outside the host device 120. The HCj is a constant held in the host device 120 in advance to be sent to the NAND flash memory 110 when authentication is requested (Request authentication). Details thereof will be described below.

The random number generator 124 generates and outputs a random number RNh used for an authentication process.

The data selector 125 in the second stage selects HKeyi,j needed for the authentication process from the set of HKeyi,j hidden by the host device 120 by using index information i read from the ROM area 111-3 of the NAND flash memory 110 via the data cache 112.

The data generator 126 is an operation unit that generates output data by performing a predetermined operation on a plurality of pieces of input data. In the present embodiment, the data generator 126 generates a session key SKeyi,j by converting RNh generated by the host device 120 by using HKeyi,j hidden by the host device 120. As the data generator 126, for example, the above AES encryptor may be used.

The one-way converter 127 converts SecretID output from the decrypter 121 by a one-way function using SKeyi,j output from the data generator 126 to generate one-way conversion identification information Oneway-ID.

The data verification unit 128 compares Oneway-ID received from the NAND flash memory 110 and Oneway-ID obtained from the one-way converter 127 in the host device 120 to see whether both Oneway-IDs match. If both values of the one-way conversion identification information Oneway-ID match (OK), the data verification unit 128 judges that SecretID obtained by the decrypter 121 is an authentic ID and delivers the obtained SecretID to subsequent processes. On the other hand, if both values thereof do not match (NG), the data verification unit 128 judges that the SecretID is an unlawful ID and outputs a message to that effect.

In addition, as means for revoking an unlawful host device when secret information held by the host device 120, for example, IDKeyk and HKeyi,j are leaked and the unlawful host device having the leaked information is produced by an illegal vendor, countermeasures such as removing information from the key management information (FKBv) with which FKey can be derived from IDKeyk held by the unlawful host device. The countermeasures will be described below in connection with the description with reference to FIG. 38. When taking the countermeasures, it is useful to provide association among IDKeyk, k, HKeyi,j, and HCj. This is because if there is such association, both of secret information IDKeyk and HKeyi,j held by the unlawful host device can be identified by observing HCj notified by the unlawful host device for authentication. Sharing information of all or a portion of HCj with IDKeyk, configuring information of all or a portion of HCj based on a result of an encryption process of IDKeyk, and configuring information of all or a portion of IDKeyk based on a result of an encryption process of HCj can be adopted as methods of association. Further, it is desirable to use HKeyi,j, in addition to FKey and IDKeyk to generate key management information FKBv. This will be described below in a paragraph in which a configuration example of FKB is described.

The secret information IDKeyk and secret information HKeyi,j are recorded, for example, after being encrypted by a method specific to the vendor in an internal dedicated memory if the host device 120 is a dedicated hardware device like a consumer device, held in a state that can be protected from an unlawful analysis by tamper resistant software (TRS) technology if the host device 120 is a program executed in a PC or the like, or recorded in a state after measures to hide the secret information being taken by using the function of a security module if the security module is contained.

The controller 119 performs data transfer with the host device 120 by controlling the NAND flash memory 110. For example, the controller 119 interprets an instruction received from the host device 120 and converts the instruction into an instruction conforming to the interface specifications of the NAND flash memory 110 before sending out the instruction to the NAND flash memory 110. The controller 119 can adopt various interface standards such as the SD Memory standard, SDIO standard, and eMMC standard if necessary.

The controller 119 secures a portion of the ordinary area 111-1 to store control data needed for the operation of the controller 119. The controller 119 may have a function to convert a logical address received from the host device 120 into a physical address of the NAND flash memory. The controller 119 may also have a function to perform the so-called wear leveling to make exhaustion of the cell array 111 uniform. However, at least the hidden area 111-2 is excluded from wear leveling.

The configuration example of the memory system is not limited to the one described above. For example, an error correction processing unit (not shown) and other structural elements may be included if necessary. Further, there may be a plurality of pieces of secret information NKeyi held by the NAND flash memory 110. That is, if a combination of NKeyi and index information i corresponding thereto is defined as a slot, a plurality of slots is recorded in the NAND flash memory 110. A slot number is attached to each of the slots and the host device 120 reads index information i of each slot number and selects one of the slots to perform authentication. In this case, the host device 120 notifies the NAND flash memory 110 of information corresponding to the selected slot number and the NAND flash memory 110 executes an authentication process by using information corresponding to the notified slot number. Further, a plurality of information slots may be held by defining all information held by the NAND flash memory 110 as one slot. That is, NKeyi, i, FKBv, v(index of FKey), SecretID, and E-SecretID are defined as one slot and a plurality of slots is recorded in the NAND flash memory 110. A slot number is attached to each of the slots and the host device 120 reads index information i of each slot number and selects one of the slots to perform authentication. In this case, the host device 120 notifies the NAND flash memory 110 of information corresponding to the selected slot number and the NAND flash memory 110 executes an authentication process by using information corresponding to the notified slot number.

The method by which the NAND flash memory 110 has a plurality of slots is shown above, but the method is not limited to the above one and any configuration sharing a portion of information by a plurality of slots can be adopted. For example, SecretID, E-SecretID, FKBv, and index v may be shared by a plurality of slots while other information being individually held by each slot.

The method by which the NAND flash memory 110 has a plurality of slots and slot numbers and which slot to use for authentication is notified by the host device 120 is applicable to all other embodiments described herein below.

<2. Authentication Flow>

Figure 37:
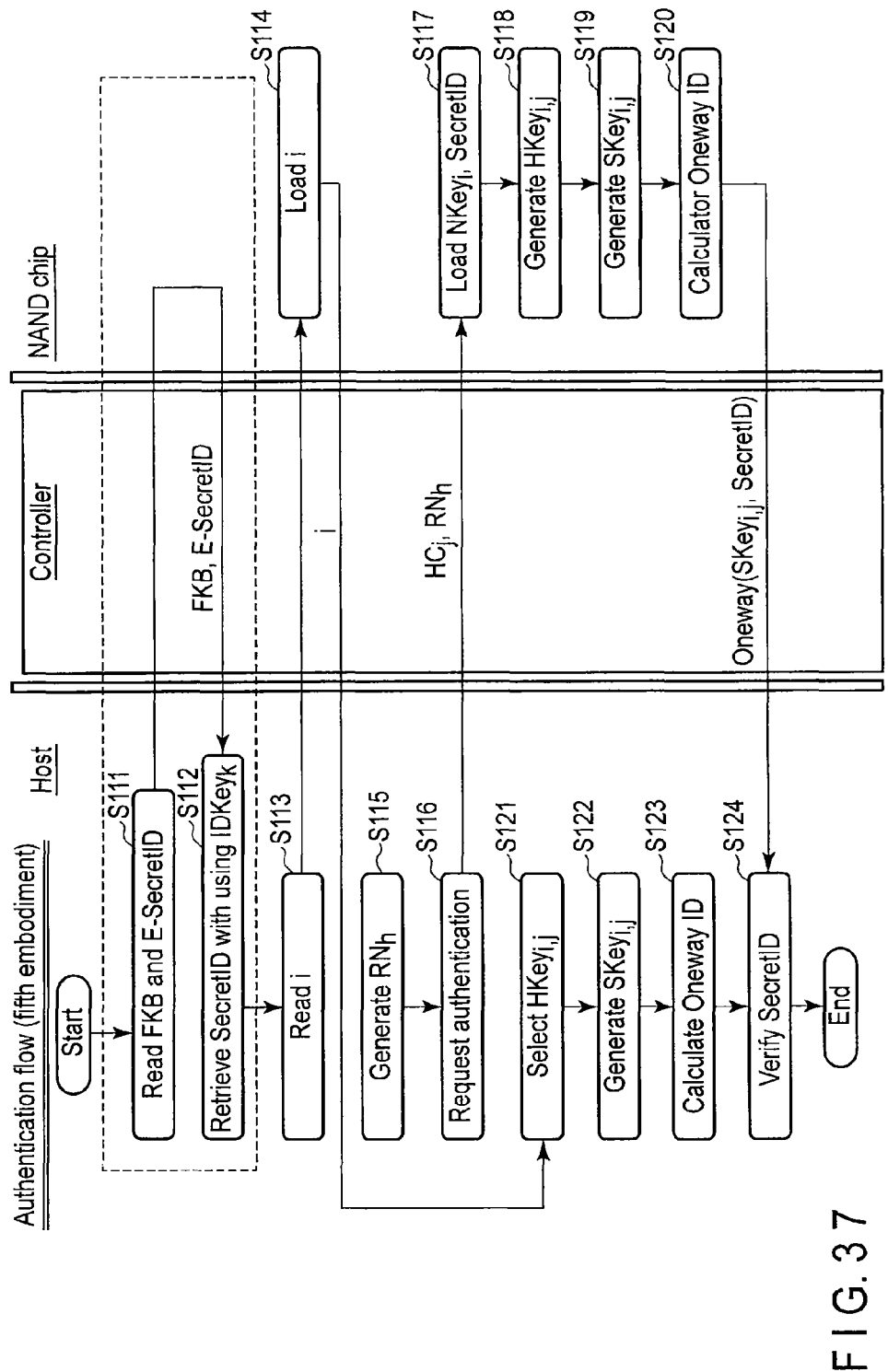
FIG. 37 is a diagram showing an authentication operation of the memory system according to the fifth embodiment.

Next, the authentication flow of a memory system according to the fifth embodiment will be described along FIG. 37.

(Step S111)

When the authentication is started (Start), the host device 120 reads an encrypted FKey bundle (FKB: Family Key Block), which is key management information, and encrypted secret identification information SecretID (E-SecretID) from the NAND flash memory 110.

(Step S112)

Subsequently, the host device 120 reads encrypted hidden information FKey that can be decrypted by the host device 120 by executing a data selection process by the data selector (Select 1) 122-1 from the read key management information FKB and also obtains hidden information FKey by decrypting the encrypted hidden information FKey by the decrypter 122-2 using hidden secret information IDKeyk. Further, the host device 120 obtains secret identification information SecretID by decrypting the E-SecretID read from the NAND flash memory 110 using the obtained FKey.

(Step S113)

Subsequently, the host device 120 requests to read index information i to the NAND flash memory 110.

(Step S114)

Subsequently, in response to the request from the host device 120, the NAND flash memory 110 loads the index information i from the cell array 111 and outputs the index information i to the host device 120.

(Step S115)

Subsequently, the host device 120 generates a random number RNh needed for an authentication request. By using RNh for the authentication process, a common key that is different each time can be used with the NAND flash memory 110 for processes below.

(Step S116)

Subsequently, the host device 120 sends out a constant HCj held in advance and the RNh to the NAND flash memory 110 along with the a Request authentication.

(Step S117)

Subsequently, the NAND flash memory 110 loads secret information NKeyi (i=1, . . . , m) and secret identification information SecretID from the hidden area 111-2, which are stored in the data cache 112.

(Step S118)

Subsequently, the NAND flash memory 110 generates secret information HKeyi,j by a data generation process of the data generator 13 using the hidden secret information NKeyi and the constant HCj received from the host device 120.

(Step S119)

Subsequently, the NAND flash memory 110 generates a session key SKeyi,j (=Generate(HKeyi,j, RNh)) by a data generation process of the data generator 114 using the received RNh.

(Step S120)

Subsequently, the NAND flash memory 110 generates one-way conversion identification information Oneway-ID (=Oneway(SKeyi,j, SecretID)) by executing a one-way conversion process of the one-way converter 115 on the SecretID using the SKeyi,j. The generated Oneway-ID is sent out to the host device 120.

(Step S121)

In parallel with step S118, the host device 120 selects HKeyi,j needed for an authentication process with the NAND flash memory 110 from the set of HKeyi,j (i=1, . . . , m) hidden in advance using the received index i.

(Step S122)

Subsequently, the host device 120 generates the SKeyi,j (=Generate(HKeyi,j, RNh)) by a data generation process of the data generator 126 using the selected HKeyi,j and the generated RNh.

(Step S123)

Subsequently, the host device 120 generates Oneway-ID by executing a one-way conversion process of the one-way converter 127 on the SecretID using the generated SKeyi,j.

(Step S124)

Subsequently, the host device 120 determines whether the Oneway-ID received from the NAND flash memory 110 and the Oneway-ID generated by the host device 120 match. If both values of the Oneway-ID match (OK), the host device 120 judges that the SecretID obtained by the decrypter 121 is an authentic ID and delivers the SecretID to subsequent processes. On the other hand, if both values thereof do not match (NG), the host device 120 judges that the SecretID is an unlawful ID and outputs a message to that effect.

With the above operation, the authentication flow according to the first embodiment is completed (End).

If the NAND flash memory 110 has a plurality of slots as described in a configuration example of the memory system, the host device 120 needs to notify the NAND flash memory 110 of the slot number used for authentication. In such a case, the slot number may be notified in step S116 or in a step before step S161.

<3. FKB (Family Key Block)>

Figure 38:
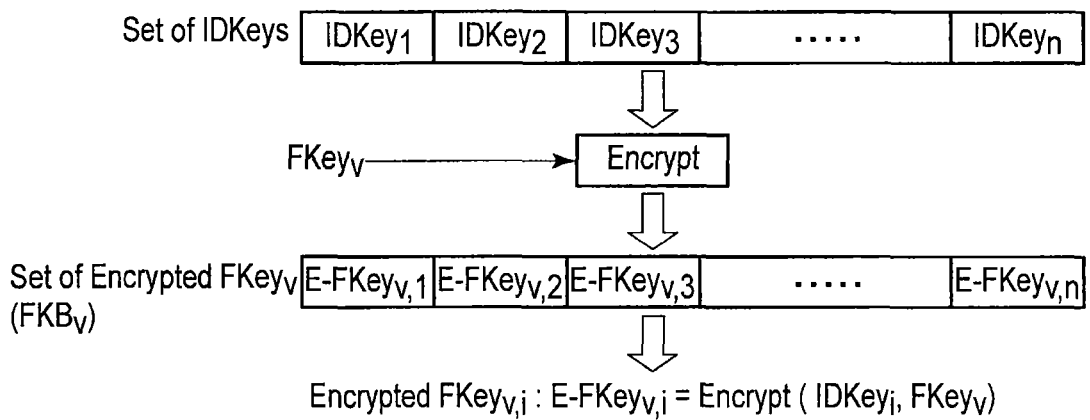
FIG. 38 diagram showing key management information according to the fifth embodiment.

Next, key management information FKB (Family Key Block) according to the fifth embodiment will be described in more detail by using FIG. 38.

To generate key management information FKB conforming to the NAND flash memory 110 in which secret identification information SecretID is recorded, one piece of FKeyv after another is encrypted (Encrypt) by using one IDKeyi (i=1, ..., n) (Set of IDKeyi's) after another as secret key information prepared in advance. That is, the key management information FKB is a set of encrypted FKeyv (E-FKeyv, i)=Encrypt (IDKeyi, FKeyv) and the set of encrypted FKeyv is called an encrypted FKey bundle.

Incidentally, the configuration of the key management information FKB is not limited to the configuration in the present embodiment. For example, in case where the specific IDKeyi is leaked, encrypted FKeyv (E-FKeyv) which can be decrypted from the leaked IDKeyi is deleted from the FKB. As a result, when the host device 120 accesses the NAND flash memory 110 with the newly configured FKB, the host device 120 can not obtain (decrypt) correct FKeyv and SecredID. In this manner, the function to revoke the host device 120 holding the secret information IDKeyi can be provided.

When, as described above, IDKeyk, k, HKeyi,j, and HCj are associated, HKeyi,j may also be diverted, in addition to FKey and IDKeyk, for the generation of FKBv. For example, configurations such as E-FKeyv,i=Encrypt (Encrypt(IDKeyi, FKeyv), HKeyi,j), E-FKeyv,i=Encrypt (Encrypt(HKeyi,j, FKeyv), IDKeyi), and E-FKeyv,i=Encrypt(HKeyi,j, IDKeyi (+)FKeyv) may be adopted. This has the effect of preventing, when keys are leaked from a plurality of the host devices 20, the secret keys IDKeyi, HKeyi,j of different devices being combined. That is, by making decryption of FKey impossible unless IDKeyi and HKeyi,j are correctly combined, observing HCj reveals tied HKeyi, j and further IDKeyi can be identified so that exposed IDKeyi can be revoked.

Further, the method of generating the key management information FKB is not limited to the method in the present embodiment. For example, the function to revoke the host device 120 can also be provided if the key management information FKB is generated by using conventional MKB (Media Key Block) technology used in CPRM or another MKB technology.

The MKB technology efficiently shares common secret information (Media Key) (among devices not to be revoked) while realizing device revocation in a situation in which each of a plurality of devices has a mutually different piece of secret information and is also called Broadcast Encryption.

If the MKB technology is applied, for example, a configuration example of the memory system is shown like in FIG. 39. The shown memory system is different from the memory system in FIG. 36 in that the FKB processor (Process FKB) 22 is shown as a superordinate concept. Also in this case, the exposed key can be identified and revoked by associating the data of FKB decrypted based on the node number of the host device 120 that is information corresponding to K or IDKeyi and a host key group allocated to the node number with HKeyi,j and HCj.

<4. Writing Secret Information and FKB>

Next, writing secret information or key management information FKB into the NAND flash memory 110 will be described.

4-1. When Writing Secret Information or Key Management Information FKB During Manufacture of the NAND Flash Memory First, a case where secret information or key management information FKB is written, for example, during manufacture of the NAND flash memory 110 will be described by using FIGS. 40 and 41. The description will be provided along the flow in FIG. 41.

A licensing administrator 140 generates data below: key management information FKBv (v=1, ..., n), hidden information FKeyv(v=1, ..., n), index information v (v=1, ..., n), secret information NKeyi, and index information i. FKBv is generated by, as described above, encrypting FKeyv. In addition, v may be a plurality of values. If, for example, the licensing administrator 140 generates three values of 1, 2, and 3 as v, the licensing administrator 140 generates (FKB1, FKey1), (FKB2, FKey2), and (FKB3, FKey3) in accordance with the generated v.

Of the generated data, the licensing administrator 140 delivers FKeyv(v=1, ..., n), v(v=1, ..., n), NKeyi, i to a memory vendor 130. For the delivery the data, for example, the licensing administrator 140 uses safe means such as sending the data to the memory vendor 130 after the data being encrypted by using a public key of the memory vendor 130 obtained in advance.

In the memory vendor 130, there are selectors 132, 133, a generator 134, and an encryption unit 135, in addition to the NAND flash memory 110. The memory vendor 130 further holds data 131 such as FKBv (v=1, ..., n) delivered by the licensing administrator 140.

(Step S131)

With the above configuration, the memory vendor 130 first generates SecretID by the generator (SecretID Generator) 134.

(Step S132)

Subsequently, the memory vendor 130 that receives the data 131 selects one value from v by the selector 132. Further, the selector 132 selects FKeyv corresponding to the selected v. The memory vendor 130 encrypts the generated SecretID to generate E-SecretID by using the selected FKeyv.

(Step S133)

Subsequently, the memory vendor 130 writes the value of v into the ROM area 111-3 of the NAND flash memory 110 as the index information v (index of FKey).

The memory vendor 130 also writes the value of index information i (index of NKey) into the ROM area 111-3 of the NAND flash memory 110 and the value of NKeyi into the hidden area 111-2.

Further, the memory vendor 130 writes the value of SecretID into the hidden area 111-2 of the NAND flash memory 110 and the value of E-SecretID into the ROM area 111-3.

With the above operation, predetermined secret information and key management information FKB can be written during manufacture of the NAND flash memory 110 (End). Regarding the order of writing each of the above values, E-SecretID is a value obtained after an encryption process and can be written after the encryption process by the encryption unit 135. Otherwise, there is no restriction on the order of writing operation and the values may be written in an order different from the order of the above example.

Further, the memory vendor 130 delivers the NAND flash memory 110 for which the write process is completed to a card vendor.

Thus, in the present embodiment, the NAND flash memory 110 can be assumed to be in a state in which index information v (index of FKey) or the like is already written.

4-2. When FKB is Written by the Card Vendor

Figure 43:
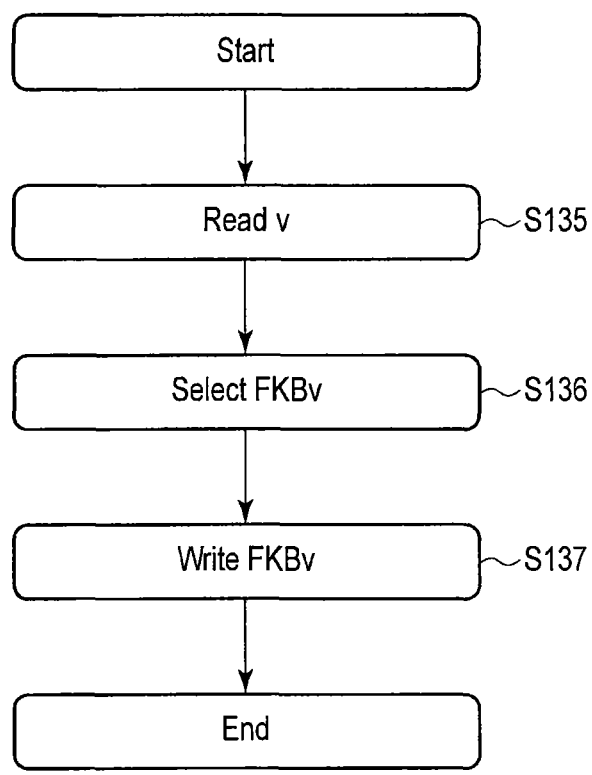
FIG. 43 is a flowchart showing the case where the card vendor writes the key the management information.

Next, a case where a card vendor 150 writes FKB will be described by using FIGS. 42 and 43. The description will be provided along the flow in FIG. 43.

The card vendor 150 receives the NAND flash memory 110 to which the predetermined information v and the like have been written from the memory vendor 130.

Then, the card vendor 150 manufactures storage media (here, Card) 155 for general users like, for example, SD cards by connecting the controller 119 that controls the NAND flash memory 110.

In the card vendor 150, there is a selector 152, in addition to the storage media (Card) 155 and data (FKBv) 151 received from the licensing administrator 140.

The process to write key management information FKBv by the card vendor 150 is as follows.

(Step S135)

First, the card vendor 150 receives the FKBv from the licensing administrator 140 as the data 151. For the delivery of the data 151, the above safe means is used.

Then, the card vendor 150 reads the value of the index information v recorded in the ROM area 111-3 of the NAND flash memory 110 into the data cache 112 or the like (via the controller 119).

(Step S136)

Subsequently, the card vendor 150 selects the FKBv corresponding to the value of the read index information v through the selector 152.

(Step S137)

Subsequently, the card vendor 150 writes the selected FKBv into the read/write area 111-1 of the NAND flash memory 110 via the controller 119.

<Advantageous Effects>

According to the authenticator, authenticity and authentication method according to the first embodiment, at least the following advantageous effects (1) to (3) can be obtained.

(1) Even if secret information has leaked from the host device 120, it is possible to prevent unlawful use of secret information of the NAND flash memory 110 using the leaked information.

The host device 120 as an authenticator may be provided, as described above, not only as a dedicated hardware device such as a consumer device, but also, for example, as a program executable in a PC or the like, and, in some cases, the software functions as a substantial host device. On the other hand, the NAND flash memory 110 as an authenticity is recording media. Even in the case where a program called "firmware" mediates, an important process or information is stored in a hidden state in hardware in the cell array 111.

Thus, there is concern that the tamper-resistance (the resistance to attacks) of software executed in a PC becomes lower, compared to the recording media. Thus, there is concern that, by attacking the host device (authenticator) 120 with a low tamper-resistance, secret information hidden in the NAND flash memory (authenticity) 110 with a high tamper-resistance is also exposed, leading to a disguise as a device with a high tamper-resistance.

Thus, in the configuration according to the fifth embodiment and the authentication method therefor, as described above, the NAND flash memory 110 with a relatively high tamper-resistance hides first key information (NKeyi) that can generate second key information (HKeyi,j) therefrom in the cell array 111. On the other hand, the host device 120 hides only the second key information (HKeyi,j) that cannot generate the first key information (NKeyi) therefrom in the memory 123.

Thus, the NAND flash memory 110 generates the second key information (HKeyi,j) hidden by the authenticator 20 by using the constant HCj received from the host device 120 and the first key information (NKeyi) hidden by the NAND flash memory 110. The NAND flash memory 110 further generates a session key SKeyi,j using the second key information (HKeyi,j) and the random number RNh.

The host device 120 generates a session key SKeyi,j using the second key information (HKeyi,j) selected by the index information i and the random number RNh. As a result, the NAND flash memory 110 and the host device 120 share the same session key SKeyi,j.

Thus, in the present embodiment, the secret level of information hidden by the NAND flash memory (authenticity) 10 and the secret level of information hidden by the host device (authenticator) 120 can be made asymmetric. In the present embodiment, for example, the secret level of information hidden by the NAND flash memory 110 with a relatively high tamper-resistance can be set higher than the secret level of information hidden by the host device 120 with a relatively low tamper-resistance.

Thus, even if information hidden by the host device 120 has leaked, the NAND flash memory 110 cannot be "disguised" by using the leaked information because the secret level of information hidden by the NAND flash memory 110 with a relatively high tamper-resistance is higher. Therefore, unlawful use of secret information of the NAND flash memory 110 using the leaked information can advantageously be prevented. As a result, for example, it becomes possible to reliably determine that ID information read from the host device 120 is information that has been read from the intended authenticity 110 and to revoke unlawful use thereof by remote parties.

(2) Advantages for implementation

In a configuration like the present embodiment, as described above, restrictions are also imposed on circuit scales, for example, in an environment in which hardware implementation of a public key cryptosystem process or an MKB process, which requires a relatively large circuit scale, is difficult to achieve.

However, according to the present embodiment, though the key information is asymmetric, there is no need to use the public key cryptosystem process requiring a relatively large circuit scale. Further, by making the secret levels of information hidden by the host device (authenicator) 120 and the NAND flash memory (authenticity) 110 asymmetric as described above, authentication means is implemented by which with information leaked from one device alone, the other device cannot be disguised and the session key SKeyi,j is shared by the authenticator 120 and the authentacee 110.

Thus, implementation can be said to be advantageous even in a severe environment in which the above restrictions are imposed. Further, as described above, the circuit scale can be further reduced by sharing the data generator and encryptor in a memory system as the same process.

(3) The manufacturing process can advantageously be simplified and manufacturing costs can be reduced.

The NAND flash memory 110 according to the present embodiment includes in the read/write area 111-1 key management information (FKBv) attached uniquely to each of the NAND flash memories 110 in accordance with uses thereof or commonly to a plurality of the NAND flash memories 110 in units of the production lot or the like. Further, the NAND flash memory 110 according to the present embodiment includes in ROM area 111-3 encrypted secret identification information (E-SecretID) attached uniquely to each of the NAND flash memories 110.

If the key management information (FKBv) is made common in units of the production lot, unique information that needs to be recorded in each of the NAND flash memories 110 can be reduced to small data in data size such as the encrypted secret identification information (E-SecretID). In other words, the data size of unique encrypted secret identification information (E-SecretID) to be written into the NAND flash memories 110 can be reduced by dividing information to be written into commonly attached key management information (FKBv) and unique encrypted secret identification information (E-SecretID) and encrypting the information in two stages.

Figure 40:
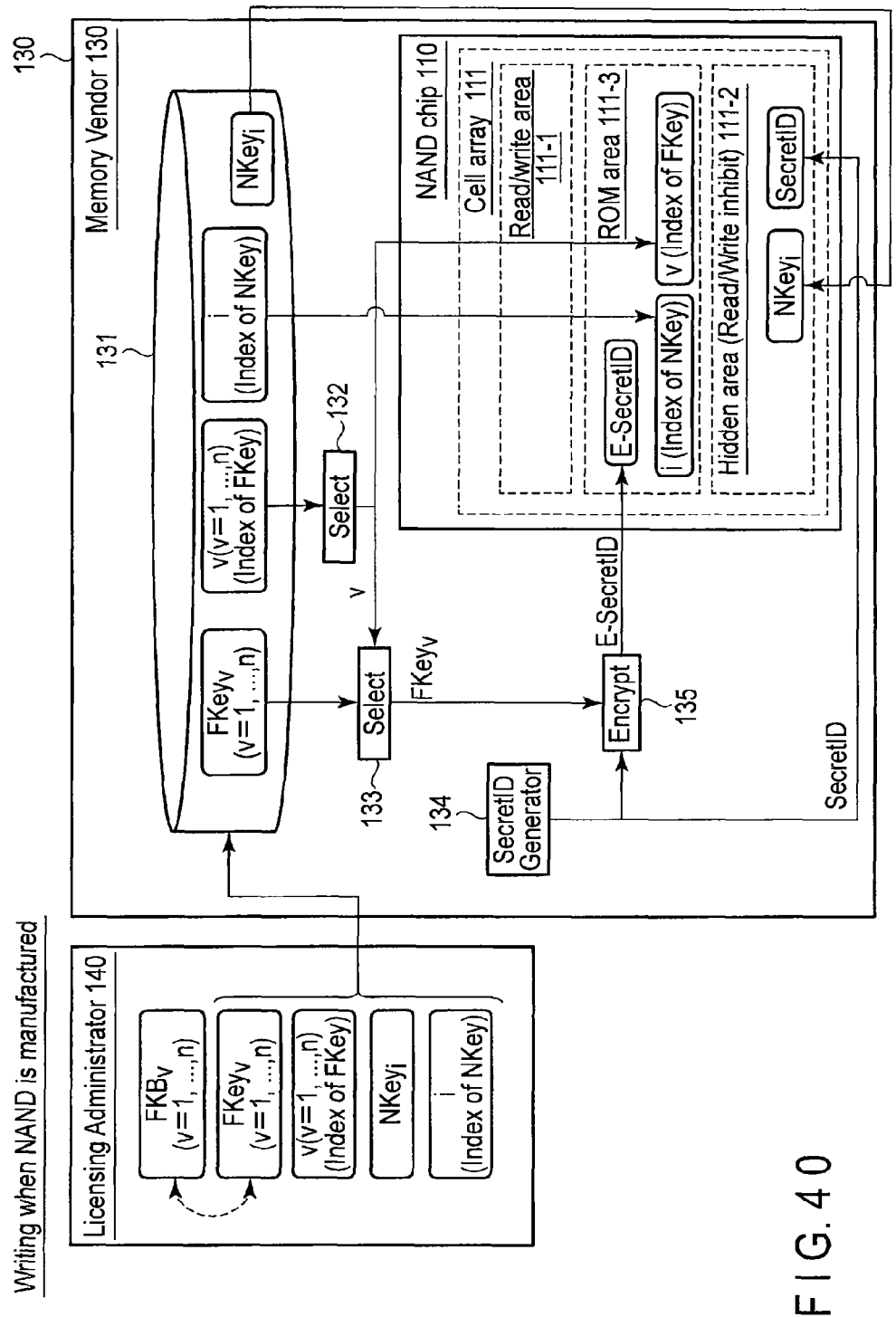
FIG. 40 is a diagram showing a case where information is written when a NAND flash memory is manufactured.
Figure 41:
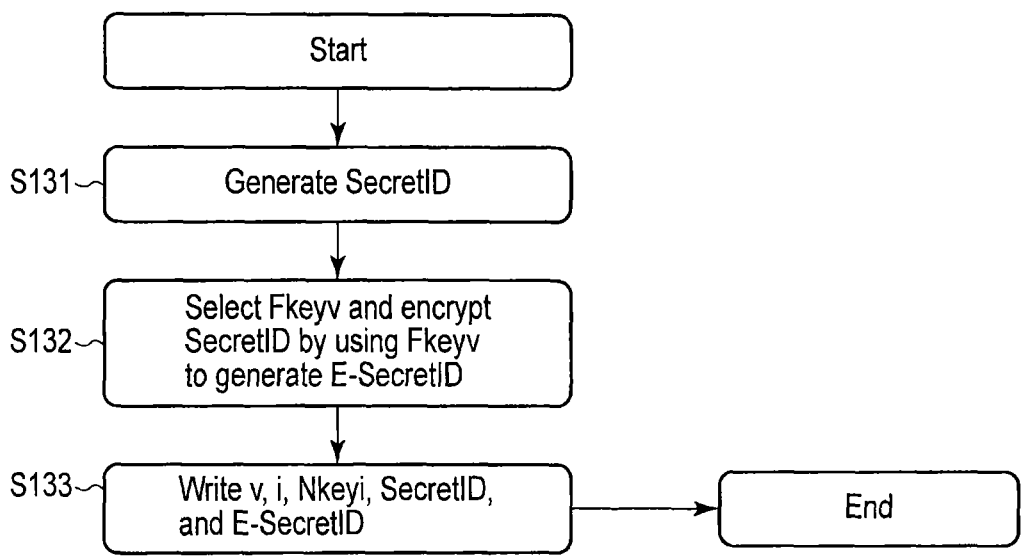
FIG. 41 is a flowchart of the case where information is written when the NAND flash memory is manufactured.

For example, as shown in FIGS. 40 and 41 above, the memory vendor 130 writes unique information (E-SecretID) into each of the NAND flash memories 110 received from the licensing administrator 140 during manufacture of the NAND flash memories.

The encrypted key management information (FKBv) commonly attached to the NAND flash memories 110 can commonly be written into the NAND flash memories 110 by the card vendor 150. For example, as shown in FIGS. 42 and 43 above, the card vendor 150 writes the common key management information FKBv to each of the NAND flash memories 110 received from the licensing administrator 140. Thus, the size of unique data that must be written into each of the NAND flash memories 110 by the memory vendor 130 can be reduced.

If information unique to the NAND flash memory 110 and whose data size is large is written during manufacture of the NAND flash memories 110, the manufacturing process will be more complex and the manufacturing time will be longer, leading to increased costs of manufacturing. According to the configuration and method in the present embodiment, however, such a complex manufacturing process becomes unnecessary by dividing information to be written into commonly attached key management information FKBv and unique encrypted secret identification information (E-SecretID) and encrypting the information in two stages and therefore, the manufacturing process can advantageously be simplified and manufacturing costs can be reduced. Moreover, the manufacturing time can be shortened, offering advantages of being able to reduce power consumption.

Also on the side of the host device 120, advantages similar to those of the NAND flash memory 110 can be gained by adopting a configuration of generating E-SecretID by encrypting SecretID, which is a unique value to the NAND flash memory, by using hidden information FKey and further generating key management information FKB by encrypting FKey using IDKeyk.

[First Modification (when FKB is Downloaded and Written Later)]

An authenticator, an authenticity, and an authentication method according to a first modification will be described. In the description, overlapping points with the first embodiment will be omitted.

<Writing FKB>

Writing an encrypted FKey bundle (FKB) will be described.

The process in the first modification is a process that is not particularly needed if the encrypted FKey bundle (FKB) is written during manufacture of the NAND flash memory 110. However, the process relates to a write process of FKB needed when the NAND flash memory 110 and the controller 119 are connected and the NAND flash memory 110 is acquired by a general user as, for example, an SD card and FKB is written later on the market when the card is used.

FIG. 44 shows a state in which the key management information FKB is, as described above, recorded in the unrecorded storage media (Card) 55.

As shown in FIG. 44, the NAND flash memory 110 has NKeyi and SecretID recorded in the hidden area 111-2. Index information i needed to identify the NKeyi, index information v needed to identify FKB, and SecretID (E-SecretID) encrypted by FKeyv specified by the index information v are recorded in the ROM area 111-3.

The first modification is different from the first embodiment in that the FKB, which is an encrypted FKey bundle, is not recorded in the read/write area 111-1.

Next, a case where the FKB is, as described above, downloaded from a server and recorded in the unrecorded storage media 55 will be described by using FIG. 45.

Figure 45:
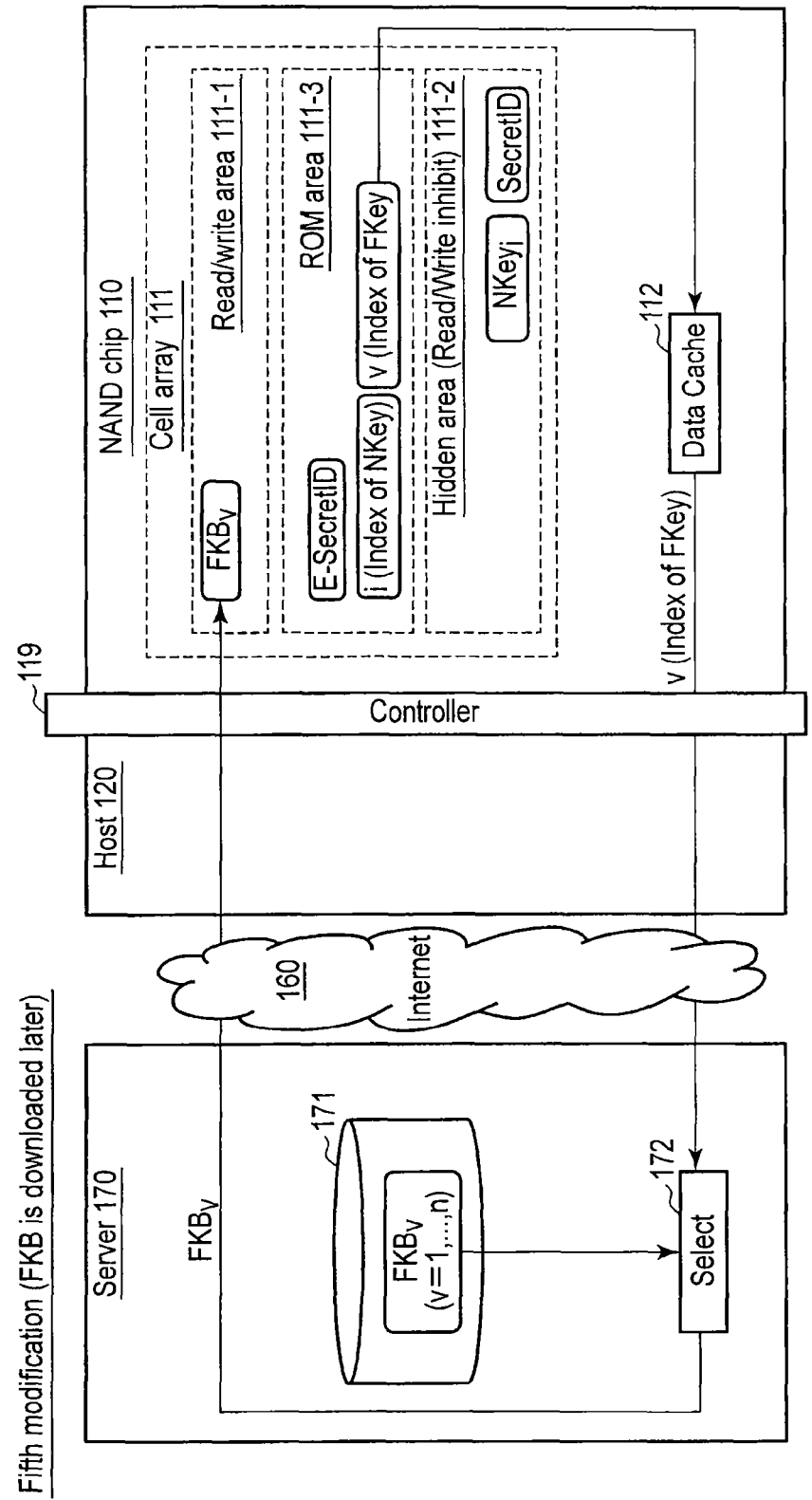
FIG. 45 is a diagram showing a case where the key management information is downloaded to and stored in the storage medium.

In this case, as shown in FIG. 45, the data cache 112 is arranged in the NAND flash memory 110 if necessary.

A server 170 according to the present embodiment includes an FKB data base (Set of FKBi's (i=1, ..., x)) 171 and a selector 172 to select FKBv based on index information v.

The server 170 and the memory system (the NAND flash memory 110, the controller 119, and the host device 120) are electrically connected for communication via an Internet 160.

The host device 120 includes a function to determine whether it is necessary to newly write FKB and to request FKB from the server if necessary.

<FKB Write Flow>

Next, the flow to download an encrypted FKeyID bundle (FKB) from the server 170 and to write the FKB into the NAND flash memory 110 will be described along FIG. 46.

(Step S141)

First, as shown in FIG. 46, when the host device 120 determines that it is necessary to download FKB, FKB writing is started and the host device 120 issues an FKB request to the server 170.

(Step S142)

Subsequently, the server 170 requests index information v needed to identify FKeyv from the NAND flash memory 110.

(Step S143)

Subsequently, the NAND flash memory 110 reads v from the ROM area 111-3 and sends out v to the server.

(Step S144)

Subsequently, the server 170 selects FKBv corresponding to the received v from the FKB database 171.

(Step S145)

Subsequently, the server 170 sends out the selected FKBv to the NAND flash memory 110.

(Step S146)

Subsequently, the NAND flash memory 110 writes the received FKBv into the read/write area 111-1 for recording.

With the above operation, the download flow of the encrypted FKey bundle (FKB) according to the first modification is completed (End).

Other configurations and operations are substantially the same as those in the first embodiment.

<Advantageous Effects>

According to the authenticator, authenticity and authentication method according to the first modification, at least the advantageous effects (1) to (3) similar to those in the first embodiment can be obtained.

Further, according to the first modification, the present embodiment can be applied if necessary when FKB is written later.

What has been described above includes examples of the disclosed innovation. Furthermore, the term "region" or "information" include the same meaning of "area" or "data", the term "secure storing medium" or "non-secure storing medium" can be described as "first storing medium" or "second storing medium", the term "connected" includes the meaning of "electrically connected", the term "contents" or "key" can be described as "content data" or "key data", and the term "message" includes the meaning of "command".

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage system comprising:
a host device;
a secure storing medium including:
a memory provided with a protected first storing region which stores secret information sent from the host device, and a second storing region which stores encoded contents; and
a controller configured to carry out authentication processing for accessing the first storing region, wherein
the host device and the secure storing medium produce a bus key which is shared only by the host device and the secure storing medium by authentication processing, and which is used for encoding processing when information of the first storing region is sent and received between the host device and the secure storing medium,
the host device has the capability to request the secure storing medium to send a status,
the secure storing medium produces a message authentication code based on the bus key in reply to the sending request of the status, and
the host device verifies validity of the message authentication code based on the bus key.

2. The system according to claim 1, wherein
the host device issues an initializing request to the secure storing medium, and
the secure storing medium abandons the bus key based on the initializing request.

3. The system according to claim 2, wherein
a non-secure storing medium connected to at least one of the host device, and including a third storing region which stores encoded contents.

4. A storage system comprising:
a host device;
a secure storing medium including:
a memory provided with a protected first storing region which stores secret information sent from the host device, and a second storing region which stores encoded contents; and
a controller which carries out authentication processing for accessing the first storing region; and
a non-secure storing medium which is connected to at least one of the host device and the secure storing medium, and which records encoded contents, wherein
the controller of the secure storing medium includes a first identifier, the memory includes a second identifier, and the non-secure storing medium includes a third identifier, and
the host device identifies the secure storing medium and the non-secure storing medium based on the first, second and third identifiers.

5. The system according to claim 4, wherein
when the non-secure storing medium does not include the third identifier, the host device produces a fourth identifier, and supplies the fourth identifier to the non-secure storing medium.

6. The system according to claim 5, wherein
at least one of the secure storing medium and the non-secure storing medium includes link information indicative of a relation between the non-secure storing medium and the secure storing medium, and
the link information of the secure storing medium includes at least one of the third and fourth identifiers of the non-secure storing medium.

7. The system according to claim 6, wherein
the memory of the secure storing medium includes a medium ID, and
the link information of the non-secure storing medium includes the medium ID of the secure storing medium.

* * * * *